US012350207B2

(12) United States Patent
Brown et al.

(10) Patent No.: US 12,350,207 B2
(45) Date of Patent: Jul. 8, 2025

(54) LIFTING MECHANISM AND CHAIRS

(71) Applicant: Exokinetics, Inc., West Chester, PA (US)

(72) Inventors: Garrett W. Brown, Philadelphia, PA (US); John Christopher Fawcett, Antrim (GB)

(73) Assignee: Exokinetics, Inc.

( * ) Notice: Subject to any disclaimer, the term of this patent is extended or adjusted under 35 U.S.C. 154(b) by 0 days.

(21) Appl. No.: 18/182,863

(22) Filed: Mar. 13, 2023

(65) Prior Publication Data

US 2023/0210704 A1 Jul. 6, 2023

Related U.S. Application Data

(63) Continuation of application No. 16/982,365, filed as application No. PCT/US2019/023661 on Mar. 22, 2019, now Pat. No. 11,602,469, said application No. 16/982,365 is a continuation-in-part of application No. 15/326,113, filed as application No. PCT/US2015/040036 on Jul. 10, 2015, now Pat. No. 10,842,706, said application No. PCT/US2019/023661 is a continuation-in-part of application No. PCT/US2017/060163, filed on Nov. 6, 2017.

(60) Provisional application No. 62/649,809, filed on Mar. 29, 2018, provisional application No. 62/024,006, filed on Jul. 14, 2014, provisional application No. 62/649,746, filed on Mar. 29, 2018.

(51) Int. Cl.

*A61G 5/14* (2006.01)
*A61G 5/10* (2006.01)

(52) U.S. Cl.

CPC ............. *A61G 5/14* (2013.01); *A61G 5/1059* (2013.01)

(58) Field of Classification Search

CPC ................................ A61G 5/14; A61G 5/1059
See application file for complete search history.

(56) References Cited

U.S. PATENT DOCUMENTS 4,211,426 A * 7/1980 Motloch ................ A47D 13/04 297/307
4,249,774 A * 2/1981 Andreasson ............. A61G 5/14 297/316
5,316,370 A * 5/1994 Newman .................. A61G 5/14 297/DIG. 10

(Continued)

FOREIGN PATENT DOCUMENTS

GB 1406420 * 9/1975

*Primary Examiner* — Philip F Gabler
(74) *Attorney, Agent, or Firm* — Barnes & Thornburg LLP

(57) ABSTRACT

An adjustable lifting mechanism for use as or with a seating apparatus. The lifting mechanism has a base to which a pivot of a parallelogram structure is attached. A spring extends from a first link of the parallelogram to an adjustable termination point on a second link of the parallelogram to form a lifting triangle. A lifting power adjustment mechanism adjusts the position of the spring termination point with respect to the main pivot. An extension is in fixed relation to one of the four parallelogram links, and is configured to maintain its angle with respect to the horizontal when angles of the parallelogram are varied upon raising or lowering the lifting mechanism between a sitting mode and a standing mode. The extension thus serves as a base for a rear seat section.

8 Claims, 56 Drawing Sheets

SECTION 5-5
SCALE 1 : 6

(56) References Cited

U.S. PATENT DOCUMENTS

| | | | | | |
|---|---|---|---|---|---|
| 5,482,350 | A * | 1/1996 | Komorowski | A61G 5/14 297/DIG. 10 |
| 5,673,970 | A * | 10/1997 | Holmquist | A47C 7/506 297/DIG. 10 |
| 5,984,411 | A * | 11/1999 | Galumbeck | A47C 9/005 297/DIG. 10 |
| 6,125,957 | A * | 10/2000 | Kauffmann | B60L 50/52 297/DIG. 10 |
| 9,050,231 | B2 * | 6/2015 | Masters | A61G 5/14 |
| 9,101,220 | B2 * | 8/2015 | Wang | A63B 22/0664 |
| 10,092,467 | B2 * | 10/2018 | Mackert | A47C 1/032 |
| 10,327,553 | B2 * | 6/2019 | Kiwak | A47C 31/008 |
| 10,682,271 | B2 * | 6/2020 | Lin | A47C 7/5068 |
| 10,888,169 | B1 * | 1/2021 | Ma | A47C 1/0355 |
| 11,602,469 | B2 * | 3/2023 | Brown | A61G 5/0891 |
| 2004/0226567 | A1 * | 11/2004 | Klemm | A47B 21/02 128/845 |
| 2005/0017559 | A1 * | 1/2005 | Kao | A61G 5/14 297/338 |
| 2005/0264070 | A1 * | 12/2005 | Kao | A61G 5/14 297/284.11 |
| 2007/0227787 | A1 * | 10/2007 | Kuramoto | A61G 5/045 180/65.1 |
| 2010/0123346 | A1 * | 5/2010 | Lin | A47C 1/03 297/411.37 |
| 2010/0207354 | A1 * | 8/2010 | Hunziker | A61G 5/14 297/316 |
| 2016/0250095 | A1 * | 9/2016 | Liu | A61H 3/04 280/47.38 |
| 2016/0310334 | A1 * | 10/2016 | Bliem | A47C 3/22 |
| 2017/0209319 | A1 * | 7/2017 | Fawcett | A61G 5/125 |
| 2021/0196047 | A1 * | 7/2021 | Zhang | A61G 5/14 |

* cited by examiner

SECTION 3-3
SCALE 1 : 6

SECTION 5-5
SCALE 1 : 6

SECTION 7-7
SCALE 1 : 6

SECTION 13-13
SCALE 1 : 8

DETAIL V
SCALE 1 : 3

DETAIL J
SCALE 1 : 3

SECTION 15-15
SCALE 1 : 8

SECTION 17-17

DETAIL T
SCALE 1 : 3

DETAIL G
SCALE 1 : 3

SECTION 19-19
SCALE 1 : 8

LIFT ADJUSTMENT - STEP 1

DETAIL A
SCALE 1:5

LIFT ADJUSTMENT - STEP 2

LIFT ADJUSTMENT - STEP 3

SECTION B-B

DETAIL C
SCALE 1 : 5

LIFT ADJUSTMENT - STEP 4

SECTION D-D

DETAIL E
SCALE 1 : 5

LIFT ADJUSTMENT-STEP 5

DETAIL F
SCALE 1 : 5

LIFT ADJUSTMENT-STEP 6

DETAIL G
SCALE 1 : 5

MAXIMUM HEIGHT ADJUSTMENT-STEP 1

DETAIL H
SCALE 1 : 2

MAXIMUM HEIGHT ADJUSTMENT-STEP 2

DETAIL I
SCALE 1 : 4

MAXIMUM HEIGHT ADJUSTMENT-STEP 3

DETAIL J
SCALE 1 : 4

MAXIMUM HEIGHT ADJUSTMENT-STEP 4

DETAIL O
SCALE 1 : 2

SECTION P-P
SCALE 1 : 2

LIFTING MECHANISM AND CHAIRS

This application is a continuation of U.S. patent application Ser. No. 16/982,365, filed Sep. 18, 2020, entitled Lifting Mechanism and Chairs, which is a national stage entry of International Application PCT/US2019/023661, entitled Lifting Mechanism and Chairs, filed Mar. 22, 2019, which claims priority to U.S. provisional application No. 62/649,809, filed Mar. 29, 2018, entitled Lifting Chair and U.S. provisional application No. 62/649,746, filed Mar. 29, 2018, entitled Elevating Walker Chair, Lifting Mechanism and Seat, and is a continuation-in-part of International application number PCT/US2017/060163, filed Nov. 6, 2017, entitled Dual-State Caster And Method. This application is a continuation-in-part of and U.S. application Ser. No. 15/326,113, filed Jan. 13, 2017, entitled Elevating Walker Chair, which is a national stage entry of International Application PCT/US2015/040036 filed Jul. 10, 2015, entitled Elevating Walker Chair, which claims priority to U.S. Provisional Application 62/024,006, entitled Elevating Walker Chair, filed Jul. 14, 2014, all of which are hereby incorporated by reference.

BACKGROUND

Lifespans are increasing but people may not retain the arm, leg and core strength to easily rise from chairs. Those suffering from disease and relevant injuries may also have trouble with this integral component of mobility.

Geriatric seating is typically constructed to be higher off the floor, but is consequently less comfortable. Lower chairs, including plush armchairs, are comfortable for long duration sitting, but more difficult to rise from. Existing lifting chairs do not provide optimized support for the anatomical realities of rising from sitting to standing.

Electrically motorized versions typically lift by tilting the entire chair structure, which shifts the body forward and slopes the seat to a point that is often frightening. Conventional spring-powered chairs do not deliver consistent lift (iso-elasticity) or ergonomically appropriate lifting geometry.

As a human torso rises from a seated to a standing position, the hip joints generally describe an arc of a radius equal to the length of one's thighs. Centered on the knee joints, this arcuate motion of course terminates when the hips intersect the vertical plane above the ankles. Ideally, one's knee joints would remain approximately stationary; but without compensating for the drastic imbalance that obtains until ones center of mass reaches that standing position, a great amount of effort must be applied to pushing down on armrests, to supply the force that a successful lifting-assist chair would effortlessly exert.

Hence, absent lifting assistance, mobility challenged people are instructed to shimmy to the front of the seat cushion and then lurch forward three, increasingly effortful times, to bring their center of mass over their feet and then straighten out to stand.

Ideally, a lifting-assist chair or cushion would permit the user to rise at will at or near to a natural, human pace, which is unlike the conspicuously slow, noisy progression of an electric lifting-assist chair progressing to its awkward tilted position.

SUMMARY

An adjustable lifting mechanism for use as or with a seating apparatus is disclosed. In an illustrative embodiment, the lifting mechanism has a base to which a pivot of a parallelogram structure is attached. The parallelogram structure has four pivotally connected links. A spring extends from a first link of the parallelogram to an adjustable termination point on a second link of the parallelogram to form a lifting triangle, wherein the spring termination point is displaced from a main pivot of the parallelogram. The displacement of the spring termination point from the main pivot creates a "lever arm" that can affect the lifting force. A lifting power adjustment mechanism adjusts the position of the spring termination point with respect to the main pivot. An extension is provided in fixed relation to one of the four parallelogram links, and is configured to maintain its angle with respect to the horizontal when angles of the parallelogram are varied upon raising or lowering the lifting mechanism between a sitting mode and a standing mode. The extension can form a rear seat section or a base to support a rear seat section. A front seat section is pivotally attached to the rear seat section to allow it to swing downward upon elevation of the mechanism from a sitting mode to a standing mode.

DESCRIPTION OF THE DRAWINGS

All drawings include illustrative embodiments of a lifting chair and its components, illustrative embodiments of a lifting mechanism that may be contained in the lifting chair or other apparatuses, and illustrative lifting chairs and associate components and mechanisms. The illustrative embodiments are best understood from the detailed description when read in conjunction with the accompanying drawings.

FIG. 13B is an enlargement of portion V of FIG. 13A.

FIG. 15B is an enlargement of portion J of FIG. 15A.

FIG. 17B is an enlargement of portion T of FIG. 17A.

FIG. 19B is an enlargement of portion G of FIG. 19A.

FIG. 25 depicts a lifting mechanism wherein the parallelogram is level or approximately level.

FIG. 26 depicts a lifting mechanism at its highest parallelogram excursion.

FIG. 27 depicts a side view of a lifting mechanism in a low or sitting position.

FIG. 28 depicts a side view of a lifting mechanism in a high or standing position.

FIG. 29 depicts a lifting mechanism with links of the associated parallelograms horizontal for a seated position, and an arcuate series of holes used in place of a slot for adjustment purposes.

FIG. 49B depicts a side cross-sectional view of an elevating lifting chair taken through line B-B of FIG. 49A. FIG. 49C is an enlargement of detail C of FIG. 49B.

FIG. 50B depicts a side cross-sectional view of an elevating lifting chair taken through line D-D of FIG. 50A. FIG. 50C is an enlargement of detail E of FIG. 50B.

FIG. 57A is a side view of an illustrative elevating walker chair having a support arm adjustment mechanism. FIG. 57B is a detail of section O of FIG. 57A. FIG. 57C is a cross-section of an arm support adjustment mechanism taken through line P-P of FIG. 57B.

FIG. 58A depicts an elevating walker chair with intermediary height adjustment and a seat in its lowest position. FIG. 58B is a close up of detail K from FIG. 58A prior to selecting a height of the seat.

FIG. 59A depicts an elevating walker chair with intermediary height adjustment with seat fixed at a selected height. FIG. 58B is a close up of detail K from FIG. 58A showing the intermediary height adjustment engaged to fix the height of the seat.

DETAILED DESCRIPTION OF EMBODIMENTS

Illustrative embodiments of a lifting chair may displace a user's center-of-balance at a seated position to over ones stationary knees and feet, with a reduced expenditure of energy compared to the amount required to rise from a traditional chair.

Illustrative embodiments of lifting chair mechanisms may equipoise throughout the displacement of a user's center of gravity—from seated to standing—so that a user's weight is reduced or eliminated as an impediment to any portion of that movement.

Illustrative embodiments of a lifting chair include adjustable mechanisms to accommodate lifting power for a wide range of human body weights.

Illustrative embodiments of a lifting chair mechanism may also provide a means for withdrawing and reinserting a roughly wedge-shaped or other complementary mid-seat support section that must be removed to permit folding a rising seat cushion, and restored when the seated position is resumed, without interfering with a user's standing and sitting motions.

Alternatively, the mid-seat support may be stationary with respect to the lifting mechanism base frame so the seat moves toward and away from it for seat support or folding, respectively.

Figure 1:
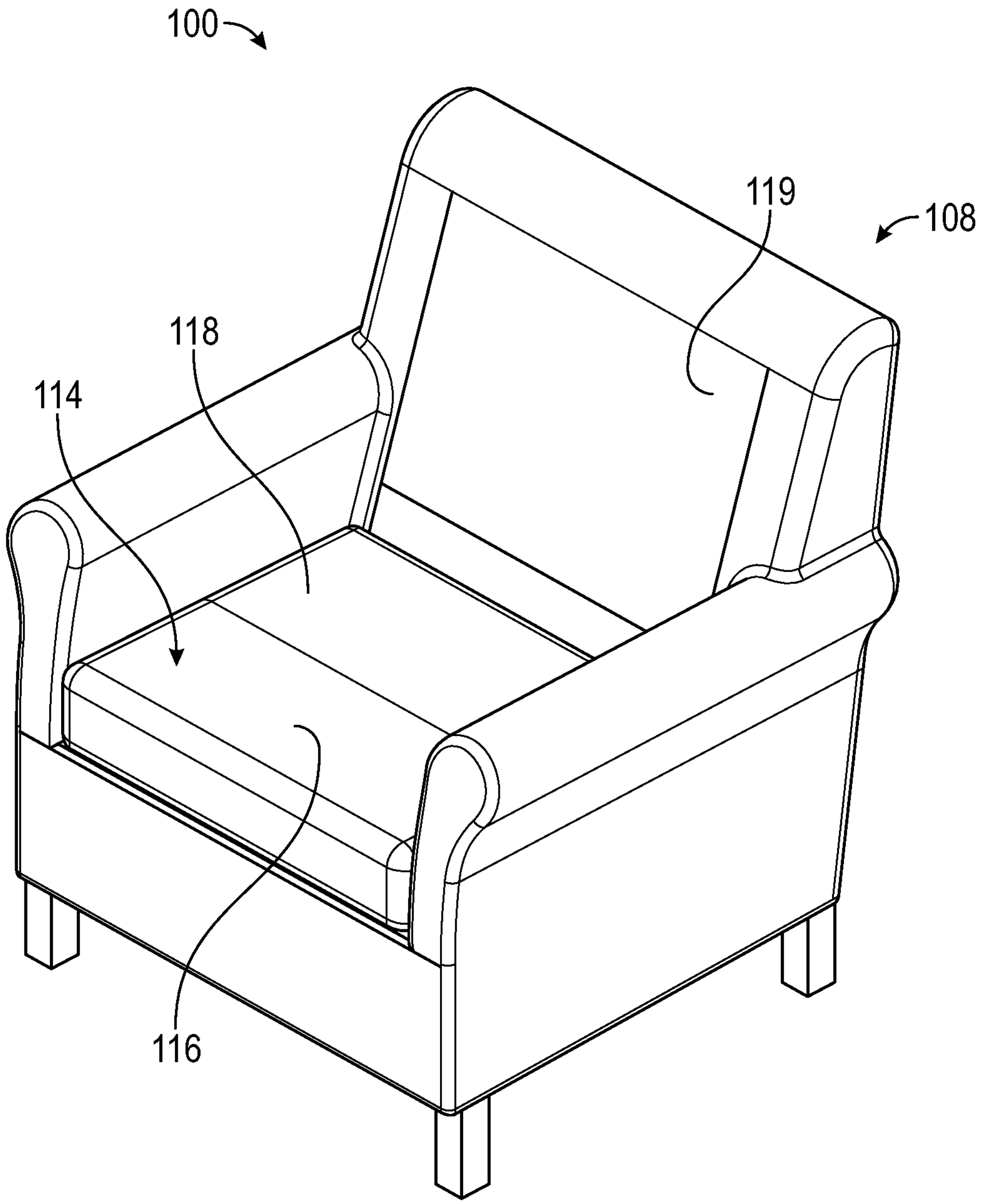
FIG. 1 is an isometric drawing of an illustrative lifting chair that transitions between a standing mode and a sitting mode.

FIG. 1 is an isometric drawing of an illustrative lifting chair 100 that transitions between a standing mode and a sitting mode. Lifting chair 100 has a seat 114 that includes a front seat section 116 and a rear seat section 118. In the sitting mode, front seat section 116 and rear seat section 118 to form a surface suitable for sitting on, for example by abutting one another. Seat sections 116, 118 may have various contours as do conventional chairs.

Figure 2:
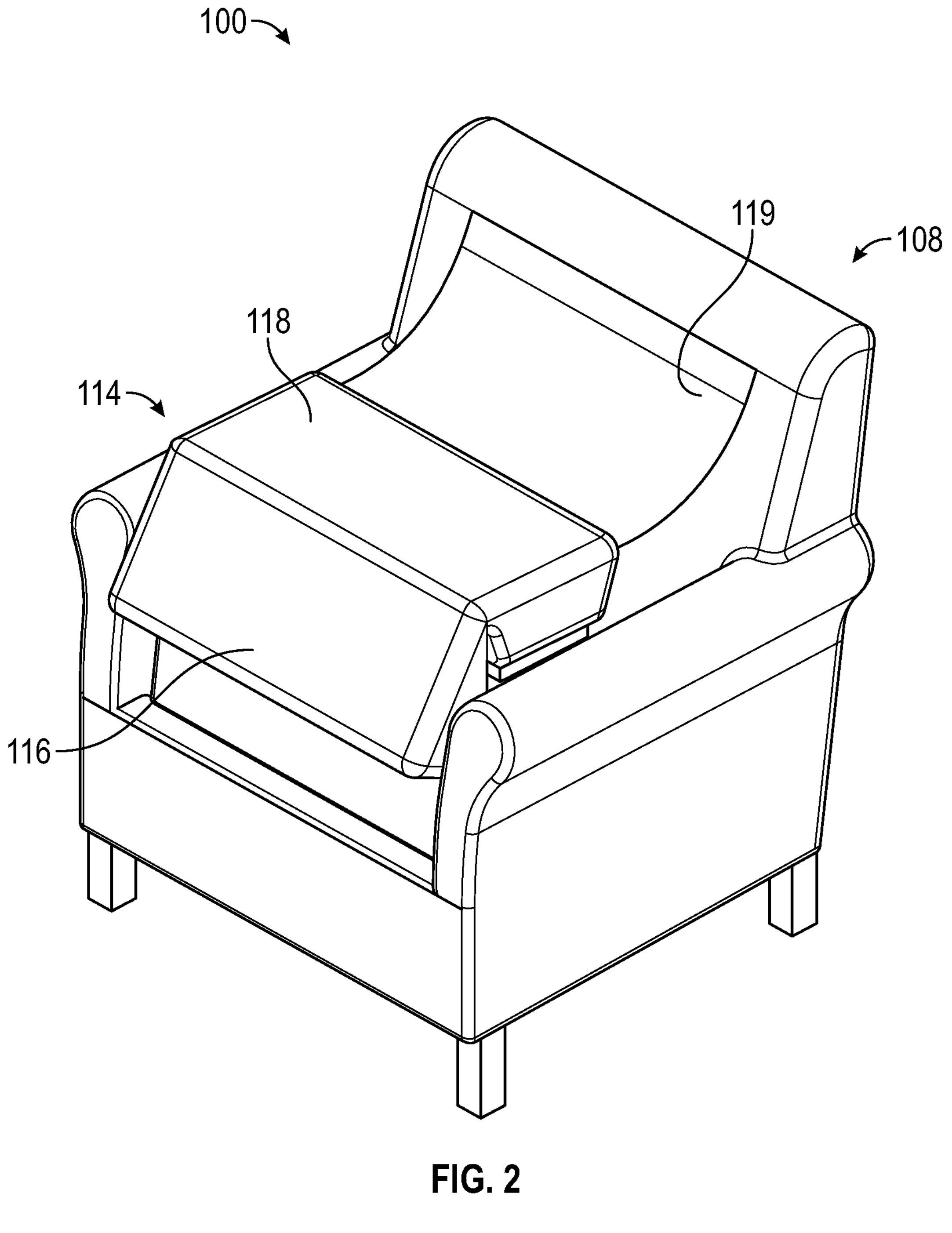
FIG. 2 is an isometric drawing of a lifting chair in a standing mode, or transitioning from a sitting mode to a standing mode, depending on the specific design of the chair.

FIG. 2 is an isometric drawing of lifting chair 100 in a standing mode, or transitioning from a sitting mode to a standing mode, depending on the specific design of the chair. Rear seat section 118 is raised from the sitting position to facilitate an occupant exiting lifting chair 100 by transitioning from a sitting position to a standing position. Front seat section 116 is angled downward to facilitate an occupant shifting weight from seat section 114 to the occupant's legs. Optional flexible panel 119 has a first edge attached to a seat back 108 of lifting chair 100 and a second edge attached to rear seat section 118. Flexible panel 119 shields a lifting mechanism contained in lifting chair 100, such as lifting mechanism 104 or lifting mechanism 350 shown in FIG. 29, for example. Flexible panel 119 may be detachable to allow access to lifting mechanism 104 and its adjustment components.

Figure 3:
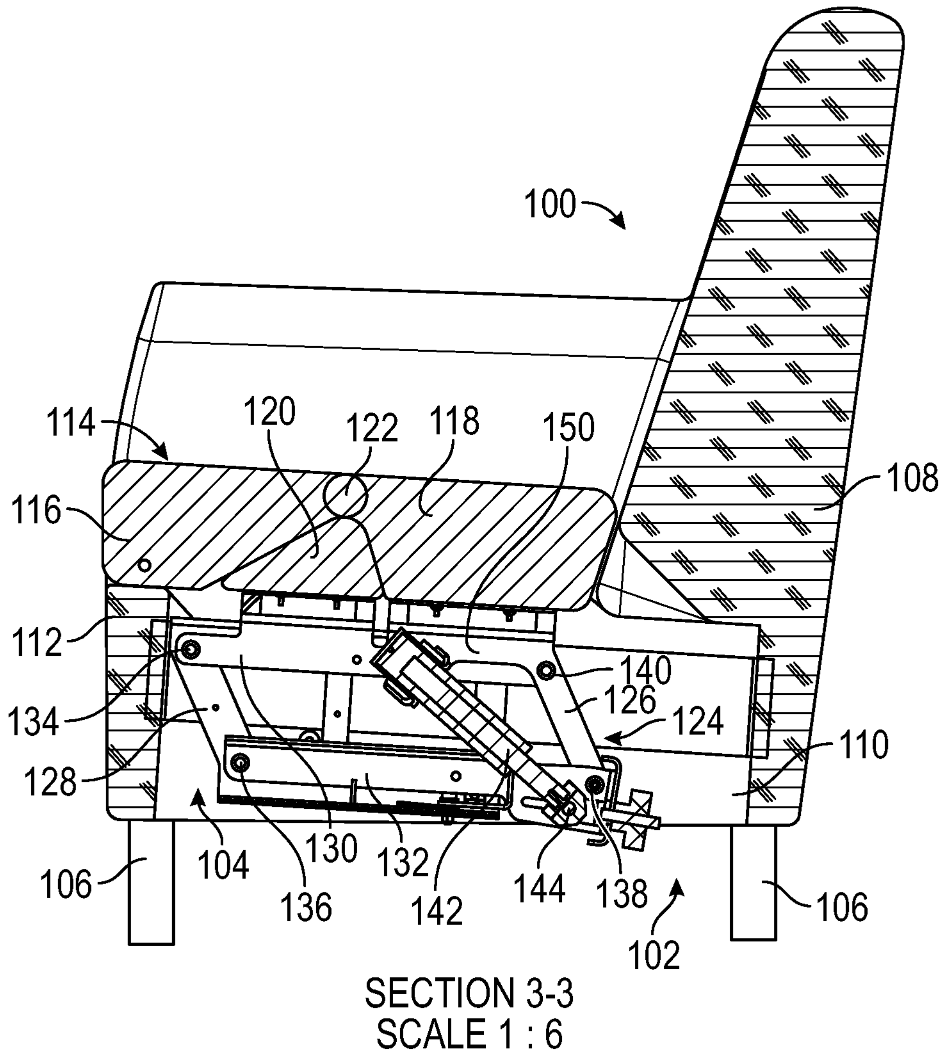
FIG. 3 depicts a cross section of a lifting chair in a sitting mode taken through section 3-3 of FIG. 4.
Figure 4:
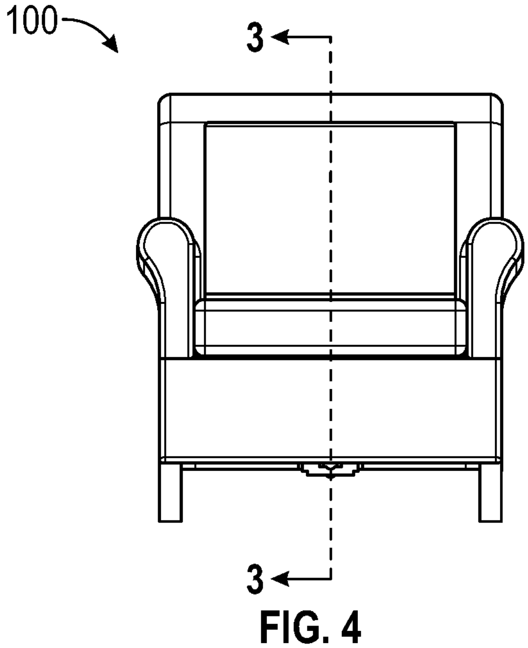
FIG. 4 is a front view of a lifting chair to illustrative the cross section taken to obtain FIG. 3.
Figure 5:
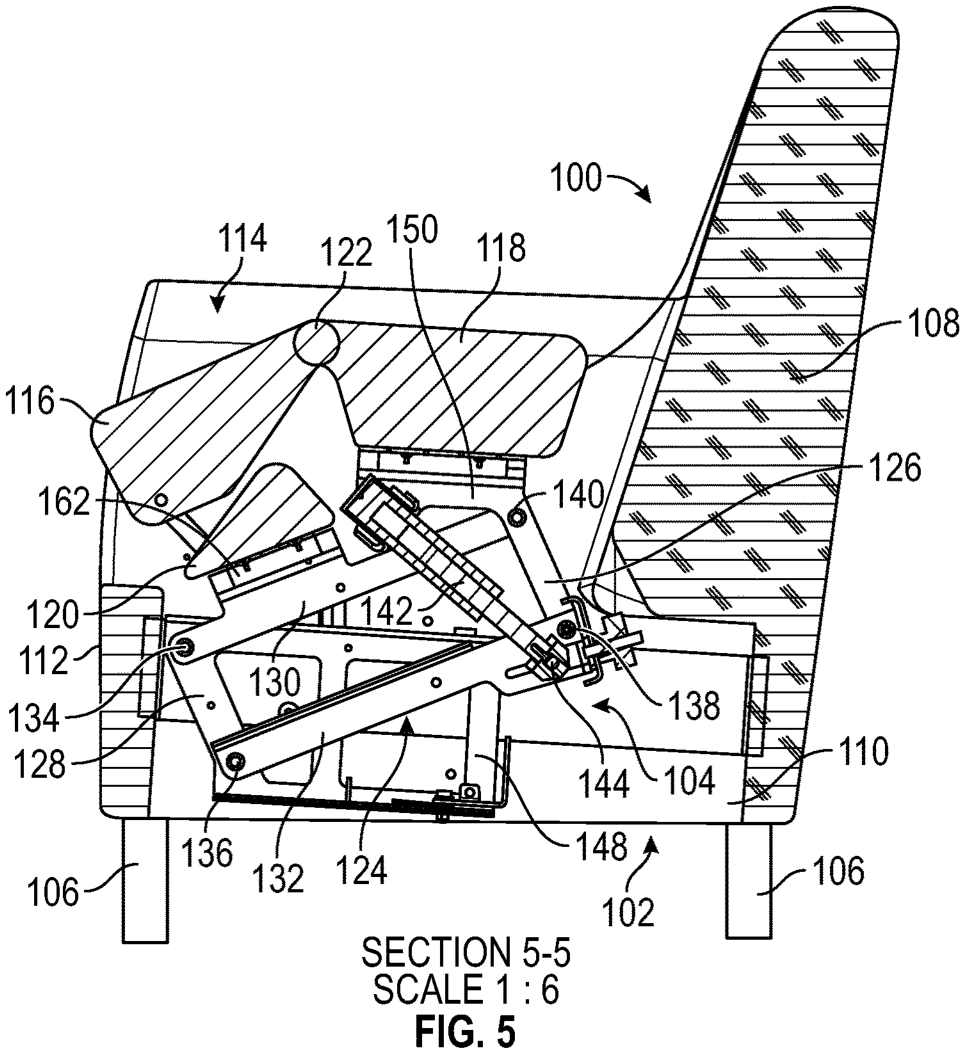
FIG. 5 depicts a cross section of a lifting chair in transition from a sitting mode to a standing mode taken through section 5-5 of FIG. 6.
Figure 6:
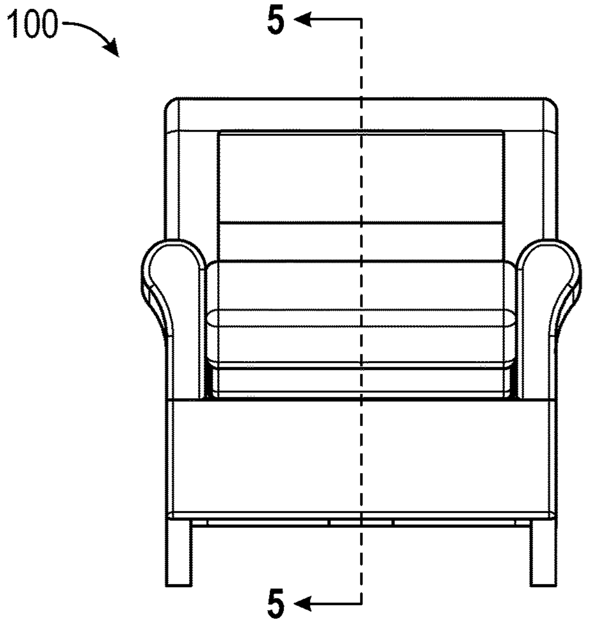
FIG. 6 is a front view of a lifting chair to illustrative the cross section taken to obtain FIG. 5.
Figure 7:
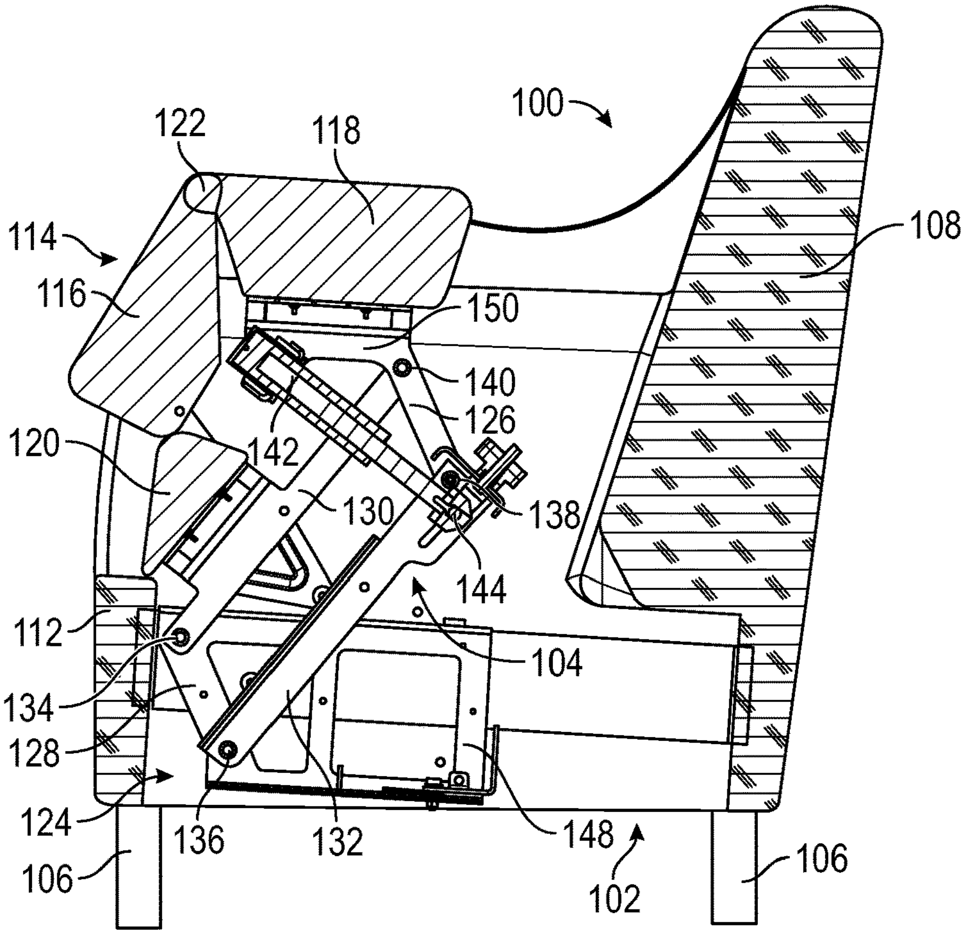
FIG. 7 depicts a cross section of a lifting chair in a standing mode taken through section 7-7 of FIG. 8.
Figure 8:
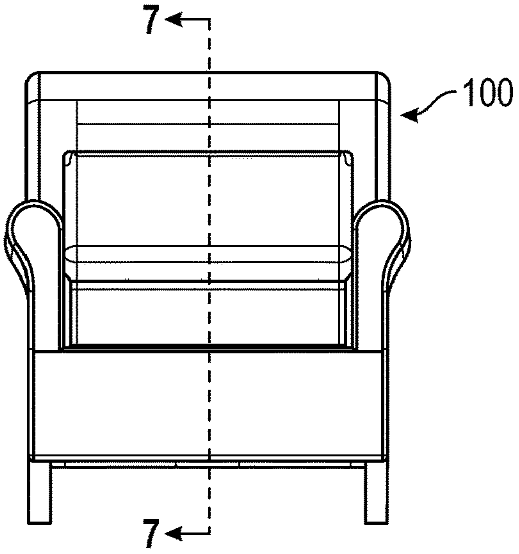
FIG. 8 is a front view of a lifting chair to illustrative the cross section taken to obtain FIG. 7.

FIG. 3 depicts an illustrative cross section of a lifting chair 100 in a sitting mode taken through section 3-3 of FIG. 4. FIG. 5 depicts a cross section of lifting chair 100 in transition from a sitting mode to a standing mode taken through section 5-5 of FIG. 6. FIG. 7 depicts a cross section of lifting chair 100 in a standing mode taken through section 7-7 of FIG. 8.

Lifting chair 100 has a chair frame 102 and a lifting mechanism 104 attached thereto. Chair frame 102 may have any configuration that includes components that together form a seating apparatus, such as an armchair, desk chair, backless chair or elevating walker chair, for example. In an illustrative embodiment, frame 102 has a plurality of legs 106, a seat back 108 and base 110. Chair frame 102 may also include a seat support 112, which provides support to seat 114. Alternatively, lifting mechanism 104 may have a seat entirely incorporated therein or attached thereto, in which case components of lifting mechanism 104 form the seat.

FIGS. 3, 5, 7 show seat 114 with a front seat section 116 and a rear seat section 118, both of which are attached, either directly or indirectly, to lifting mechanism 104. Seat sections 116, 118 include cushions in this illustrative embodiment. The cushions of front seat section 116 and rear seat section 118 are attached to front seat support section 158 and rear seat support section 160, respectively, such as shown for example in FIGS. 12, 13, 21, 24. Rear seat section 118 is hinged, or otherwise pivotally attached, at first seat pivot 122 to front seat section 116 to allow modification of their relative positions when lifting mechanism 104 is employed to raise or lower a user from or to a seated position. Seat 114 may also include mid-seat support section 120, which reinforces or strengthens seat 114 in the area below first seat pivot 122.

As seen, for example in FIGS. 3, 5, 7, lifting mechanism 104 includes a parallelogram frame 124. Parallelogram frame 124 has a first set of parallel links 126, 128 and a second set of parallel links 130, 132, pivotally attached to one another at pivots 134, 136, 138, 140 to form a parallelogram. Parallelogram link 126 has an extension 150 disposed at an angle to parallelogram link 126, which will be described in more detail below.

Figure 9:
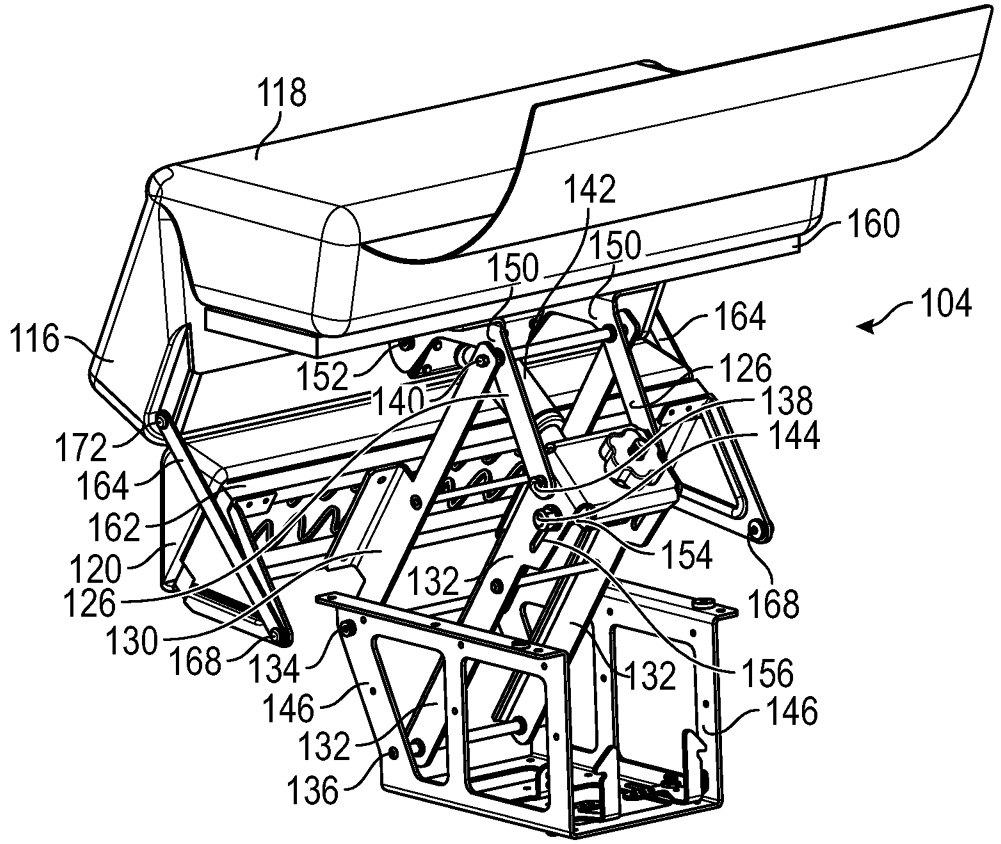
FIG. 9 is an isometric rear view of a lifting mechanism.
Figure 10:
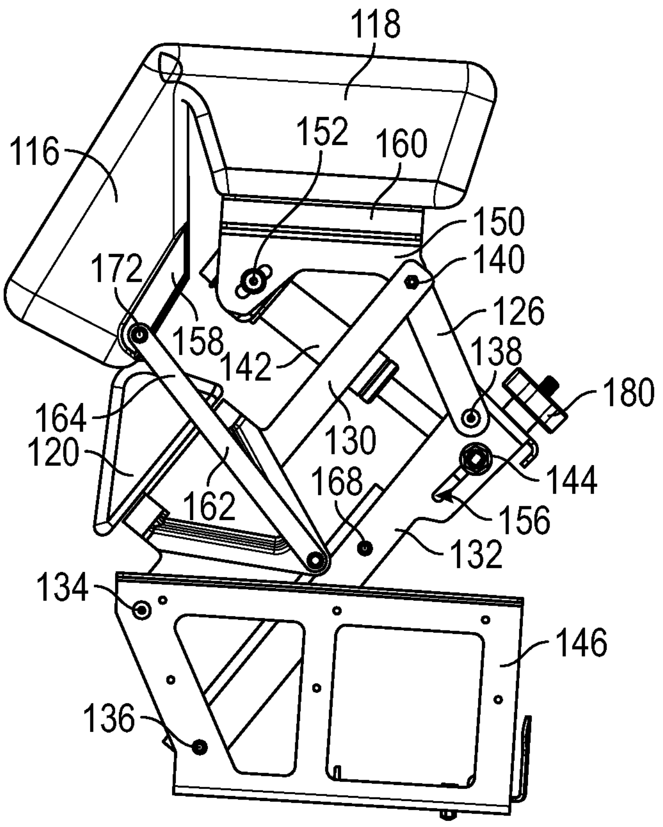
FIG. 10 is a side view of a lifting mechanism.

FIGS. 9-12 are further illustrations depicting lifting mechanism 104 in a standing mode or transitioning from a sitting mode to a standing mode. FIG. 9 is an isometric rear view of lifting mechanism 104. FIG. 10 is a side view of lifting mechanism 104.

Figure 11:
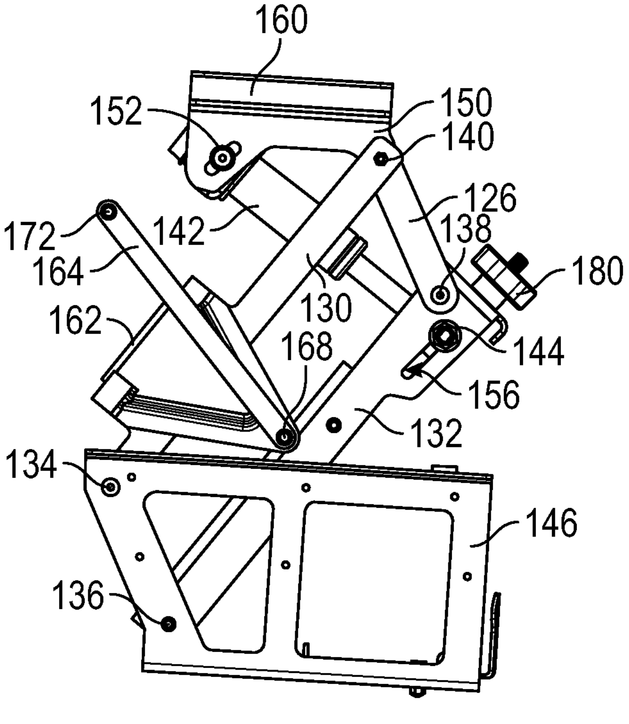
FIG. 11 depicts a side view of a lifting mechanism without a front seat section cushion or rear seat section cushion attached.
Figure 12:
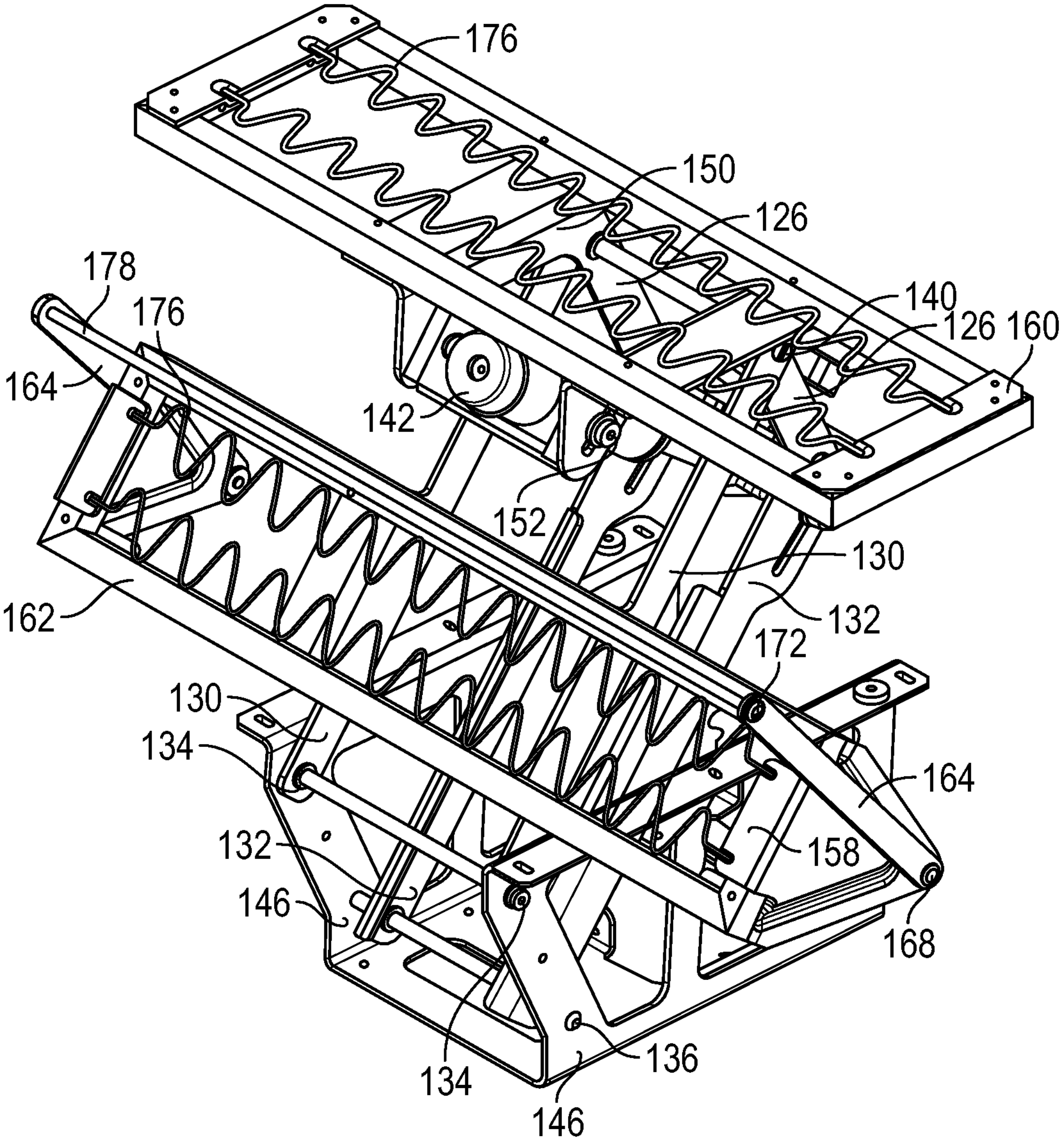
FIG. 12 is an isometric front view of a lifting mechanism, without front seat section cushion or rear seat section cushion attached.

FIGS. 9 and 10 show front seat section 116, rear seat section 118 and mid-seat section 120 attached to lifting mechanism 104. FIG. 11 depicts a side view of lifting mechanism 104 without the cushion portions of front seat section 116 and rear seat section 118 attached. FIG. 12 is an isometric front view of lifting mechanism 104, also without the cushion portions of seat section 116 and rear seat section 118. Spring 142 is attached to a spring axle at the axle's longitudinal center. The spring axle pivots with respect to parallelogram link 132 at a spring pivot 144. Spring 142 is pivotally attached at an end of extension 150 opposite to the origin of extension 150 at parallelogram link 126. Extension 150 may be attached to parallelogram link 126 or integral with it. Spring pivot 144 is adjustable along a section of parallelogram link 132. In the illustrative embodiment shown, spring 142 is attached to the spring axle, which extends into a slot 156 and is thereby adjustable along slot 156, and thus along parallelogram link 132. Slot 156 may be linear or in an arc with a center at the opposing end of spring 142 when extended.

It is noted that the spring axle is not explicitly shown in the figures but its location is evident by identification of spring pivot 144 and noting that it extends perpendicularly to the face of parallelogram link 132.

Returning to FIG. 5, seat 114 is transitioning from a sitting mode to a standing mode by operation of lifting mechanism 104 to assist a user when standing from a seated position. As parallelogram frame 124 pivots with respect to lifting mechanism side supports 146 at pivots 134, 136, seat 114 is raised. As an occupant stands, the occupant's weight begins to shift to the floor, thereby allowing spring 142 to expand. As extension 150 pivots with respect to parallelogram link 130 about pivot 140, the distance from upper spring pivot 152 to pivot 144 increases providing the necessary distance for expansion of spring 142. When lifting chair 100 is in a sitting mode, spring 142 is compressed by the weight of an occupant.

Spring 142 may be for example compression springs such as gas springs. Other illustrative types of springs include tension springs (which would be deployed oppositely on the parallelogram to provide comparable lifting force). In an exemplary embodiment, spring 142 is a gas spring having a diameter in the range of 20 mm to 45 mm and a rod diameter in the range of 10 mm to 20 mm. An illustrative force progression range from fully extended to fully compressed is 45% to 55%, yielding a 'p1' value in the range of 2600N to 1,300N and a 'p2' value in the range of 1700N-4200N. In an illustrative embodiment, spring 142 has a stroke range of 75 mm to 85 mm and an uncompressed length in the range of 200 mm to 275 mm.

As parallelogram links 126, 128, 130, 132 of parallelogram frame 124 pivot about pivots 134, 136, 138, 140, movement is imparted to seat sections 116, 118, 120 of seat 114. As seat 114 transitions from a standing mode to a sitting mode, rear seat support section 160 remains relatively parallel to the floor, front seat section 116 pivots with respect to rear seat section 118 about seat pivot 122, and thus rotates from an angle downward from the horizontal to or near a horizontal position. Depending on the desired design of the chair, front seat support section 158 and rear seat support section 160 may be angled from the horizontal in a sitting mode. For example, the front of seat 114 may be higher than the rear of seat 114. Similarly, seat back 108 may be vertical or angled from the vertical to achieve the desired position for utility or comfort. Mid-seat section 120 automatically moves into place to support seat 114 under seat pivot 122 as parallelogram link 130 attains a horizontal position because of its attachment to a parallelogram link either directly or indirectly.

In the illustrative embodiment shown in FIGS. 9-12, front seat support section 158 is connected to mid-seat support section 162 by tie rods 164, at first tie rod pivots 168. A second end of tie rods 164 is pivotally attached to front seat support section 158 at second tie rod pivots 172. As lifting chair 100 transitions from a sitting mode to a standing mode, parallelogram link 130 of parallelogram frame 124 rotates about pivots 134, 140 causing mid-seat support section 162 to move away from front seat section 116 and rear seat section 118. This allows front seat support section 158 to pivot downward with respect to rear seat support section 160.

Figure 21:
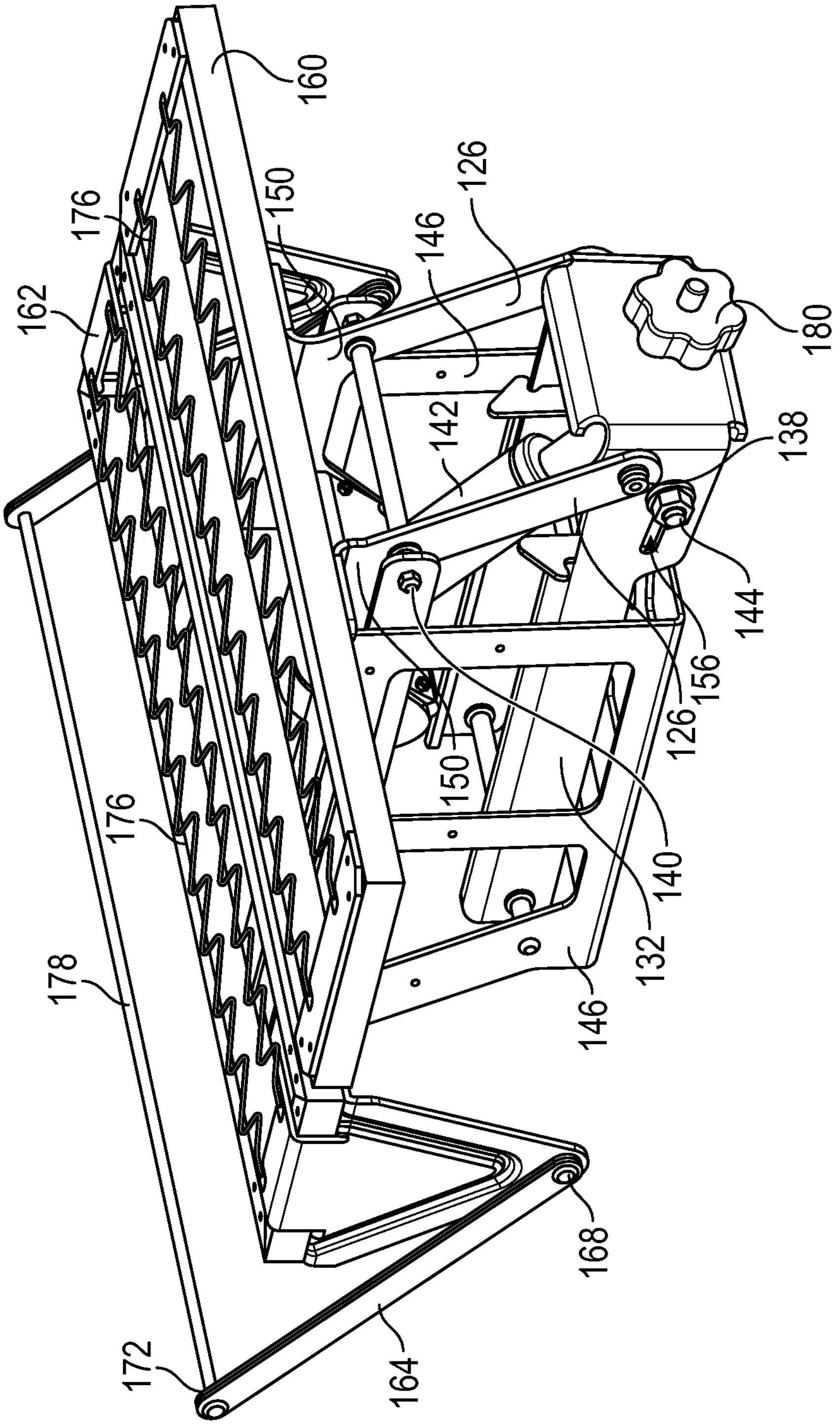
FIG. 21 is a rear isometric view of a lifting mechanism without seat cushions installed.
Figure 22:
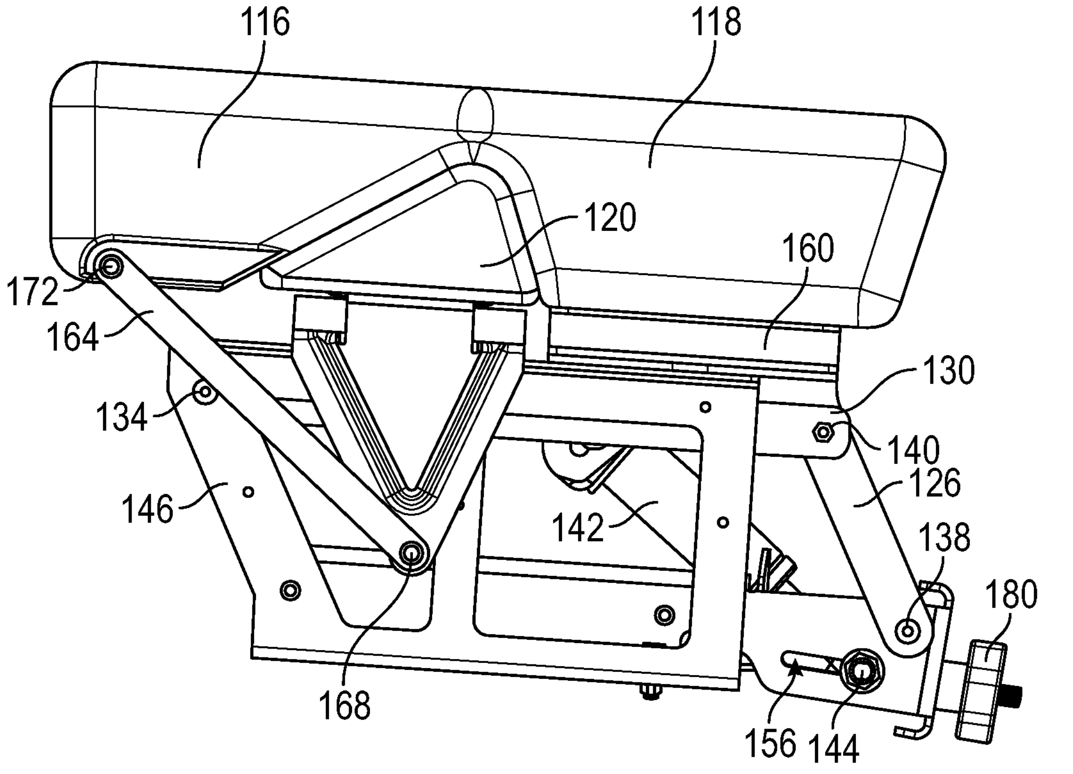
FIG. 22 is a side view of a lifting mechanism with seat cushions installed.
Figure 23:
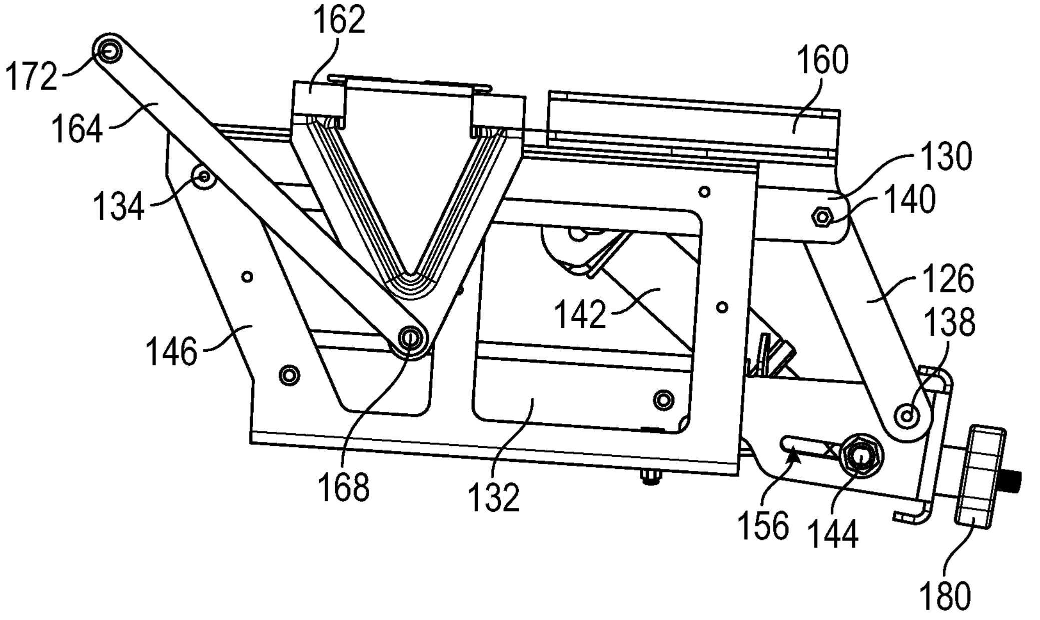
FIG. 23 is a side view of a lifting mechanism without seat cushions installed.
Figure 24:
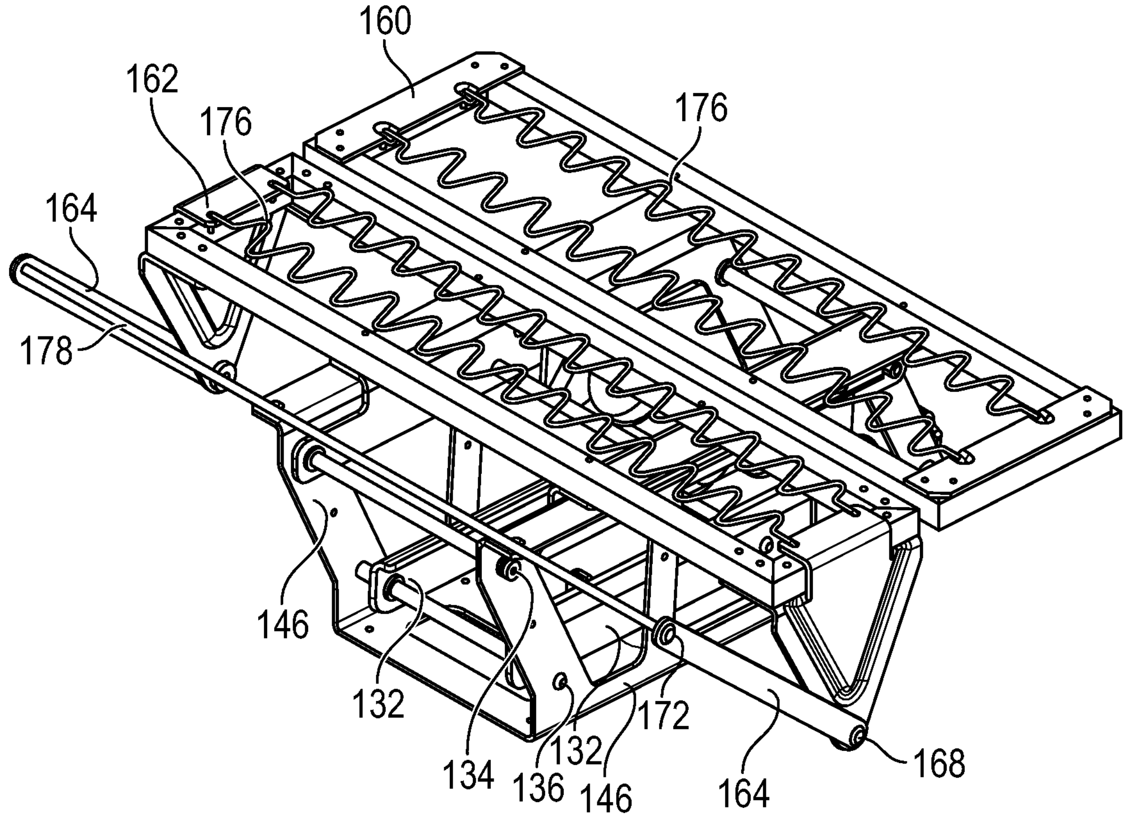
FIG. 24 is an isometric front view of a lifting mechanism.

FIGS. 21-24 depict lifting mechanism 104 in a sitting mode. FIG. 21 is an isometric rear view of lifting mechanism 104. FIG. 22 is a side view of lifting mechanism 104. Front seat section 116, rear seat section 118 and mid-seat section 120 are shown attached to lifting mechanism 104 in FIGS. 21 and 22. FIG. 23 depicts a side view of lifting mechanism 104 without seat cushions. FIG. 24 is an isometric front view of lifting mechanism 104.

FIG. 22 shows front section 116 and rear section 118 forming a sitting surface in the sitting mode. Mid-seat section 120 is pivoted into place beneath seat pivot 122.

In the embodiment depicted in FIGS. 9-12 and 21-24, mid-seat support section 162 and rear seat support section 160 are platforms with support springs 176 that may form a more comfortable base as compared to a rigid component such as a wooden platform. This disclosure though includes chair designs that incorporate such rigid platforms or other supports for cushions.

Front seat support section 158 is shown as a support bar 178. Additional structural components may form front seat support section 158. Front seat section 116 attaches to front support bar 178, which rotates at tie rod pivot 172 so that is may fold downward with respect to rear seat support section 160 about pivot 122 when lifting mechanism transitions from a sitting mode to a standing mode, as shown for example in FIG. 7.

Seat sections 116, 118, 120 of seat 114 are separately attached or incorporated into lifting mechanism 104. The cushion component of front seat section 116 is attached to front seat support section 158 of lifting mechanism 104. The cushion component of rear seat section 118 is attached to rear seat support section 160. The wedge portion of mid-seat section 120 is attached to mid-seat support section 162. Mid-seat support section 162 may be parallelogram link 130 or a fixed attachment to parallelogram link 150. The cushion portion of seat sections 116, 118, 120 may be integral with seat support sections 158, 160, 162 or attached to their respective seat support sections. FIGS. 3, 5 and 7 depict cushioned portions of seat sections 116, 118, 120 having cushions attached to seat support section 158, 160, 162, respectively. As parallelogram link 126 pivots about pivot 138, extension 150 remains roughly parallel to the ground, and thus, seat section 118, which is attached either directly or indirectly to extension 150, also remains generally parallel to the floor. Extension 150 need not be integral with a parallelogram link or directly attached thereto. It merely must move in fixed relation thereto. Additional components can be between extension 150 and parallelogram link 126 or other parallelogram link, provided that extension 150 remains at a fixed angle to the ground during lifting or lowering, so a seat can be attached thereto and also remain at a fixed angle. In illustrative embodiments, extension 150 is the seat.

Figure 15B:
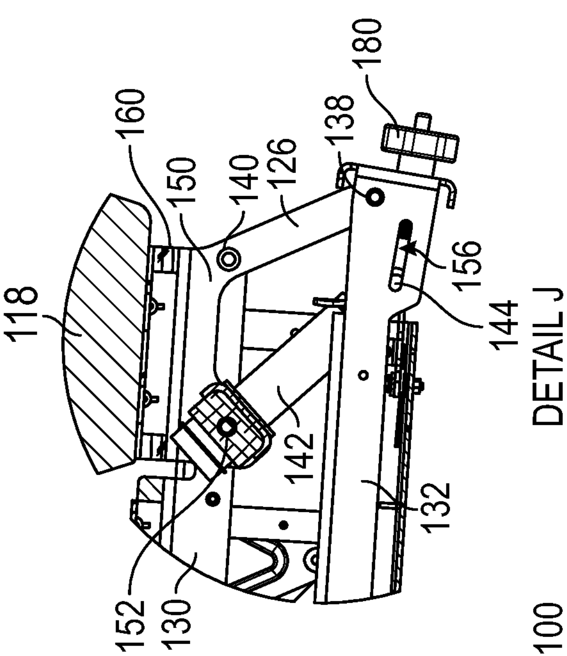
FIGS. 15A-B show a cross-sectional diagram through section 15-15 of FIG. 16 showing a side view of a lifting mechanism and a cross section of a front seat section, rear seat section and mid-seat section in a sitting mode.
Figure 16:
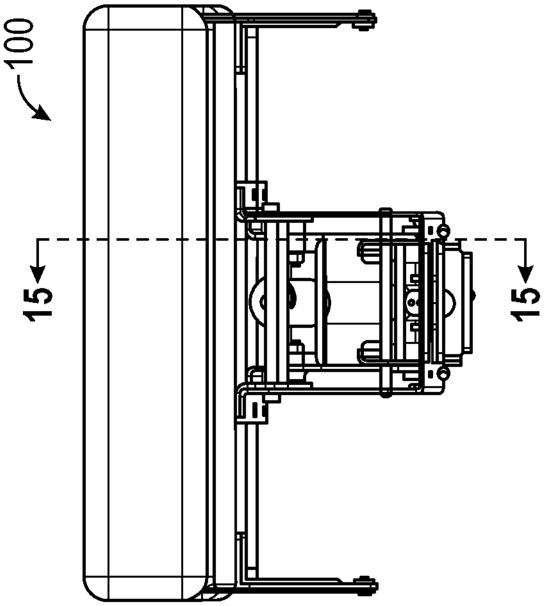
FIG. 16 is a rear view of a lifting chair to illustrative the cross section taken to obtain FIGS. 15A-B.
Figure 15A:
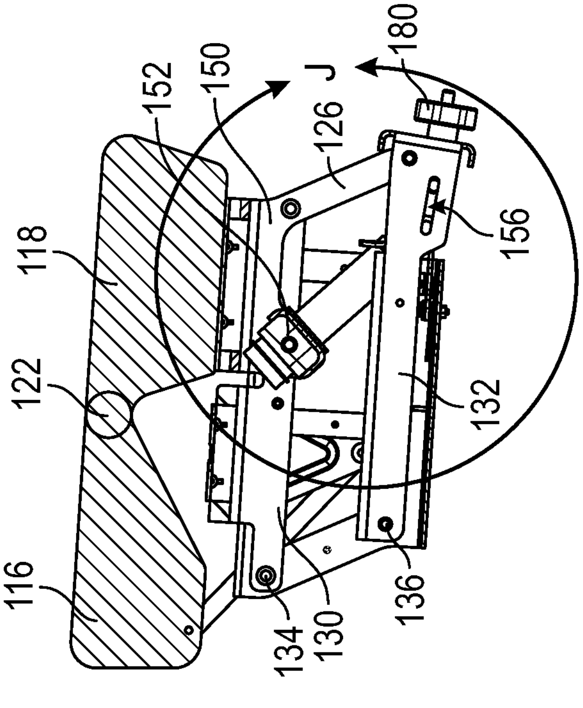
Figure 17A:
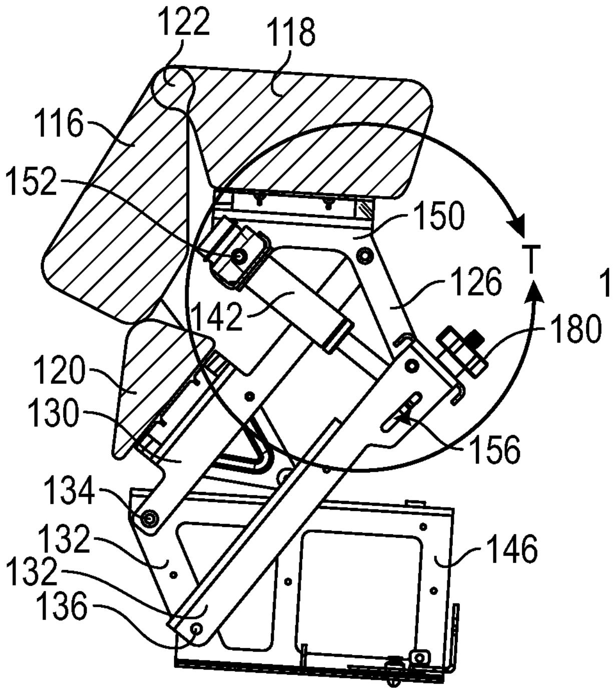
FIGS. 17A-B show a cross-sectional diagram through section 17-17 of FIG. 18 depicting a side view of a lifting mechanism and a cross section of a front seat section, rear seat section and mid-seat section in an elevated position with the spring termination point in a different slot position than in FIGS. 15A-B.
Figure 17B:
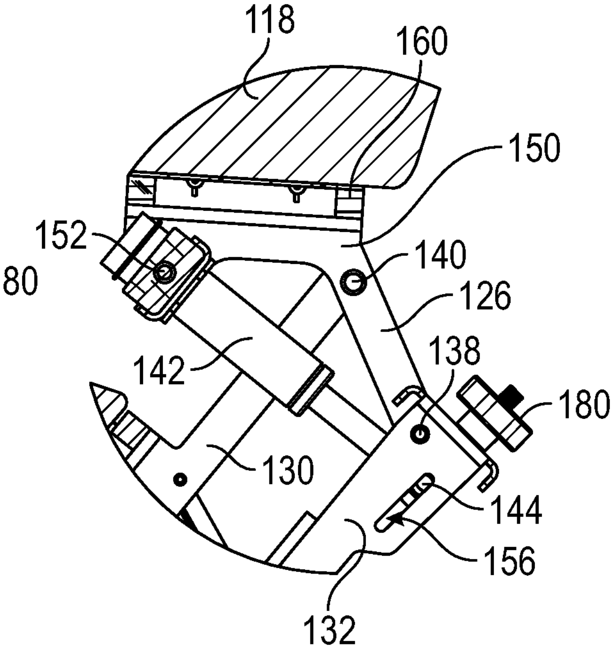
Figure 18:
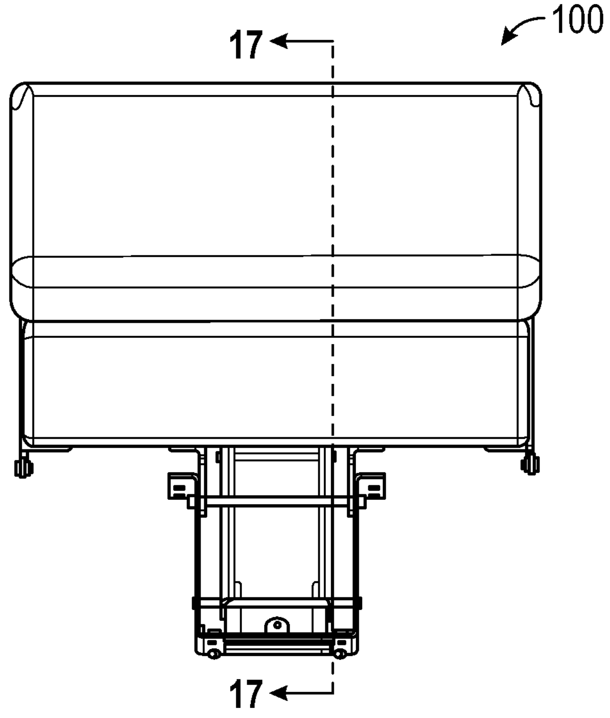
FIG. 18 is a rear view of a lifting chair to illustrative the cross section taken to obtain FIGS. 17A-B.
Figure 19B:
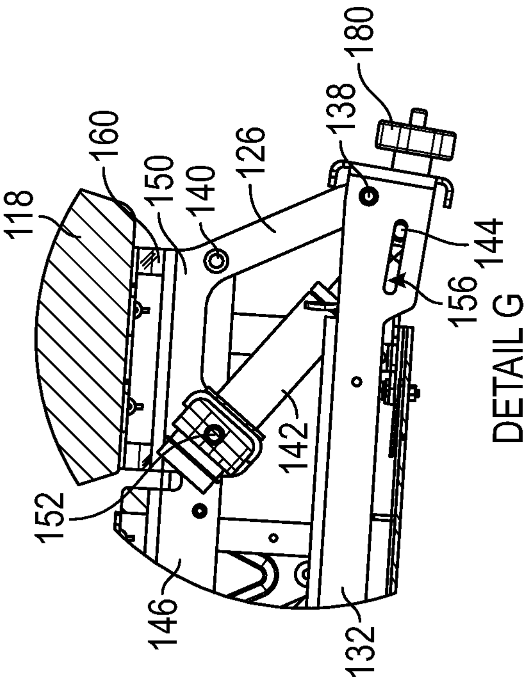
FIGS. 19A-B show a cross-sectional diagram through section 19-19 of FIG. 20 depicting a side view of a lifting mechanism and a cross section of a front seat section, rear seat section and mid-seat section in a sitting position with the spring termination point in a different slot position than in FIGS. 13A-B.
Figure 20:
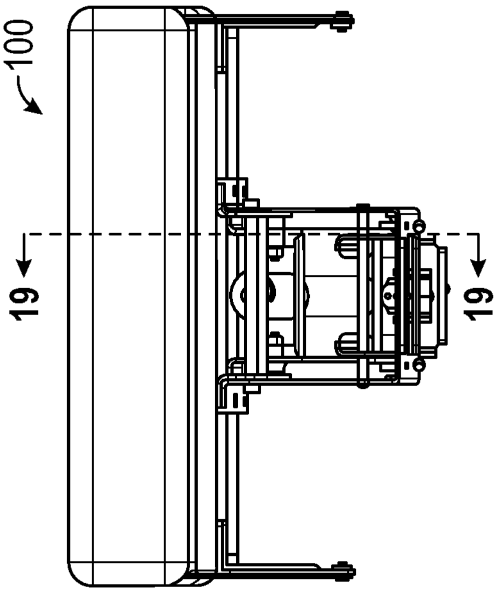
FIG. 20 depicts a rear view of a lifting chair to illustrate the cross section taken to obtain FIGS. 19A-B.
Figure 19A:
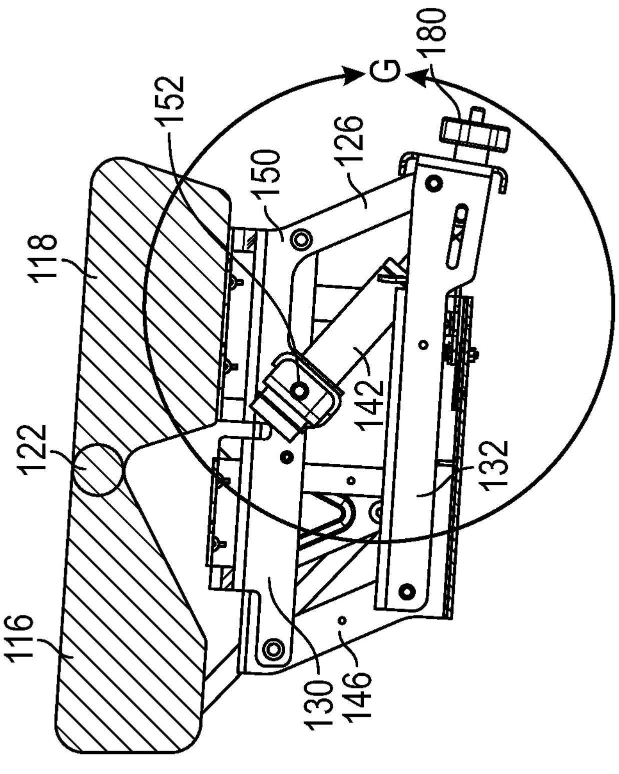

Lifting mechanism 104 may be adjusted to accommodate occupants of different weights. FIGS. 13A-B and 15A-B depict lifting mechanism 104 adjusted to the highest occupant weight accommodation for this illustrative embodiment. FIGS. and 13A-B and 14 show lifting mechanism 104 in a standing mode, and FIGS. 15A-B and 16 show lifting mechanism 104 in a sitting mode. FIGS. 17A-B and 19A-B depict lifting mechanism 104 adjusted to the lowest occupant weight accommodation for this illustrative embodiment. FIGS. 17A-B and 18 show lifting mechanism 104 in a standing mode, and FIGS. 19A-B and 20 depict lifting mechanism 104 in a sitting mode.

Figure 13A:
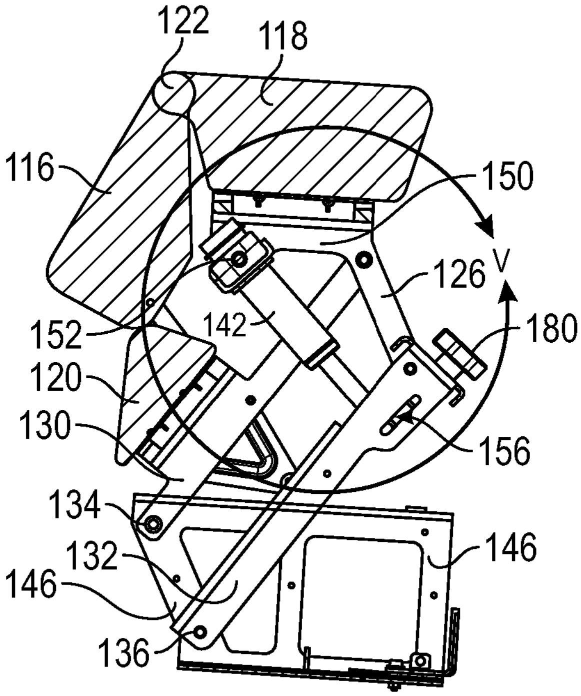
FIGS. 13A-B show a cross-sectional diagram through section 13-13 of FIG. 14 showing a side view of a lifting mechanism and a cross section of a front seat section, rear seat section and mid-seat section in an elevated position.
Figure 13B:
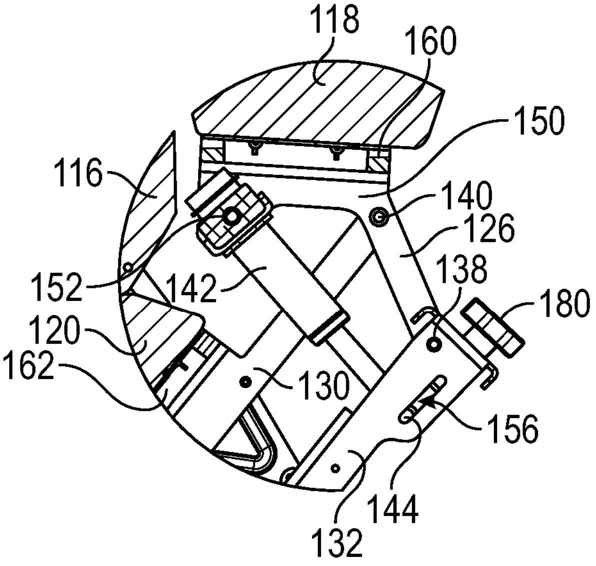
Figure 14:
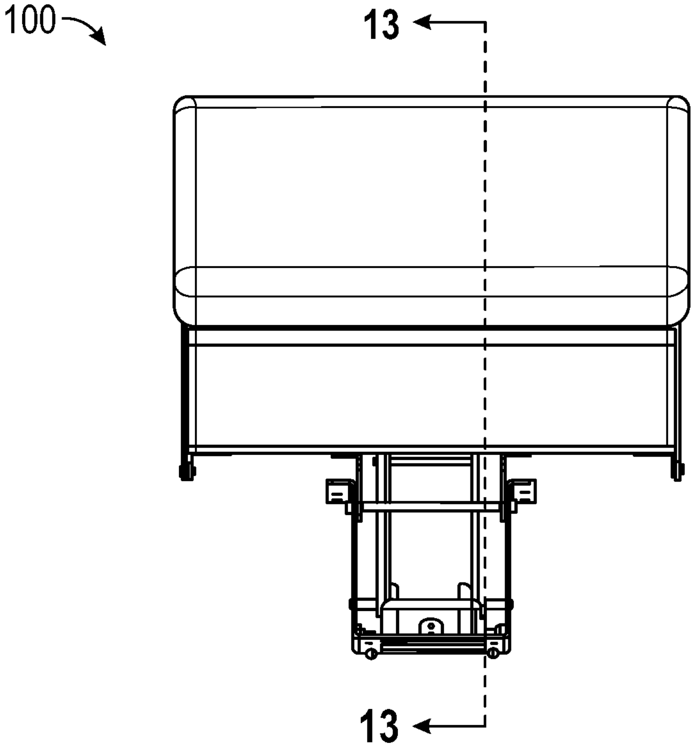
FIG. 14 is a rear view of a lifting chair to illustrative the cross section taken to obtain FIGS. 13A-B.

FIG. 13A is a cross-sectional diagram through section 13-13 of FIG. 14, thus showing a side view of lifting mechanism 104 and a cross section of front seat section 116, rear seat section 118 and mid-seat section 120. FIG. 13B is an enlargement of portion V of FIG. 13A. As noted above, FIGS. 13A, B, 14 depict a lifting mechanism in a standing mode adjusted to a maximum accommodation with respect to occupant weight. In the embodiments depicted in the figures, the mechanism to adjust lifting mechanism 104 to accommodate occupants of different weight includes pivot 144, which is positionally adjustable along slot 156 to control lifting efficiency. Spring pivot 144 is shown in the forward most or lowest position in slot 156. "Spring pivot 144" is used herein generally and can be in the form of an axle that extends through slot 156.

Spring 142 pivots with respect to extension 150 at spring pivot 152. The position of spring pivot 152 is fixed with respect to extension 150, however, spring 142 can rotate about pivot 152. The position of extension 150 is also in a fixed relationship to parallelogram link 126. Thus, the position of spring pivot 152 is also fixed with respect to parallelogram link 126. This preserves the geometry, even as parallelogram links 126, 128, 130, 132 pivot about parallelogram pivots 134, 136, 138, 140, regardless of the height or whether lifting chair 100 or lifting mechanism 104 is in sitting mode or standing mode. This relationship is also maintained regardless of the weight of the occupant.

When spring pivot 144 is positioned in slot 156 toward the rear of lifting chair 100 or lifting mechanism 104, such as shown in FIGS. 19B, 20B, the virtual lifting lever arm will be shortened and lifting power will be minimized and lifting action caused by action of parallelogram frame 124 on spring 142 will be more iso-elastic. This position will typically be more suitable for an occupant with a lower weight. As the spring axle is placed closer to the front of lifting chair 100 or lifting mechanism 104 along slot 156, power will be maximized and lifting caused by action of parallelogram frame 124 on spring 142 will be less iso-elastic. This will be beneficial for an occupant with a greater weight. As used herein, "iso-elastic" means constant elasticity over the excursion of the lifting mechanism. Perfect iso-elasticity may not necessarily be achieved or desired, but relative iso-elasticity can be affected by the adjustment mechanism. In theory, the weight of the occupant should be balanced by the force of the spring throughout the excursion of the lifting mechanism. For occupants with greater weights though it may be desirable to have a variation in power at the beginning or end of the excursion as compared to the remainder of the lifting excursion.

The spring pivot 144 can be adjusted along slot 156 by rotating adjustment knob 180. Slot 156 is positioned on parallelogram frame 124 strategically with respect to the position of parallelogram pivot 144 to obtain optimum or beneficial iso-elasticity. The position of pivot 144 within slot 156 with respect to pivot 138 determines the efficiency of spring angle, and thus the force it exerts with respect to parallelogram frame 124. In an exemplary embodiment, spring pivot 144 in slot 156 is displaced from the position of parallelogram pivot 138. Adjustment of spring pivot along slot 156 will generally be easiest when spring 142 is perpendicular to slot 156.

Figure 65:
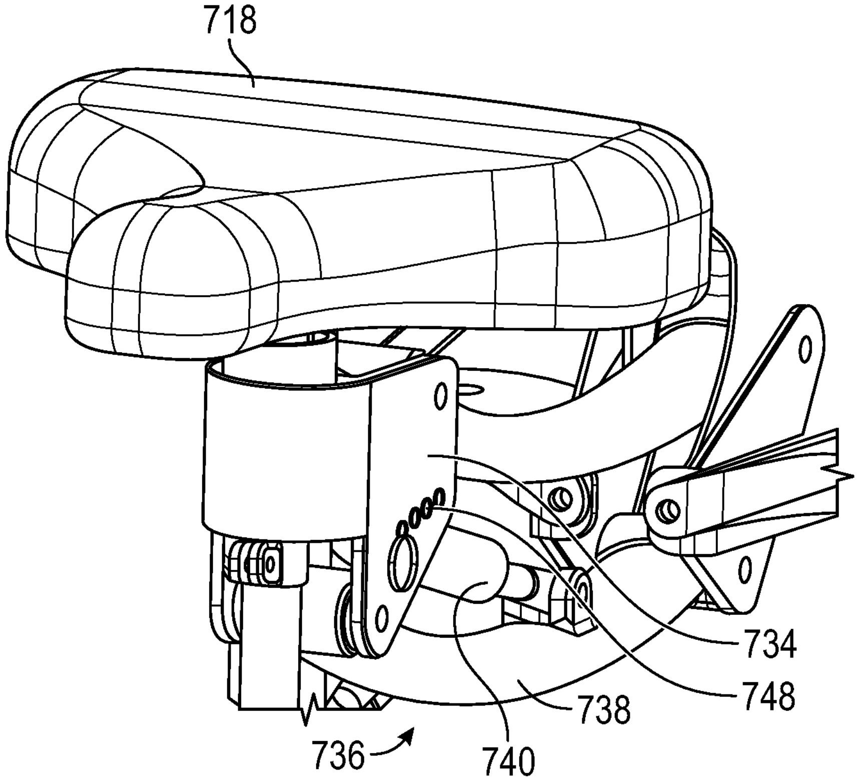
FIG. 65 depicts an isometric view of a portion of an elevating walker chair having a seat attached to a central lifting mechanism.

In the illustrative embodiment shown in FIGS. 1-24, lifting mechanism 104 is symmetrical so components identified in side views may be duplicated when viewed from the opposite side. Embodiments also include structures with single parallelogram, spring structures or single support components, such as shown in FIG. 65.

In an illustrative embodiment of lifting mechanism 104, the aspect ratio of the sides of lifting parallelogram 124 is relatively low. Even when adjusted for maximum lifting power, an outsized amount of resilient force is exerted against a relatively short 'lever arm,' which is an extension contiguous with or fixedly attached to a linkage or side of parallelogram 124. In an illustrative embodiment, the aspect ratio is 6:1, or approximately 6:1. See FIGS. 25-29 for an example of a virtual lever arm 402.

When adjusted for minimal lifting force, for example by a pin and hole adjustment or a slot in which a pin or similar component can slide, these lever arms are shorter still—reduced in length by as much as 80%, and yielding aspect ratios up to 24:1. An illustrative aspect ratio range is 6:1-24:1. The optimum aspect ratio may depend, for example, on the lifting power of the resilient member and the lever arm. The resilient member in any of the lifting mechanisms described herein may be a spring, for example, such as a gas spring. For simplicity, the resilient member may be referred to and depicted as a spring or gas spring, however, other resilient members may be used.

Illustrative lifting angles of lifting mechanism 104 will now be described. Additionally, this illustrative embodiment will show that at any lifting adjustment, from weakest to strongest, seat 114, or other payload, may rise to the same altitude when the spring is fully extended. This feature may be very desirable because the raised seat presents itself at a consistent height, instead of projecting higher and more forward for lighter users.

FIGS. 25-29 depict measurements related to lifting mechanisms 104, 350 (the latter to be described below) at various heights and with various adjustments, and analogously to lifting mechanism 602. The measurements include a lifting angle 394, slot angle 396, the distance between parallelogram pivots 354 and 358, or between parallelogram pivots 352 and 356, as these distances are equal to one another, the distance between parallelogram pivots 356 and 358, or between parallelogram pivots 352 and 354, as these distances are equal to one another, and the distance between lifting spring termination pivot 366 and main pivot 352. Although referred to as a "slot angle" the angle can pertain to a series of holes. The distance between parallelogram pivots 354 and 358 or between parallelogram pivots 352 and 356 will be referred to as the parallelogram short link length 398, and the distance between parallelogram pivots 356 and 358 or between parallelogram pivots 352 and 354 will be referred to as parallelogram long link length 400. The distance between lifting spring termination pivot 366 and main pivot 352 will be referred to as the termination pivot distance 402.

Lifting angle 394 is the angle between the line connecting upper lifting spring pivot 364 and lifting spring termination pivot 366 (i.e. spring axis 148) and the line connecting lifting spring termination pivot 366 and main pivot 352. The line 402 between lifting spring termination pivot 366 and main pivot 352 acts as a "virtual lever arm" or "lever arm" on parallelogram 382. Slot angle 396 is the angle between the line connecting upper lifting spring pivot 364 and lifting spring termination pivot 366 and the line along which lifting spring termination pivot 366 can be adjusted in slot 368. Slot angle 396 merely illustrates the potential path of lifting spring termination pivot 366 as the length of lever arm 402 changes.

Figure 25:
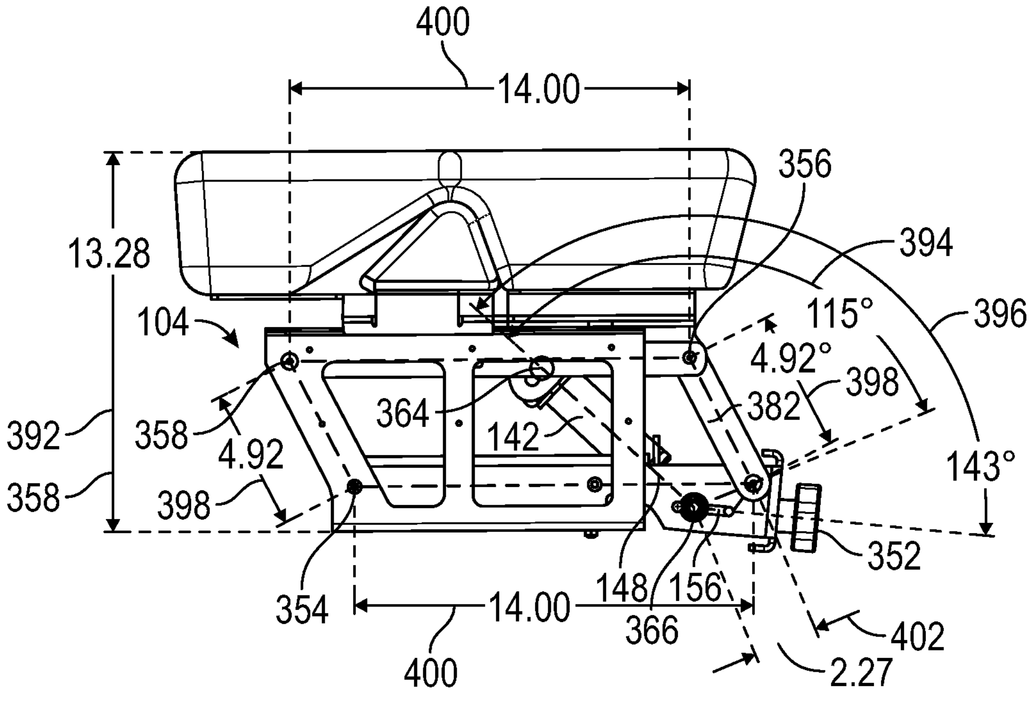
FIGS. 25-29 depict measurements related to lifting mechanisms 104, 350 (the latter to be described below) at various heights and with various adjustments.

FIG. 25 depicts an illustrative embodiment, wherein the parallelogram is level or approximately level. A 2.27" lever arm 402 is shown with a lifting angle 394 of 115°. Illustrative ranges of lever arm length positions include 1.0 inches to 4.0 inches, and 2.0 inches to 3.0 inches. Illustrative adjustment amounts include 0.75 inches to 1.25 inches and 0.9 inches to 1.0 inches.

For the seated configuration of the chair cushions, as shown in FIG. 25, this oblique lifting angle sufficiently reduces the effective spring force to yield iso-elasticity or near iso-elasticity for the chair cushion at and near its lowest position.

Figure 26:
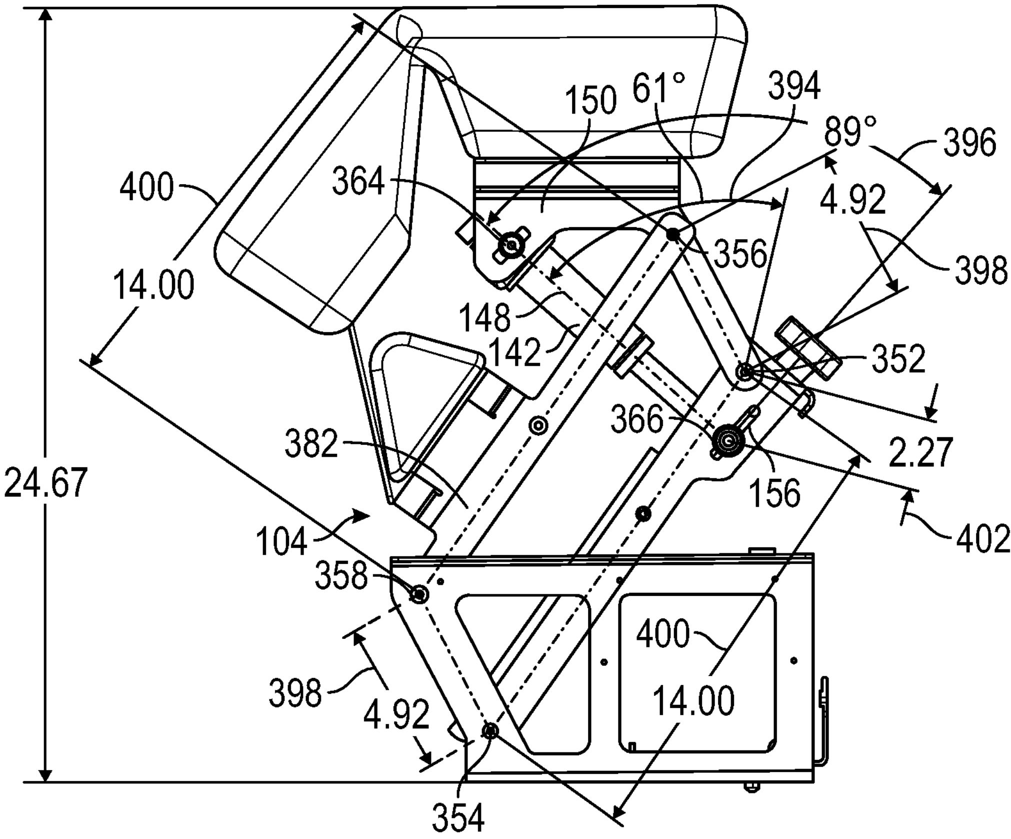

As can be seen, for example, in FIG. 26, lifting mechanism 104 elevates rear seat section 118 while it remains substantially level or at a selected angle to the horizontal it was in when in the lower position, by virtue of extension 150 remaining horizontal. Lifting mechanism 104 also moves seat 114 forward. When transitioning to a standing mode, front seat section 116 is angled downward as mid-section 120 moves away from its position supporting front-seat section 116 and rear seat section 118 as positioned in the sitting surface. If seat 114 is moved rearward, optimum lifting angles may differ. Lifting forward generally requires less lifting force as compared to the lifting force that may be required when lifting toward the rear, because the user of lifting chair 100 will have their weight entirely or nearly entirely on their feet when they reach an elevated position, rather than still considerably supported—as in the case of rearward lift which may cause the user to lean back.

In an illustrative embodiment, a lifting force between 50%-70% of a user's weight is used. This range may be suitable, for example, for use with a lifting chair having arm rests on which a user can push down. Absent armrests, the optimum lifting force may be greater, for example 70%-95% or greater of an occupant's weight.

FIG. 26 depicts lifting mechanism 104 at its highest parallelogram excursion. With the same 2.27" lever arm, lifting angle 394 is diminished to 61°, which, in this embodiment, is just past its most efficient (90°) angle. This is appropriate for 'forward' lifting parallelograms, as lifting ability may need to diminish when approaching its highest position.

The oblique lifting angle 394 when lifting mechanism 104 is at its highest position diminishes the force sufficiently so that the payload lifting force is equipoised or near equipoised, and thus 'iso-elastic' or near 'iso-elastic.'

FIG. 26 shows a slot angle 396 of 89 degrees, which diverges considerably from the lever arm lifting angle of 115 degrees. This slot angle 396 is selected because it exhausts the travel of the fully extended spring 142 at similar elevations, regardless of the adjusted position within slot 156. In fact, if slot 156 is curved (and the lead screw on a pivot) all positions along slot 156 could coincide with the ultimate extension of spring 142, and thus yield identical heights for seat 114 at any lift adjustment.

Figure 27:
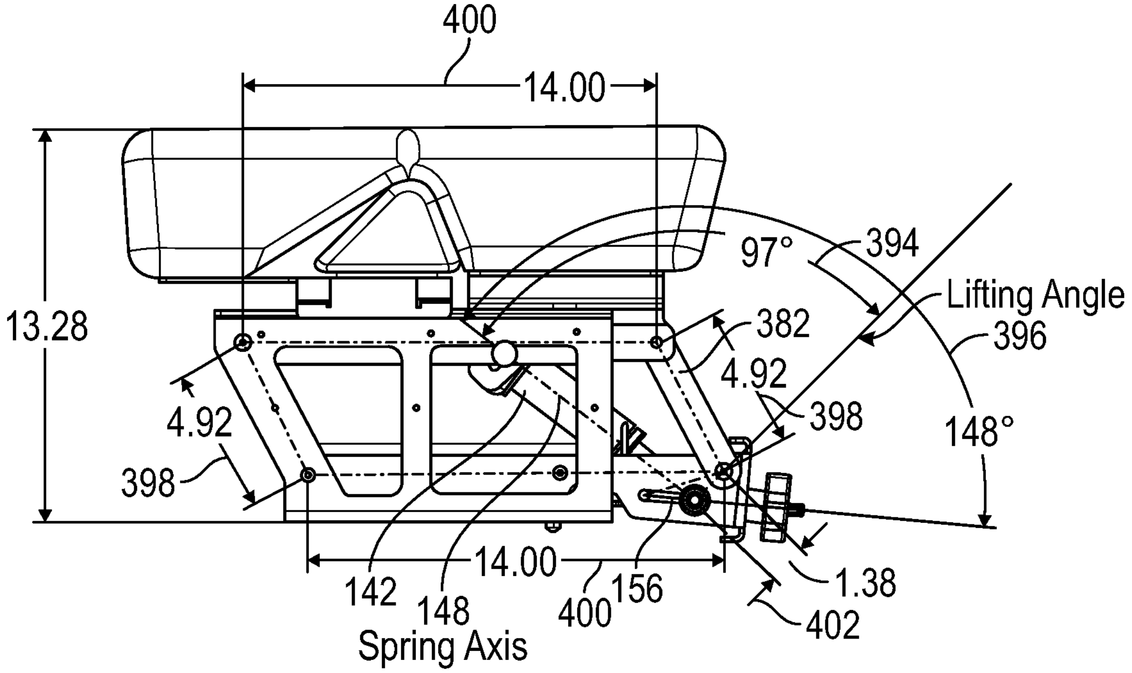
Figure 28:
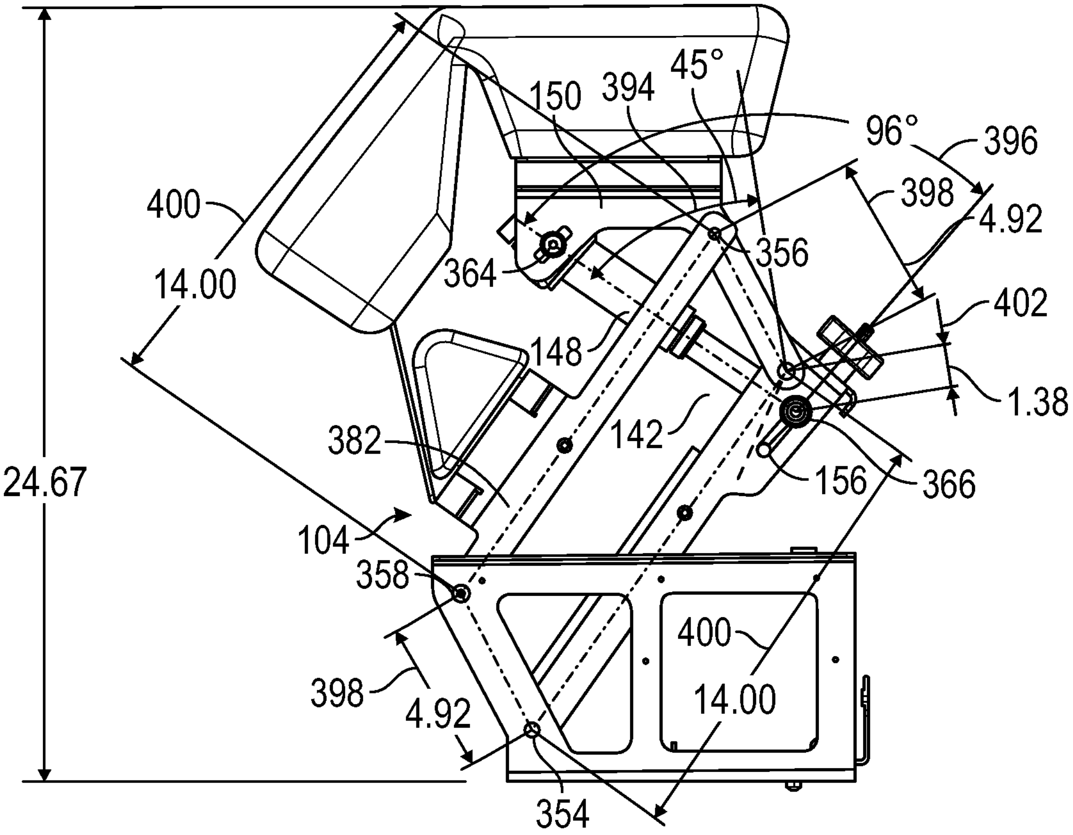

FIGS. 27 and 28 depict low and high excursions of parallelograms 382, respectively. FIGS. 27 and 28 illustrate the resulting lifting angles 394 that are obtained between lever arm 402 and spring axis 148, when lift is adjusted to be minimal (with the spring pivot placed as far as possible toward the rear of this embodiment). Note that in the seated position, spring 142 is lifting against a highly efficient, near-90° lever arm 402 at a lifting angle 394 of 97°

In the high 'stepping off' position, as shown in FIG. 28, note that with a minimal adjustment along slot 156, lifting angle 394 is an inefficient 45°, which stops seat 114 from pushing too energetically forward. This is important; not only would it be harmful to propel the occupant away from the chair, the force required to start the seat/cushion descending would also likely cause the entire chair to skip backward when approached by a would-be user.

Illustrative embodiments, for example those shown in FIGS. 25-28, have the lifting mechanism 104 under seat 114. This same lifting geometry can be used to lift a seat/cushion with the lifting mechanism split into two cooperative lifting parallelograms positioned on either side or on both sides of the lifting chair, such as shown for example in FIGS. 29-32. Lifting mechanism 104 incorporates a central spring 142, or a group of adjacent springs disposed between two parallelograms 124. While lifting mechanism 350 may include two springs 362 on opposing sides of lifting mechanism 350, each associated with a parallelogram 382, it may be constructed with a single spring 362 associated with a single parallelogram 382.

Figure 35:
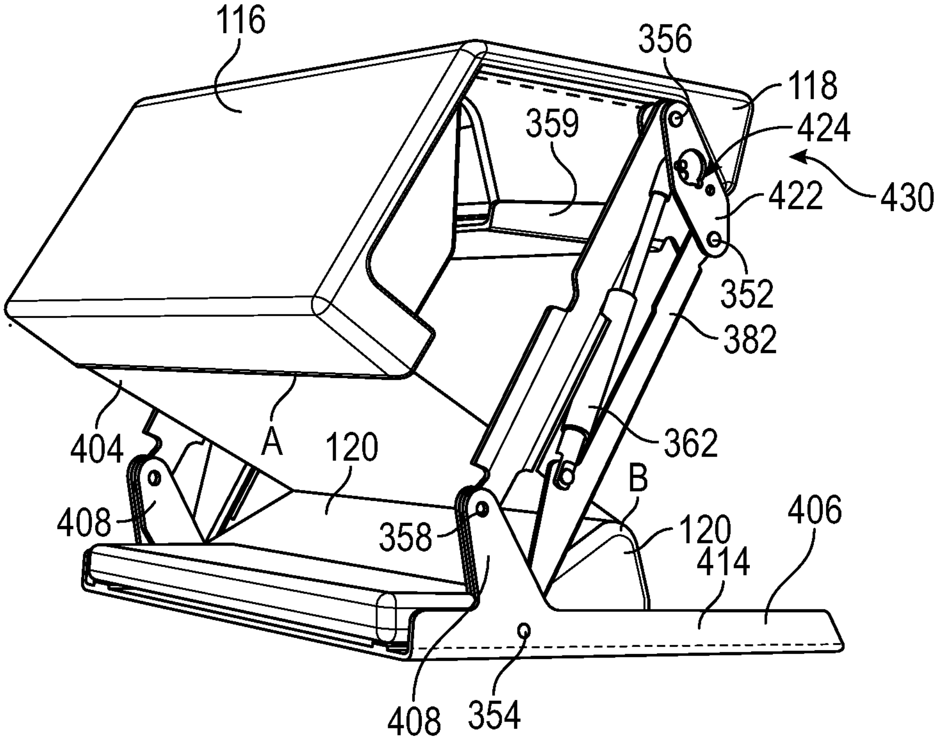
FIG. 35 depicts an isometric view showing a restraining panel when the lifting mechanism is in an elevated position.
Figure 36:
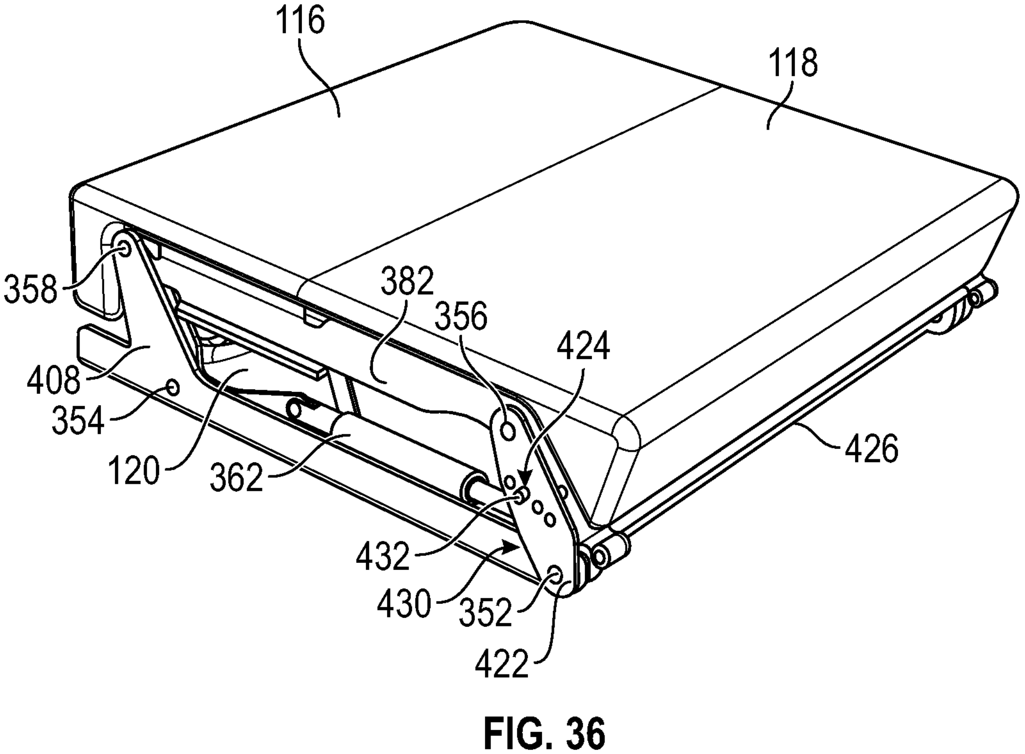
FIG. 36 depicts an isometric view of lifting mechanism 350 with seat 410 in a folded mode for a better visualization of the apparatus

Rear end blocks 422 of parallelogram 382 are interconnected by a cross-tube or bar 426, such as shown in FIGS. 35, 36. Flanges may be included to support the rear cushion such as part 359 shown, for example, in FIG. 35. It is noted that spring 362 may be of the same type as spring 142.

The pivots of parallelogram 382 are designated as 352, 354, 356, 358 with the main pivot referred to with reference number 352, but it will be understood that the configuration of the parallelogram links and adjustment mechanism may vary from other lifting mechanism embodiments disclosed herein.

In the lifting mechanism 350 embodiments, base frame 406 includes the forward parallelogram end blocks 408 on either side of the cushion when seat 410 is in a sitting mode. Mid-seat support section 120 is fixed to a transverse connecting floor 412 of base frame 406. Transverse connection floor 412 connects sidewall 414, 416 to base frame 406. Although cushions are referenced, analogous lifting mechanisms having sitting and standing modes can be constructed without cushions, and instead provide any surface sufficient to support a user in a reasonably comfortable manner. It is also noted that the cushions can be integral with lifting mechanism support sections. By "integral" it is meant that the cushions are affixed either permanently or removeably to seat support section of the lifting mechanism.

In integral cushion versions of lifting mechanism 350 embodiments, mid-seat section 120 likewise serves to fill in the fold cutaway adjacent to the interface of front seat section 116 and rear seat section 118 in the seated position. Unlike other disclosed versions wherein lifting mechanism 350 is disposed under the middle of seat 114, and must raise mid-section 120 as the parallelograms rise, lifting parallelograms 382 are in the clear on either side and permit mid-seat section 120 to remain fixed in position with respect to transverse connecting floor 412. By "raising parallelogram 382" it is meant that components of parallelogram 382 may rise up, but not all portions will necessarily be raised. For example, in FIG. 26, pivot 354 remains in place, and a portion of the lowest link of parallelogram 382 may even extend below its original position.

Figure 29:
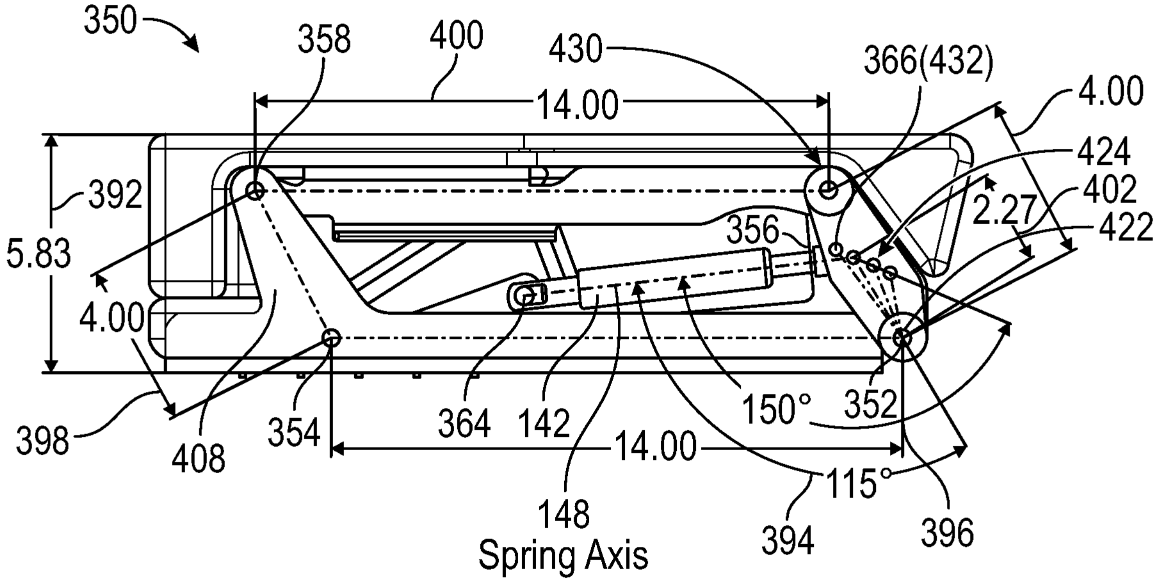

FIG. 29 depicts lifting mechanism 350 with links of parallelogram 382 horizontal (such in an illustrative seated position), and having an arcuate series of holes 424 to adjust the position of the spring termination 366. The arc of holes 424 has a radius equal to the length from the spring termination point to spring pivot 364 in place of slot 368 when spring 142 is fully extended. Although holes 424 form an arc, their centers can be used to closely approximate points to define a ray defining a slot angle 368. As such, slot angle 368 is shown on FIGS. 29, 31, 32 for an approximate comparison to configurations having an adjustment mechanism comprising a slot 368. "Slot angle" 396 is 150° in the illustrative embodiment of FIG. 29. The length of lever arm 402 is illustrated to be 2.27" and lifting angle 394 is 115°, which here extends between the lower parallelogram pivot 352 and the second-to-farthest hole from the rear (the farthest hole would provide additional lift). Slot angle 396 is the same regardless in which hole lifting spring termination pivot 366 is located.

Figure 30:
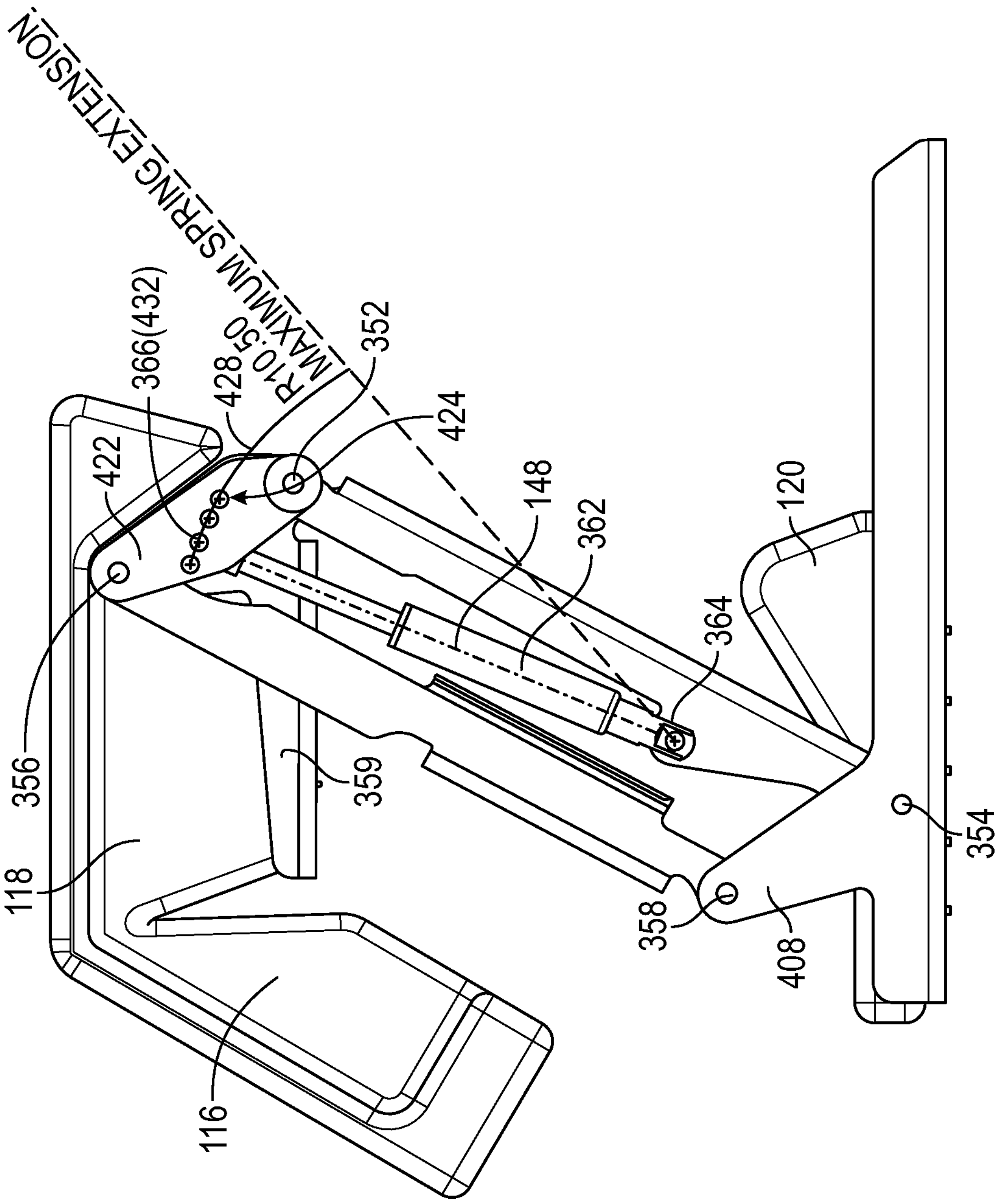
FIG. 30 depicts a lifting mechanism with the spring at a maximum extension for a standing position.

Because spring pivot 364 is at the center of the arc of the arc of holes 424 only when spring 142 is fully extended, adjustments to the effective lifting force by changing the hole location of lifting spring termination pivot 366, can only be made when spring 142 is fully extended. This is illustrated by comparing FIG. 29 with FIG. 30. In FIG. 29, lifting mechanism 350 is in its lowest position and spring 142 is compressed. Spring pivot 364 is not at the center of the arc along which holes 424 are disposed. Therefore, in the lowest mode, spring 142 cannot be rotated any aligned with each of holes 424. FIG. 30 depicts lifting mechanism 350 at its highest position. Spring 142 is fully extended, and spring pivot 364 is at the center of the arc along which holes 424 are disposed. In this configuration, spring 142 can be rotated about spring pivot 364 and will align with any of holes 424, and thus, lifting force adjustments can be made.

FIG. 30 depicts lifting mechanism 350 in an elevated position. Rear seat section 118 is retained in a horizontal position by virtue of extension 359 remaining horizontal. Extension 359 may also be design to maintain a given or selected angle from the horizontal. Extension 359 operates in an analogous manner to extension 150. As front seat section 116 and rear seat section 118 move away from stationary mid-seat section 120, front seat section 116 is free to drop downward to allow a user to move into a standing position. Front seat section 116 and rear seat section 118 may be connected by a hinge made of rigid or soft materials or a combination of the two types of materials. For example, a fabric such as cloth, leather or vinyl can connect front section 116 and rear section 118 and allow front section 116 to drop downward while remaining attached to rear section 118. In addition or alternatively, a pivot such as pivot 122 shown in FIG. 5 may be used in an illustrative embodiment. It is noted that for simplicity front seat section 116, rear seat section 118 and mid seat section 120 include any cushioned, upholstered or base component, although those individual components may be also identified separately. Seat 114 includes front seat section 116, rear seat section 118 and mid-seat section 120.

Holes 424 may be incorporated on rear end blocks 422 on either side of lifting mechanism 350. Alternatively, holes 424 may be employed on one end block 422 and a slot and peg may be used on the opposite end block 422. See FIG. 42 for an illustrative spring axle pin 432. Or, if only one parallelogram 382 lifting structure is employed then arcuate series of holes 424 is on the single end block 422 used. The radius 428 of the arc of holes 424 in this embodiment extends from the spring (resilient member) pivot 364 to lifting spring termination pivot 366 that is coincident with a selected hole 424. In an illustrative embodiment, radius 428 equals the 10.5 inches pivot 364 center to pivot 366 center distance of the fully extended spring 362 or springs when parallelogram 382 is raised to its maximum height. An illustrative radius range is 9 inches to 12 inches.

The effective lifting force can be adjusted by pulling a spring axle pin 432 out of selected hole 424 and swinging spring 362 up toward a more forward hole (stronger) or down toward a more rearward hole (weaker) to another hole 424. For a configuration with springs 362 on opposing sides of lifting mechanism 350, since the spring on the opposite side still holds the seat/cushion up to the same elevation, the holes 424 remain aligned to permit insertion of spring axle pin 432 into any hole. Then the opposite side spring axle pin 432 can be repositioned while the near one keeps the seat/cushion at maximum height. This alternate double-sided adjustment procedure provides a Vernier effect, since adjusting by one hole on one side yields just half the change in lift as repositioning both spring axle pins 432. This feature may provide a convenient way to select a sufficiently fine adjustment over a broad range of lift settings.

Figure 31:
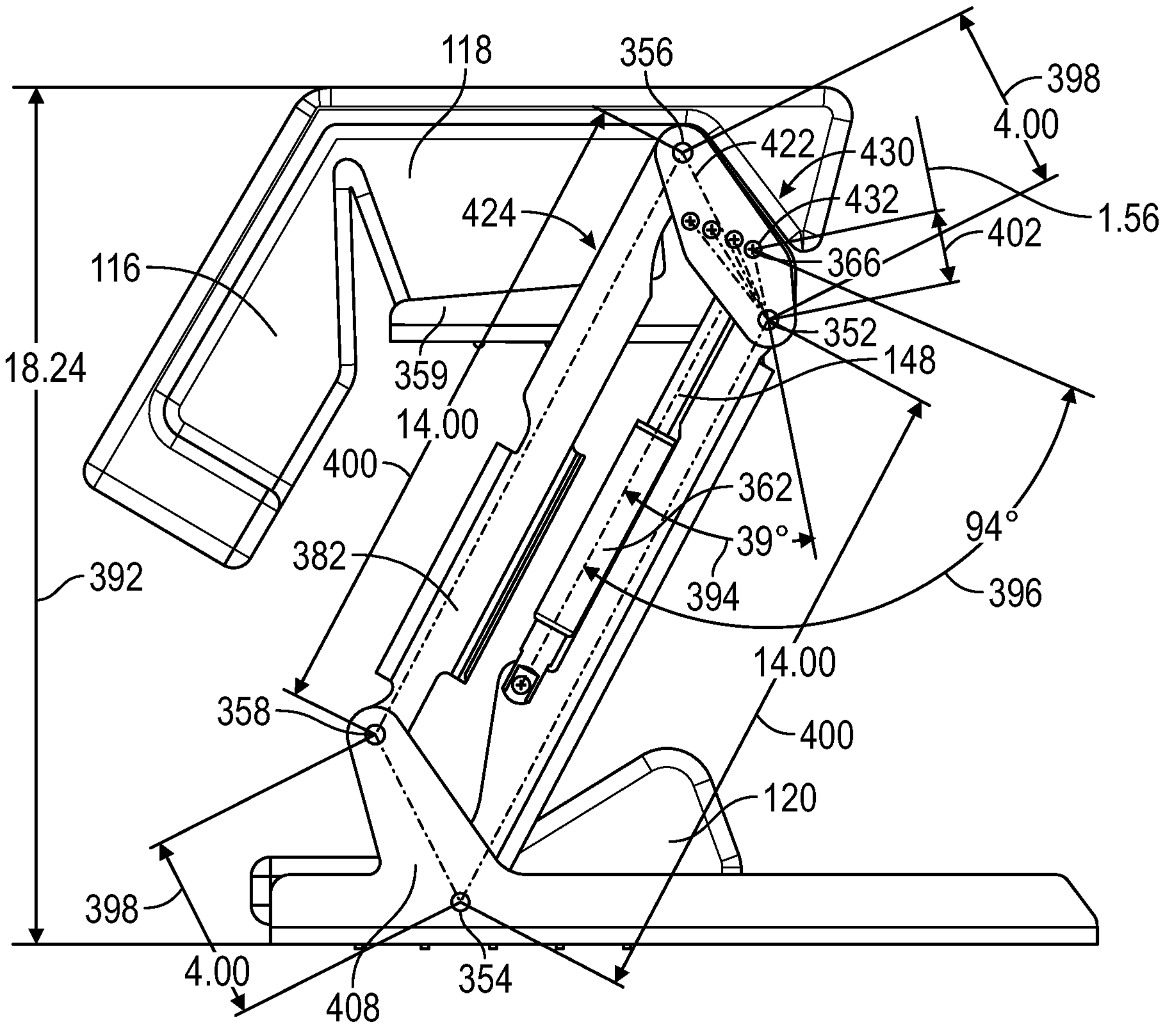
FIG. 31 depicts a lifting mechanism with the spring at a maximum extension for a standing position.

FIG. 31 shows how the minimal lift position of spring axle pin 432, i.e. the most rearward hole position, affects lifting angle 394 versus the spring axis 148. At the rearward most position spring 362 powers against a relatively short 1.56" lever arm 402, thus pushing at an inefficient lifting angle 394 of just 39 degrees to counter the deviation from iso-elasticity caused by lowering the aspect-ratio of the lifting triangle. The three sides of the "lifting triangle" include: 1) the length of spring 362. i.e. the distance from lifting spring pivot 364 to lifting spring termination pivot 366, 2) the distance from lifting spring termination pivot 366 to main pivot 352, and 3) the distance from main pivot 352 to lifting pivot 364. This adjustment mechanism, yields a nearly 2:1 variation in lifting power from the forward most hole 424 to the rearward most hole 424.

It is noted that the specifications provided, such as for the lifting angles, slot angles and lever arm lengths, are for illustrative embodiments only. These specifications may be varied, for example, to accommodate users of different weights and abilities.

The effective lifting power can be selected to allow an occupant to supplement their own abilities to stand up from a sitting position in a chair having lifting mechanism 350. For example, with an illustrative spring force of 3200N at a 50 percent progression rate, this range of adjustment should lift approximately half of the weight of persons between 100 lbs. and 200 lbs. and empower them to easily rise up from low armchairs, or other apparatus or furniture containing lifting mechanism 350. An illustrative spring force range is 3000N to 3500N. An illustrative force progression range from fully extended to fully compressed is 45% to 55%. In an illustrative embodiment spring 362 has a stroke range of 75 mm to 85 mm and an uncompressed length in the range of 200 mm to 275 mm. Springs 362 may be for example compression springs such as gas springs. Other illustrative types of springs include tension springs (which would need to be deployed oppositely on the parallelogram to provide comparable lifting force).

In this illustrative embodiment, appropriately small-diameter gas-springs, for example in the range of 23 mm diameter to 28 mm diameter, may fit within narrow parallelogram mechanisms on either side of the folding cushion. When rear seat section 118 rises up, rear seat section 118 can be attached at its rearward edge to a loose envelope of cushion fabric (not shown), which would also be attached to the lower edge of a seat back so that the lifting mechanism is concealed and protected, even in the raised state.

Figure 32:
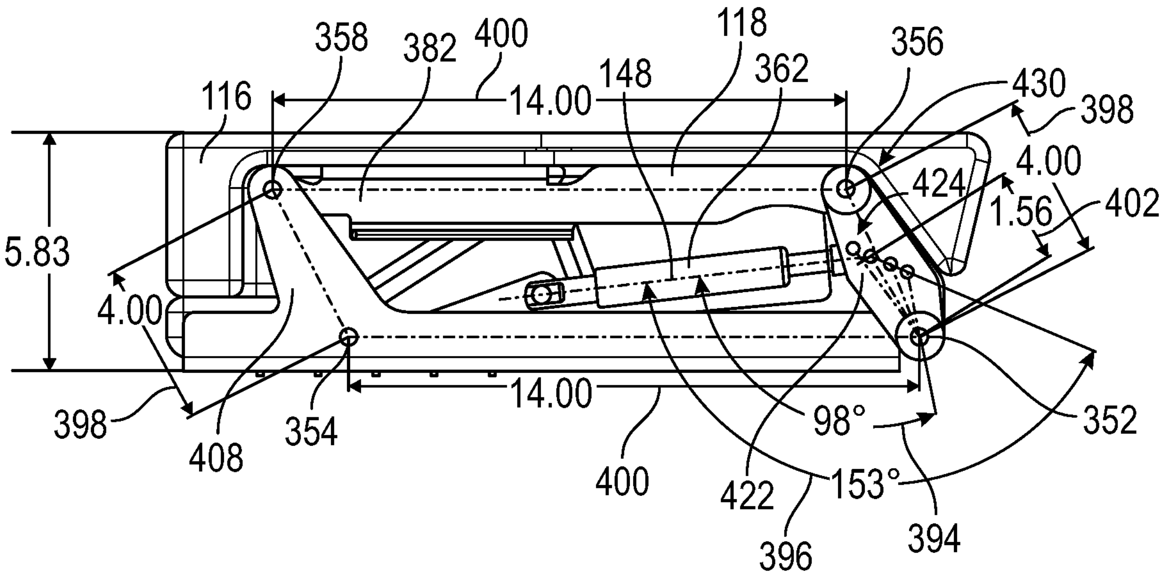
FIG. 32 shows how the minimal lift position of the spring axle pin in the most rearward hole position affects the lifting angle versus the spring axis.

FIG. 32 shows how the minimal lift position of the spring axle pin in the most rearward hole position affects the lifting angle versus the spring axis, providing a lifting angle 394 of 98 degrees and a "slot angle" 396 of 153 degrees.

FIG. 29 depicts an illustrative geometry of lifting mechanism 350 in which lifting spring termination pivot is in the forward most hole and the mechanism is in the seated position, at the illustrative lever arm length 402 of 2.27".

Figure 33:
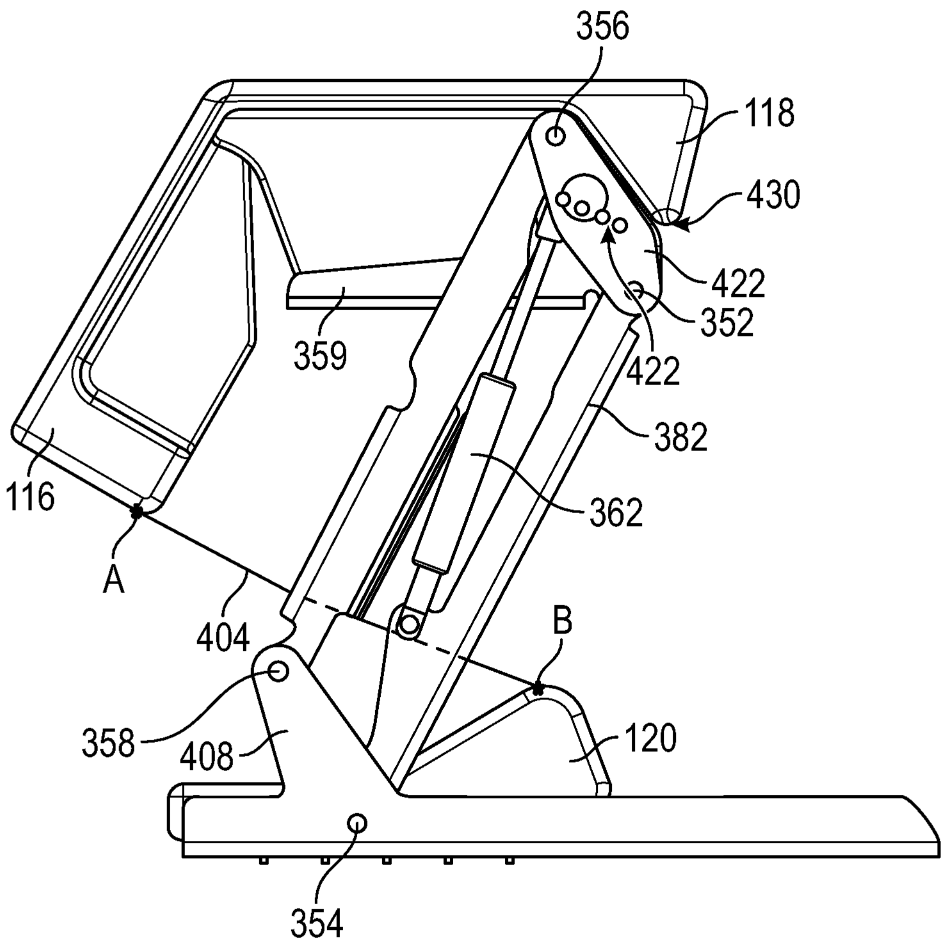
FIG. 33 depicts a lifting mechanism having a restraining panel extending between points "A" and "B".

As shown in FIG. 33, to control or assist in the control of position of front seat section 116 of the rising seat 410, a restraining panel 404 may be included. Restraining panel 404 may be attached between the forward lower edge of front seat section 116 and a suitable point, in this illustrative case the apex of mid-seat section 120, so that restraining panel 404 keeps front seat section sufficiently folded downward and out of the way of the occupants knees throughout the upward and downward excursion of seat 410. In an illustrative embodiment, restraining panel 404 is a non-stretch material, that may be cloth or other flexible material.

Illustrative heights 392 of seat surfaces from ground are depicted in FIGS. 25, 29 and 31, and include 13.28 inches, 5.83 inches and 18.24 inches, respectively. The 5.83 height depicted in FIG. 29 corresponds to the seated height, whereas the height depicted in FIG. 31 corresponds to an elevated height. As the thickness of cushions can vary and the disclosed lifting mechanisms can be configured to be utilized without cushions, the important distance is the change in height of the sitting surface from the lowest position to the highest lifted position. Illustrative vertical distance position changes from sitting mode to standing mode are 8 inches to 16 inches, and 11 inches to 13 inches.

FIG. 33 shows restraining panel 404 extending between points or edges "A" and "B". Points or edges "A" and "B" are selected so that restraining panel 404 performs a restraining function and may remain in tension throughout the excursion of lifting mechanism 350 and lies under the seat 410 in a seated position.

Figure 34:
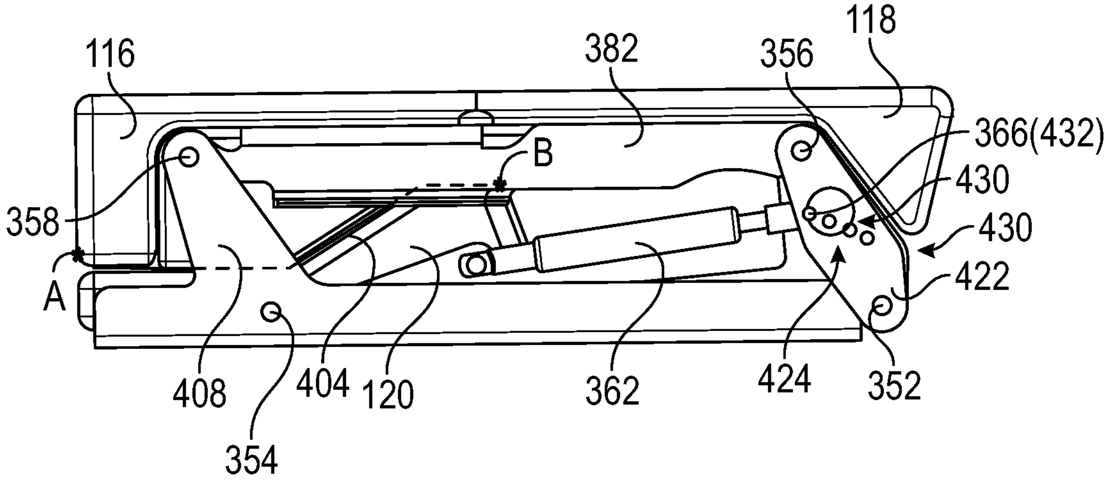
FIG. 34 shows a restraining panel position when the lifting mechanism is its lowest position.

FIG. 34 shows a diagram of the position of restraining panel 404 when the seat is at its lowest position.

FIG. 35 depicts an isometric view of lifting mechanism 350 and seat 410 in an elevated position. In this illustrative embodiment, restraining panel 404 has attachment lengths along a lower forward edge of front seat section 116 and along the peak of mid-seat section ("wedge") 120.

Opposing lifting parallelograms 382, having incremental 'hole' adjustment mechanisms 430, allow spring axle pins 432 to be removed from both sides and the front seat section 116 and rear seat section 118 to lie flat or as flat as designed to, with the uncompressed spring extending alongside the lowest hole, thus creating a seat 410 that looks and "acts" like a conventional chair cushion, if and when desired. This configuration may also be suitable for transporting and relocating the lifting mechanism to a different chair or other apparatus.

In an illustrative embodiment, setup and restoration to its lifting chair mode would only require lifting the rear seat section 118 until one spring axle pin 432 can engage spring cap 434 through any hole 424, and then alternately repositioning spring axle pins 432 from one side to the other, for the desired amount of lift.

FIG. 36 depicts an isometric view of lifting mechanism 350 with seat 410 in a folded mode for additional visualization of the apparatus. As noted above, bar 426 is shown that connects opposing lifting mechanisms 350. Bar 426 can provide support to the apparatus and maintain the positions of opposing lifting mechanisms 350 with respect to one another. If only one lifting mechanism 350 is present in the lifting apparatus, bar 426 may still provide structural support and maintain the integrity of the relative positions of frame components or other parts on opposing sides.

Figure 37:
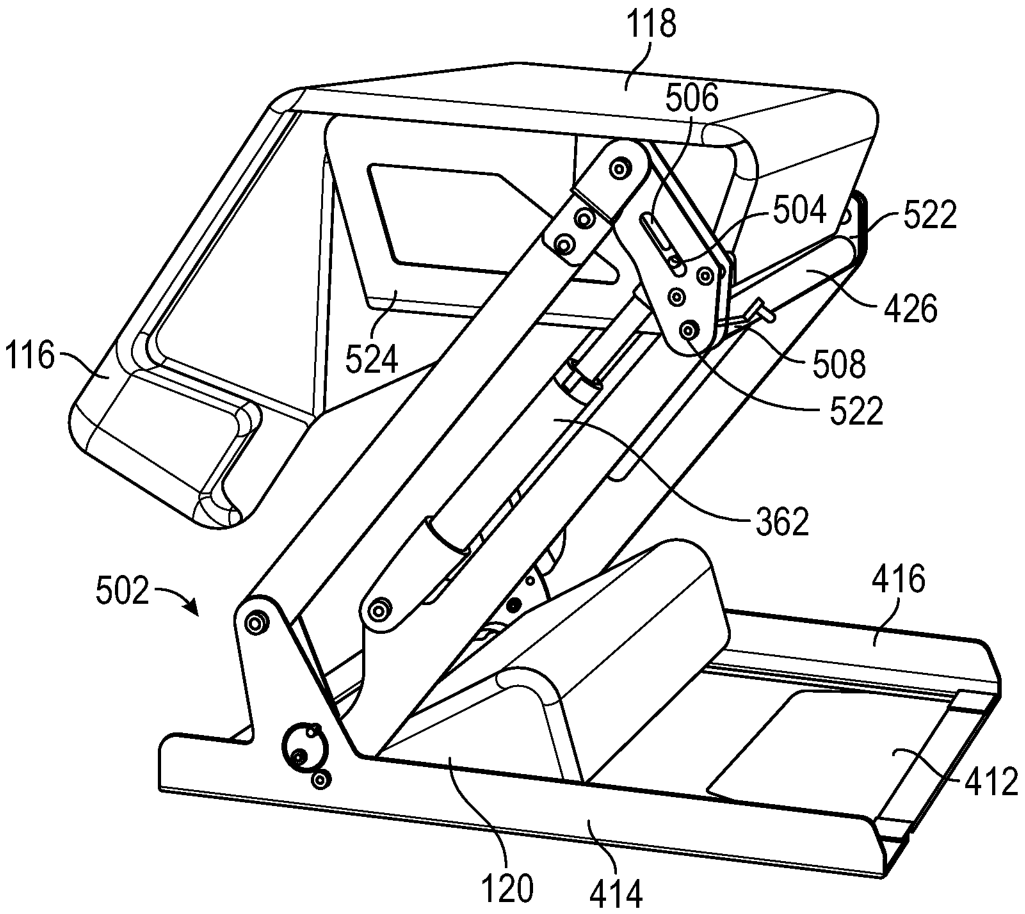
FIG. 37 depicts a lifting mechanism having a linearly adjustable spring termination pivot wherein the lifting mechanism including spring is disposed on the side of the seat.

FIG. 37 depicts an illustrative embodiment of a lifting mechanism 502 having a linearly adjustable spring termination pivot 504. Spring termination pivot 504 is adjustable along slot 506. The slot angle may be increased or decreased by a conventional lead screw, for example one turned by a folding crank 508. FIG. 37 depicts an embodiment with a linear slot 506. The slot may also be arced with the remaining lifting mechanism components suitably modified to allow spring termination pivot 504 to be adjusted with the arced slot.

Lifting mechanism 502 includes an extension 524 to maintain the angle of rear seat section 118, similarly to extensions 150, 359, 616.

Figure 38:
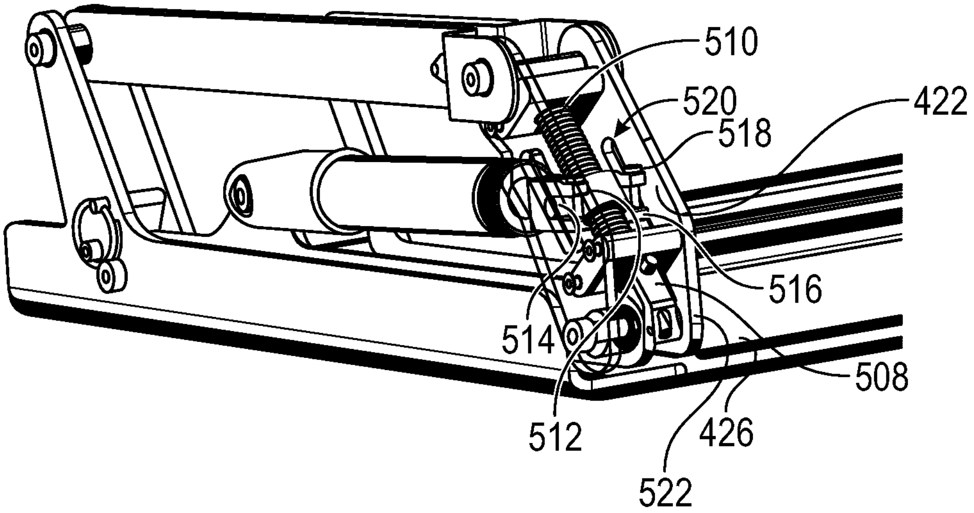
FIG. 38 is an isometric view of a portion of the lifting mechanism shown in FIG. 37, with a side of the rear end block rendered transparently.
Figure 39:
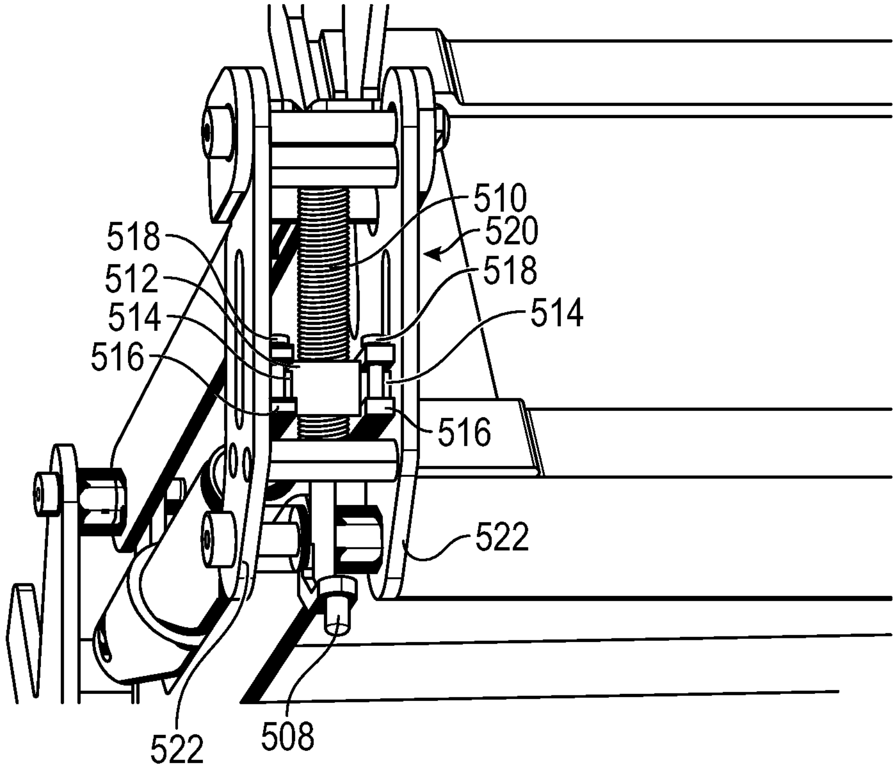
FIG. 39 is an isometric view further depicting the spring termination adjustment mechanism of FIG. 38.
Figure 42:
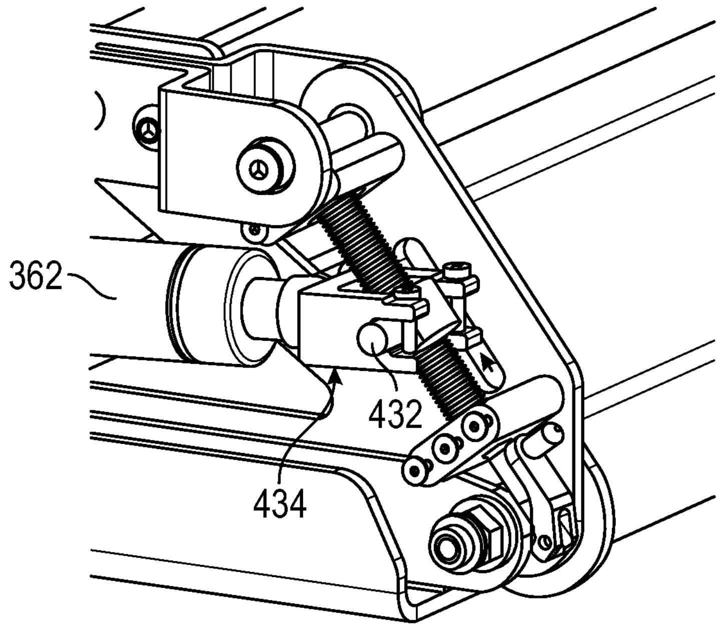
FIG. 42 depicts a spring termination adjustment mechanism.

FIGS. 38 and 42 are isometric views of the lifting mechanism 502 shown in FIG. 37, with a side of the rear end block 522 rendered transparently. FIG. 39 further depicts the spring termination adjustment mechanism 520 (also referred to as "lifting strength adjustment mechanism"). FIG. 38 shows a lead screw 510 disposed between two sides of end block 522. A traveling nut 512 can move along lead screw 510 to adjust the location of spring termination pivot 504. Traveling nut 512 has integral transverse axles 514 on each side that engage yokes 516 (to facilitate installation). Spring termination pivot 504 is also engaged in yokes 516 or components attached thereto. Keeper screws 518 capture integral transverse axles 514. Folding crank 508, used to adjust the position of traveling nut 512, is shown in a folded position.

Deploying and rotating crank 508 turns the attached lead screw 510 causing traveling nut 512 and captured spring termination pivot 504 to travel up or down lead screw 510 between minimal and maximal lifting-strength positions. Identical lifting strength adjustment mechanisms 520 may be employed on either side of apparatus. Each lifting strength adjustment mechanisms 520 may be separately adjusted for lift, which could advantageously be adjusted to approximately the positions along their respective slots. This version may therefore provide Vernier (continuous) rather than incremental adjustment.

Except for the straight slot vs the arcuate series of holes, the lifting geometry of those embodiments may be the same or substantially the same. Incremental hole adjustment mechanism 430 and linearly adjustable spring termination pivot 504 may each be employed in lifting mechanism 350. The lifting angles versus the spring axes and the weak and strong lifting positions at the rays defining the slot angles (which effectively adjust the aspect ratio of the lifting triangle operating within the parallelogram linkages), may be functionally identical.

Alternate lifting geometries may be used for the lifting mechanism. The optimum lifting-angle 394 versus spring axis 148, and slot angle 396 defined above can also be effectively implemented to apply force between various other links and elements inside and outside of lifting parallelograms 124, 382. Lifting mechanisms 104, 350 and 502 apply the lifting force between rear end blocks 170, 422 (or inside extensions of the rear end blocks) and opposing lower parallelogram links.

Figure 40:
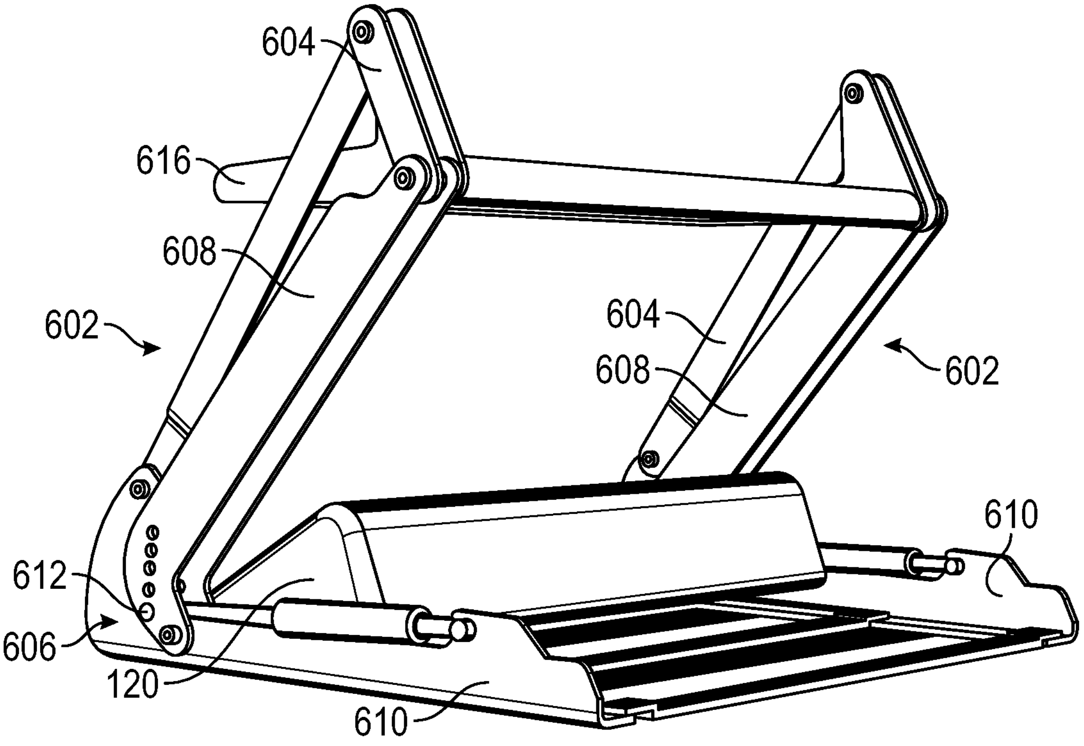
FIG. 40 is an isometric view of an alternate lifting geometry that operates according to the same principles as previously depicted embodiments but has the spring termination point adjustment at the lowest end of a long link of the parallelogram.
Figure 41:
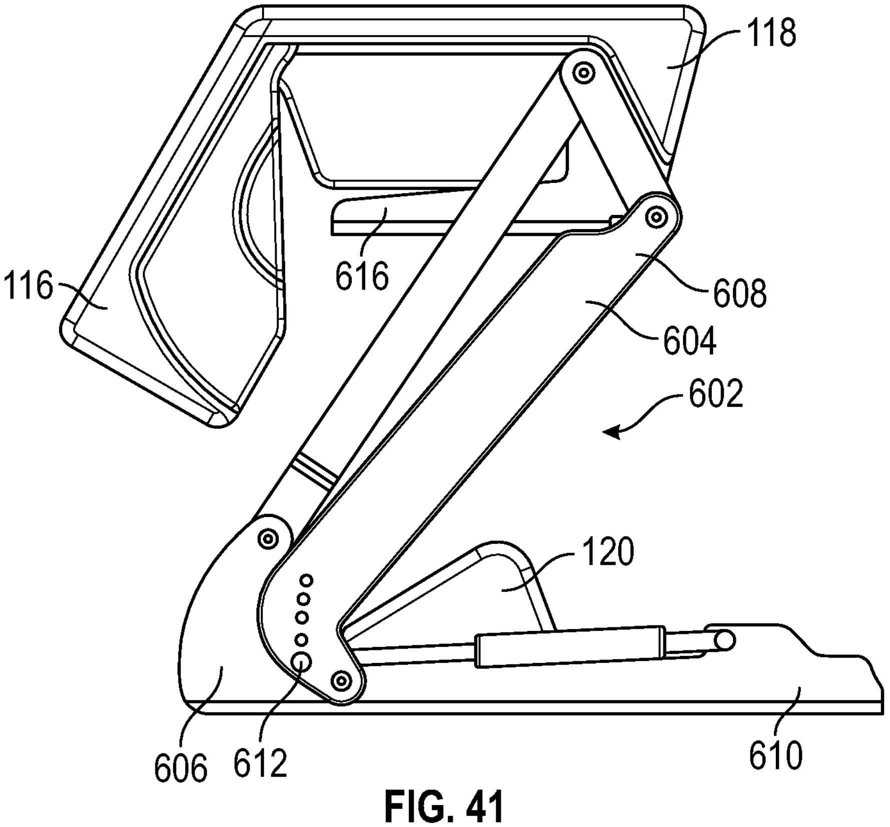
FIG. 41 depicts the lifting mechanism of FIG. 40 with cushions attached.

However, lifting mechanism 602, illustrated in FIGS. 40, 41, has an alternate lifting geometry that operates according to the same principles as those described above. The spring exerts force between the base and the rising lower links. FIG. 40 is an isometric view of lifting mechanism 602 without seat cushions attached, except for a support wedge (mid-seat cushion) 120 shown on stationary frame base 610. FIG. 41 is a side view of lifting mechanism 602, depicted with seat cushions 116 and 118 attached. FIGS. 40, 41 depict parallelogram 604 with adjustment mechanism 606. Adjustment mechanism 606 is positioned at an end of link 608 of parallelogram 604 that remains connected to stationary frame base 610 as lifting mechanism is raised. The angle of extension 616 to the horizontal or at the horizontal is maintained as lifting mechanism 602 is raised or lowered.

Adjusting pivot pin 612 is inserted in the lowest of holes 614—yielding the shortest possible lever arms for this illustrative version (and thus the lowest aspect-ratio lifting triangles), on opposing lifting mechanisms 602. Other particulars of this lifting geometry are the same as the illustrative embodiments described above.

Most or all of the disclosed lifting mechanisms are more easily adjusted when the gas spring(s) are fully extended. The unique geometry provides adequate performance as the spring end swings along an optimal and continuous arc of holes for incremental lift adjustment, or along a continuous adjustment mechanism.

The effect of the structure as described may be achieved in embodiments that follow the same design as the illustrative embodiments but are rotated, for example such that spring 142 or 362 projects toward the rear of lifting chair 100 or lifting mechanism 104, 350 or 602. See for example FIGS. 40 and 41.

The disclosed lifting mechanisms 104, 350, 602 and their reversed configurations such as noted in the previous paragraph, may be used as a lifting device for apparatuses other than the illustrative chair shown, for example, wheel chairs or elevating lifting chairs, such as is the subject of U.S. Patent Application 62/649,746, filed Mar. 29, 2018, titled Elevating Walker Chair, Lifting Mechanism and Seat, the content of which is incorporated herein). It also may be employed in chairs that are incorporated into other systems, such as vehicles or machines.

The figures show parallelograms 124, 382, 604 with four links, but an analogous lifting parallelogram may be constructed with fewer links or links of different shapes.

FIGS. 43-56 depict an illustrative elevating walker chair 700, into which any of the lifting mechanisms disclosed here can be incorporated. Elevating walker chair 700 has a sitting mode in which the seat or saddle 718 is in a lowered position, and a standing or walking mode in which seat 718 is raised to allow an occupant to walk while being supported by the elevating walker chair.

FIGS. 43-56 depict a lifting mechanism having springs on opposing right/left sides of elevating walker chair 700, similar to lifting mechanism 350. Other lifting mechanisms, such as dual-spring lifting mechanism 602, or single spring lifting mechanism 104, can also be incorporated into an elevating lifting chair.

Figure 49A:
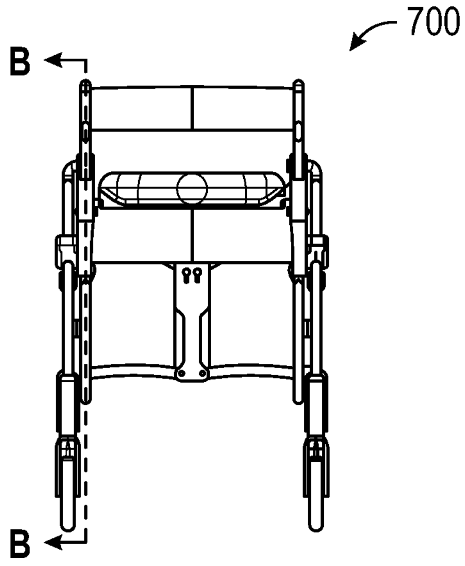
FIGS. 49A-C show a step in the adjustment of the lifting mechanism.
Figure 49B:
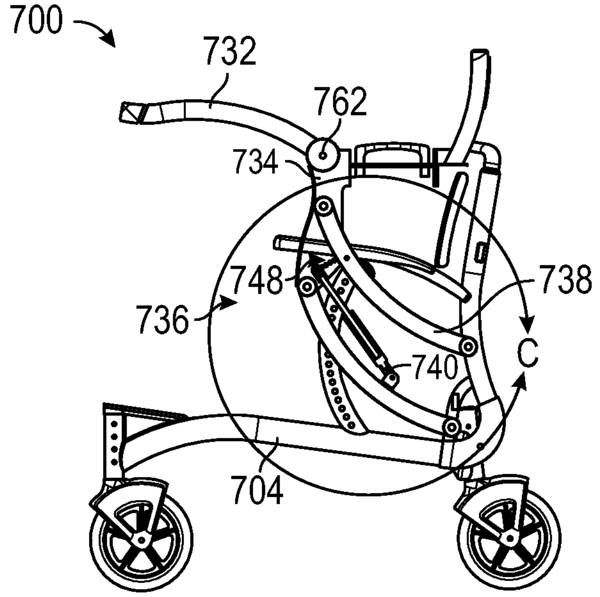
Figure 49C:
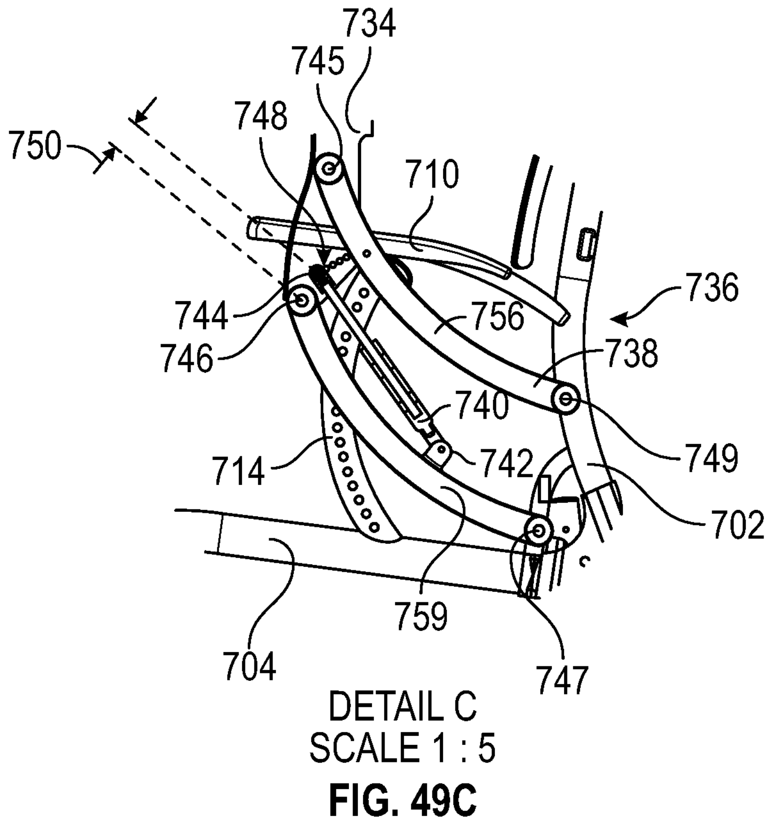
Figure 50A:
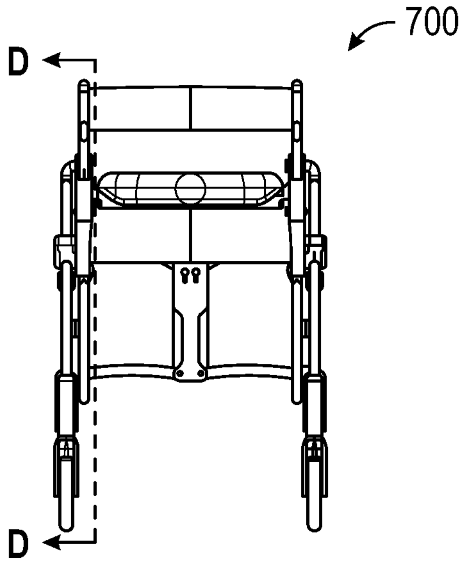
FIGS. 50A-C show a step in the adjustment of the lifting mechanism.
Figure 50B:
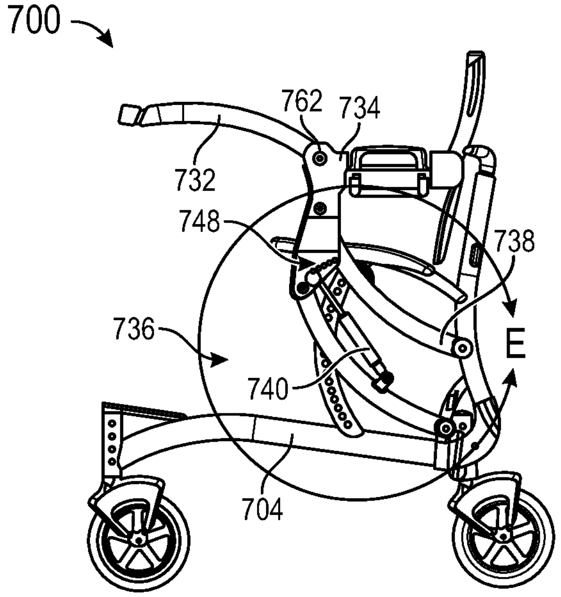
Figure 50C:
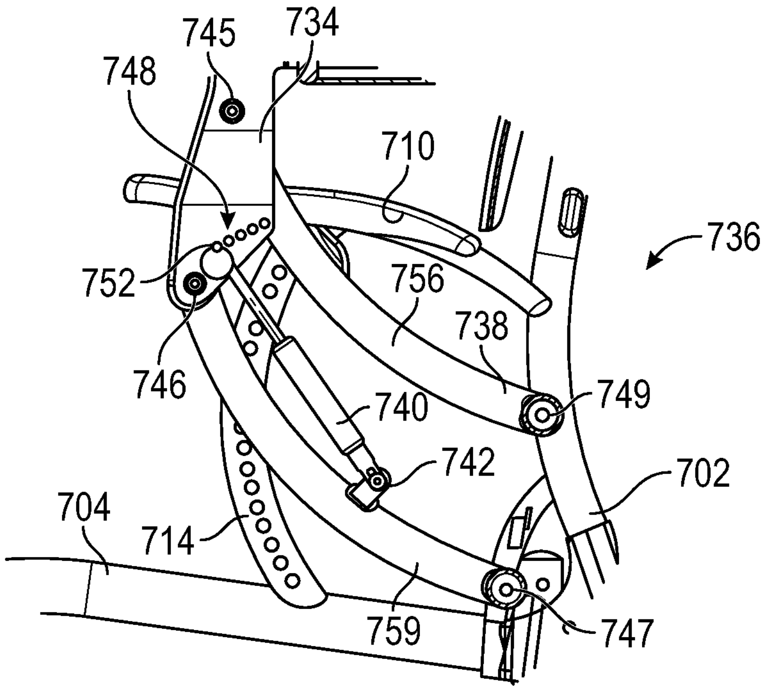

As can be most clearly seen in FIGS. 49C and 50C, lifting mechanism 736 comprises a parallelogram structure 738 comprising link 759, which is parallel to link 756. End block 734 and components of frame 702 for the other "links" of parallelogram 738. Parallelogram links 756, 759 pivot at pivots 745, 746 on end block 734. Parallelogram links 756, 759 further pivot at pivots 747, 749 on frame 702. Although the term "parallelogram" is used for structure 738, it is noted that links 756, 759 need not be straight and entirely parallel, however straight lines connecting pivots 745, 746, 747, 749 form a parallelogram.

Figure 43:
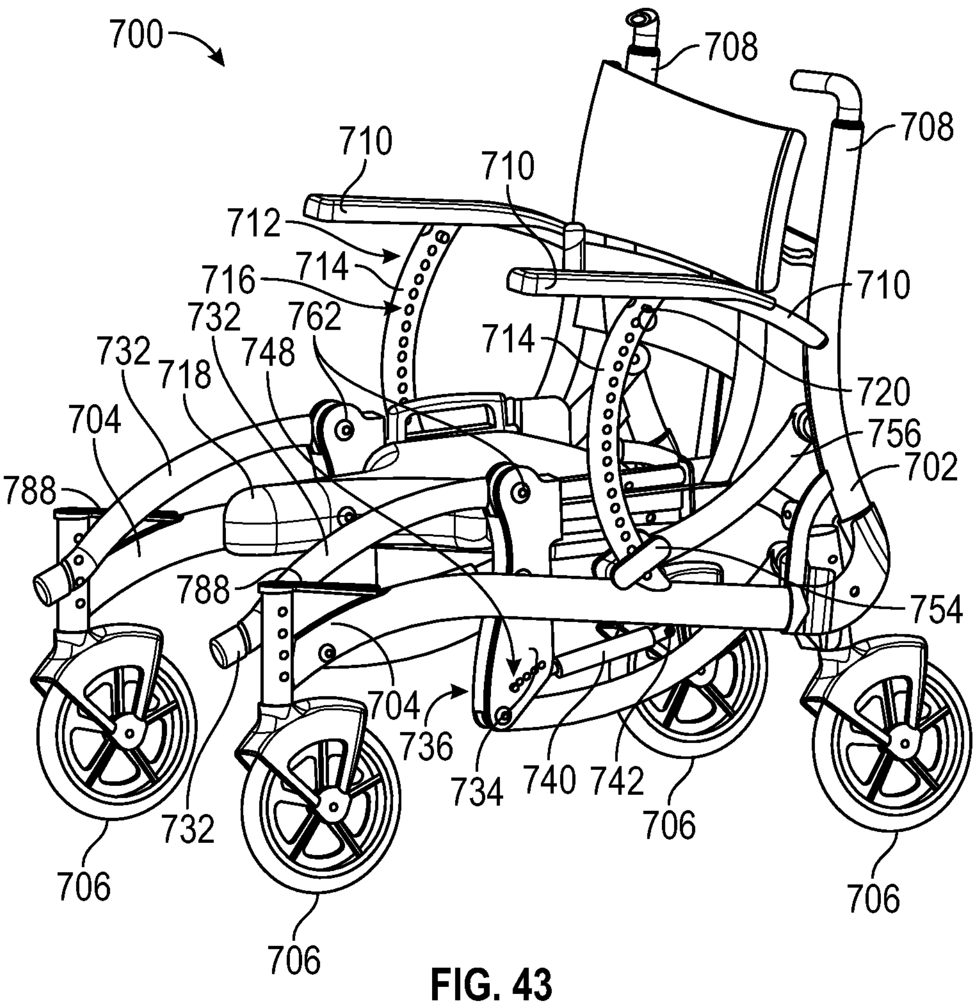
FIG. 43 is a front isometric view of an elevating lifting chair in a lower, sitting mode having an adjustable lifting mechanism.

FIG. 43 is a front isometric view of elevating lifting chair 700 in a lower, sitting mode. Elevating lifting chair 700 has a frame 702 to which various components are attached, either directly or indirectly, or integral with. In the illustrative embodiment of FIG. 43, frame 702 comprises lower frame components 704 to which wheels 706 are attached. Frame 702 includes back components 708 that are attached to and extend upward from lower frame components 704. Armrests 710 are attached to back components 708. Optional footrests 788 are attached to frame 702 at footrest pivots 790. Footrests 788 may have two or more standard positions, for example, folded in as depicted in FIGS. 43-46 and pivoted ninety degrees to accommodate a user's feet while sitting. A footrest rotation mechanism to limit rotation of footrests 788 at pivot 790 may be employed, such as a rotational limit stop at the two positions noted. Other footrest rotation mechanisms that provide additional selection of positions may be included.

Wheels 706 may be incorporated into elevating lifting chair 700 via dual-state casters, such as described in International Patent Application PCT/US2017/060163, filed Nov. 7, 2017, and incorporated by reference herein.

Frame 702 has a maximum height adjustment mechanism 712. In the illustrative embodiment depicted in FIG. 43, maximum height adjustment mechanism 712 includes a height adjustment bar 714 having a series of height adjustment holes 716 for selecting the height of seat 718. A maximum height adjustment pin 720 can be inserted into a hole in the series of height adjustment holes 716 to lock in a desired height. The maximum height adjustment mechanism 712 and procedure will be described in more detail below. Maximum height adjustment mechanism 712 may provide both support and height adjustment functionality.

Figure 48:
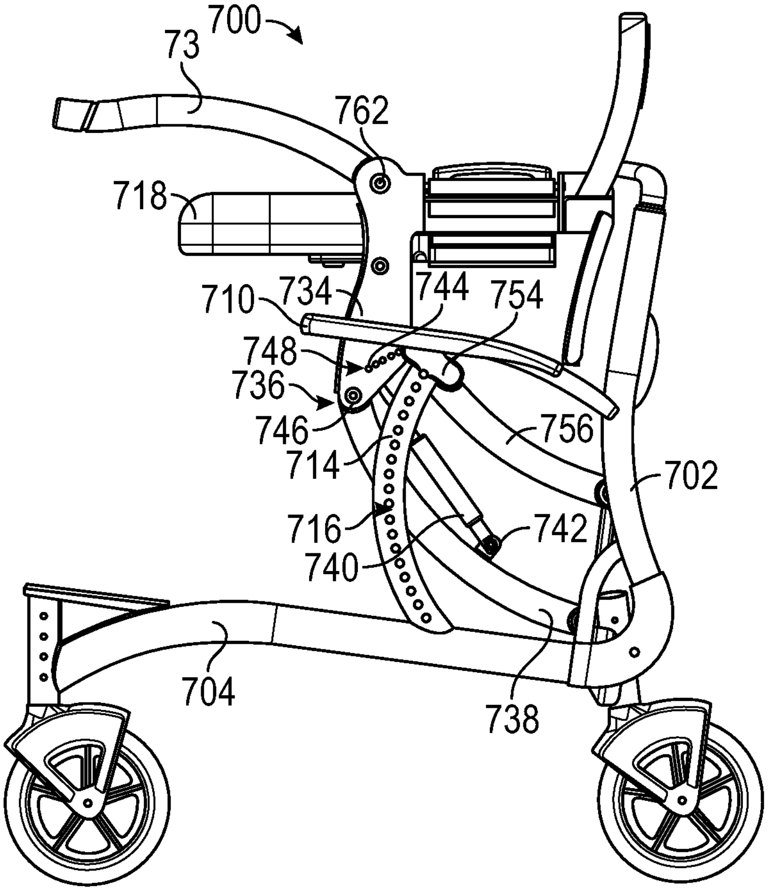
FIG. 48 shows a side view of an elevating walker chair in its highest, lifted position.

As seen in FIGS. 43 and 48, height adjustment bar 714 is slidably disposed within a height adjustment sleeve 754. Height adjustment sleeve 754 is attached to a parallelogram structure 738 at link 756. Therefore, as the angles of parallelogram 738 change to raise or lower elevating lifting chair 700, height adjustment sleeve 754 moves up and down height adjustment bar 714. Height adjustment pin 720 limits the excursion of height adjustment sleeve 754 along height adjustment bar 714 as elevating lifting chair 700 is raised. As can be seen in FIG. 48, height adjustment sleeve 754 can rise to the highest possible position on height adjustment bar 714 when elevating lifting chair 700 is at its highest possible height, if height adjustment pin 720 is in the highest hole of height adjustment holes 716, or if height adjustment pin 720 is not inserted into a hole. By inserting height adjustment pin 720 into a lower hole, elevating lifting chair 700 is limited to a lower maximum height.

Sleeve 754 may have internal wheels to facilitate sliding along height adjustment bar 714. Other means for improving sliding may be used alone or in conjunction with the wheels, for example materials such as Teflon®, ball bearings, or other conventional mechanisms.

In addition to setting a maximum height by insertion of height adjustment pin 720, the height of seat 718 may be set at particular intermediary heights within the lowest to maximum height range. An intermediary height adjustment mechanism 760 may be employed to set height adjustment sleeve 754 at an intermediary location along height adjustment bar 714. For example, height adjustment sleeve 754 may also be associated with a component to fix it along height adjustment bar 714, such as a spring-loaded or non-spring-loaded pin that can be withdrawn from a hole among height adjustment holes 716 and reinserted into a different hole. Other forms of intermediary height adjustment mechanism 760 may be employed. Generally, intermediary height adjustment mechanism 760 provides a means to temporarily fix the level of height adjustment sleeve 754 along height adjustment bar 714.

Figure 58A:
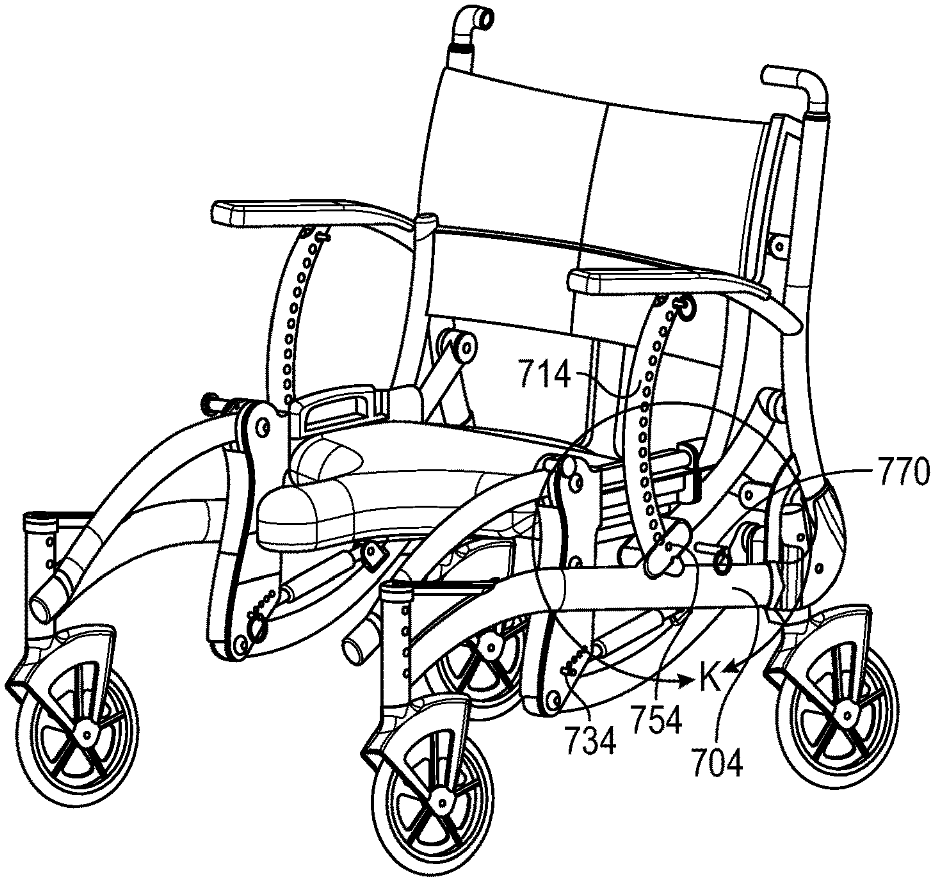
FIGS. 58A-B show an intermediary height adjustment mechanism.
Figure 58B:
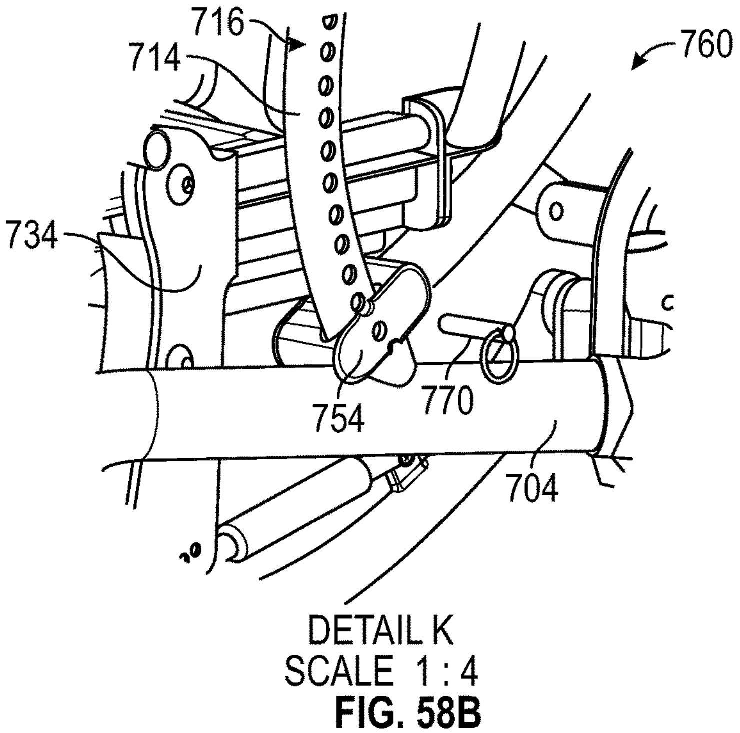
Figure 59A:
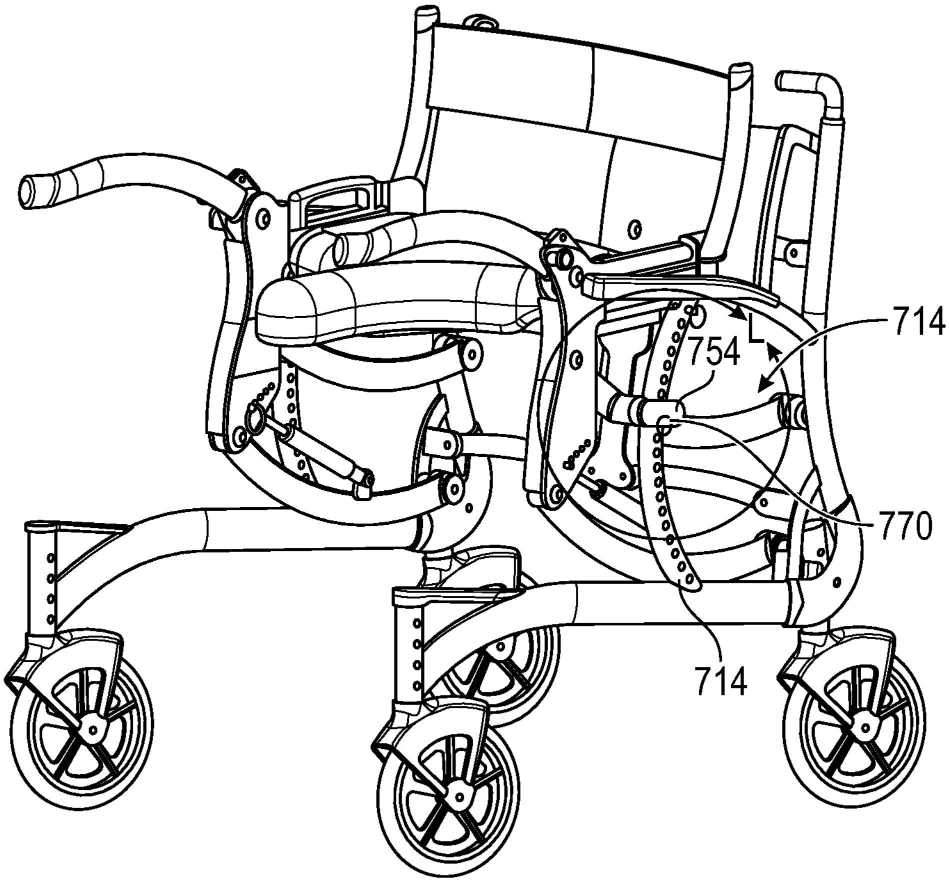
FIGS. 59A-B depict an intermediary height adjustment mechanism.
Figure 59B:
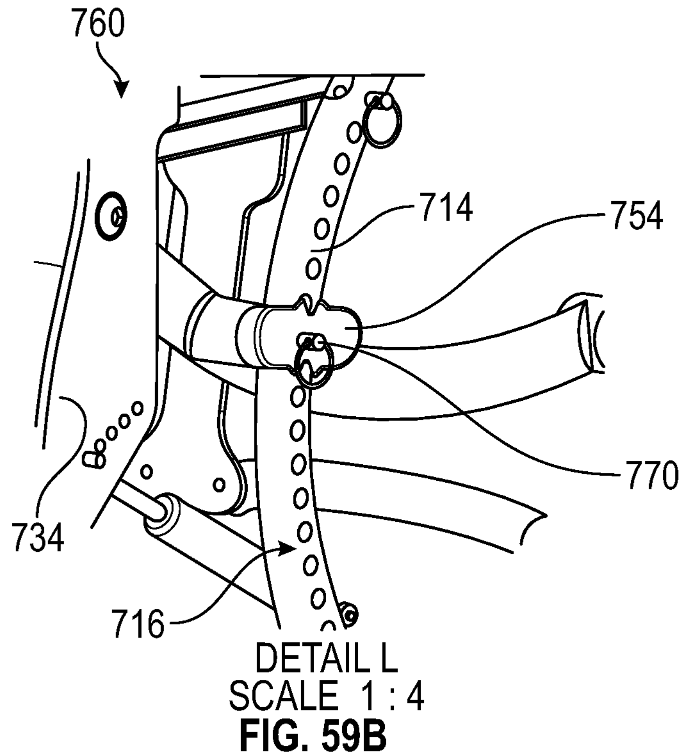

FIGS. 58A-B and 59A-B depict an illustrative intermediary height adjustment mechanism 760. FIG. 58A depicts an elevating walker chair 700 with intermediary height adjustment 760 and seat 718 in its lowest position. FIG. 58B is a close up of detail K from FIG. 58A prior to selecting a height of seat 718. FIG. 59A depicts an elevating walker chair 700 with intermediary height adjustment 760 with seat 718 fixed at a selected height. FIG. 58B is a close up of detail K from FIG. 58A showing intermediary height adjustment 760 engaged to fix the height of seat 718. Intermediary height adjustment mechanism 760 includes intermediary height adjustment pin 770, which can be inserted into a sleeve hole 772 in sleeve 754. Sleeve 754 can be moved along height adjustment bar 714 until sleeve hole 772 is aligned with a selected hole among height adjustment holes 716 in height adjustment bar 714. Intermediary height adjustment pin can then be inserted through sleeve hole 772 and into the selected hole among height adjustment holes 716 to fix the height of seat 718. Other conventional means for adjustably fixing parallelogram link 756 along height adjustment bar 714 can be used as an intermediary height adjustment mechanism.

Figure 56:
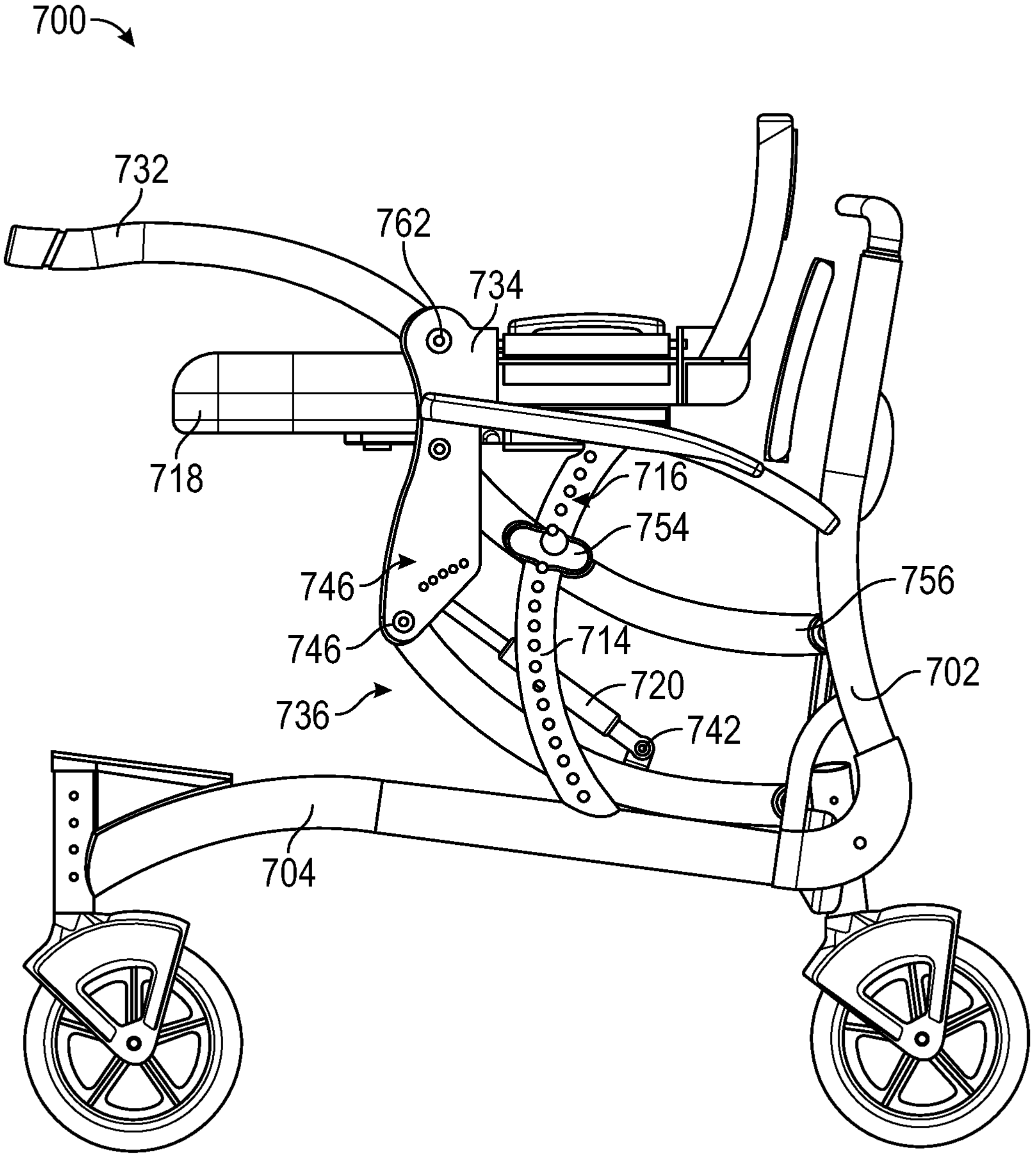
FIG. 56 is a side view of an elevating walker chair showing a height adjustment pin blocking a height adjustment sleeve from rising completely along a height adjustment bar.
Figure 64A:
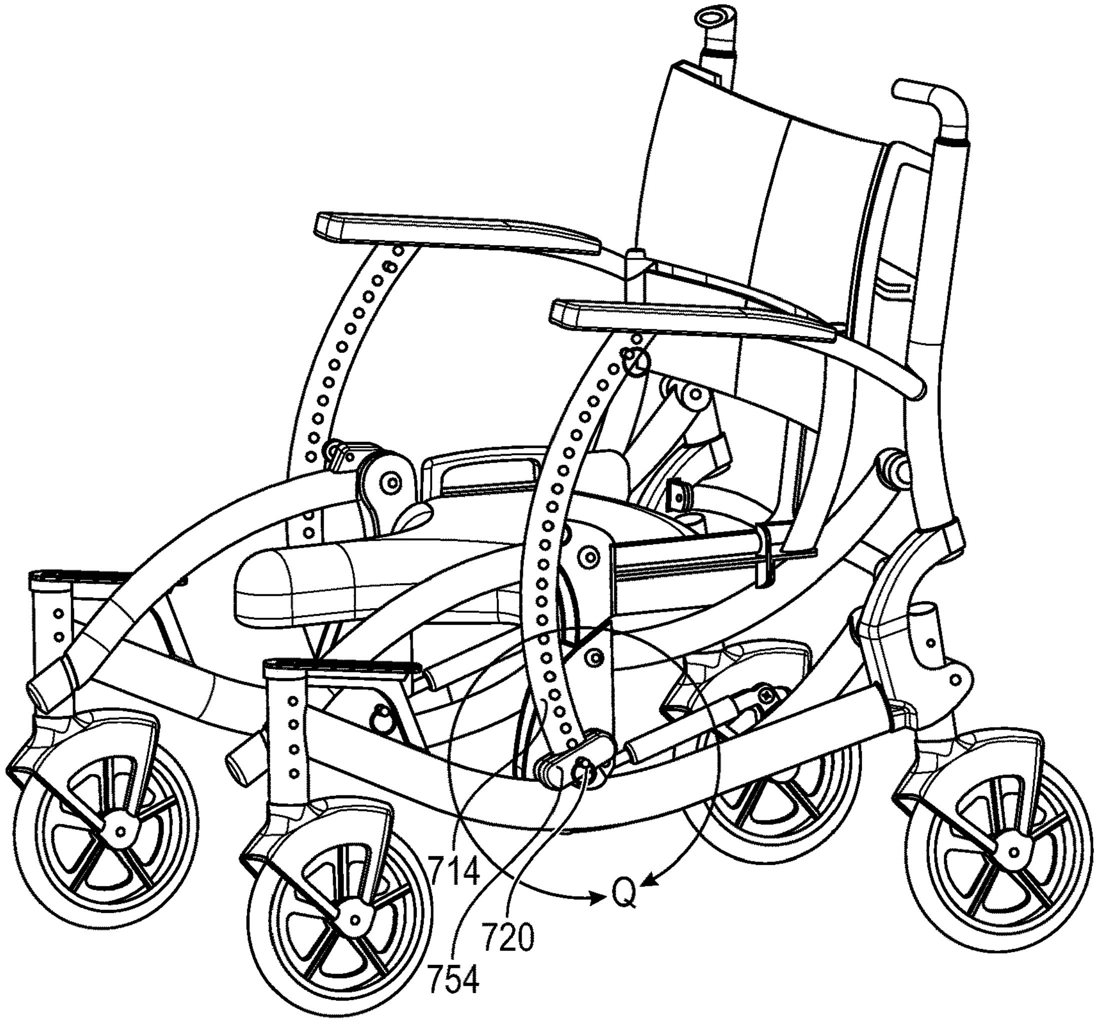
FIGS. 64A-B depict a further embodiment of a height adjustment mechanism for an elevating walker chair.
Figure 64B:
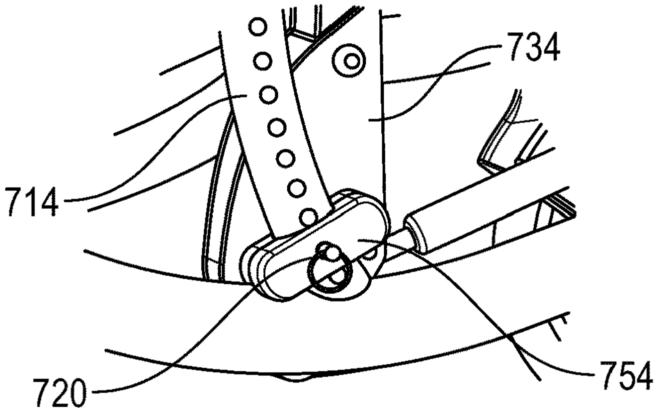

FIGS. 64A-B depict height adjustment sleeve 754 attached to end block 734 instead of being attached to parallelogram structure 738 at link 756, such as shown in FIG. 56. Height adjustment sleeve 754 can be attached to various components of parallelogram structure 738. By registering height adjustment sleeve 754 to the lifting mechanism, the height of seat 718 can be controlled.

Although we refer to a height adjustment "sleeve," other configurations can be used that allow an adjustment component to move up and down along height adjustment bar 714, either slidably or otherwise. The sleeve" need not entirely encircle height adjustment bar 714. Intermediary height adjustment mechanism 760 may be configured to concurrently adjust right/left intermediary height mechanisms. For example, a concurrent intermediary height adjustment component may comprise a cable to coordinate right/left adjustments.

It is noted that the "height adjustment" is different than the adjustment provided by the lifting mechanism 736 that will be described below. The maximum height adjustment provides a maximum height that defines the extent of the excursion generated by the lifting mechanism from a sitting mode to a standing mode.

Figure 44:
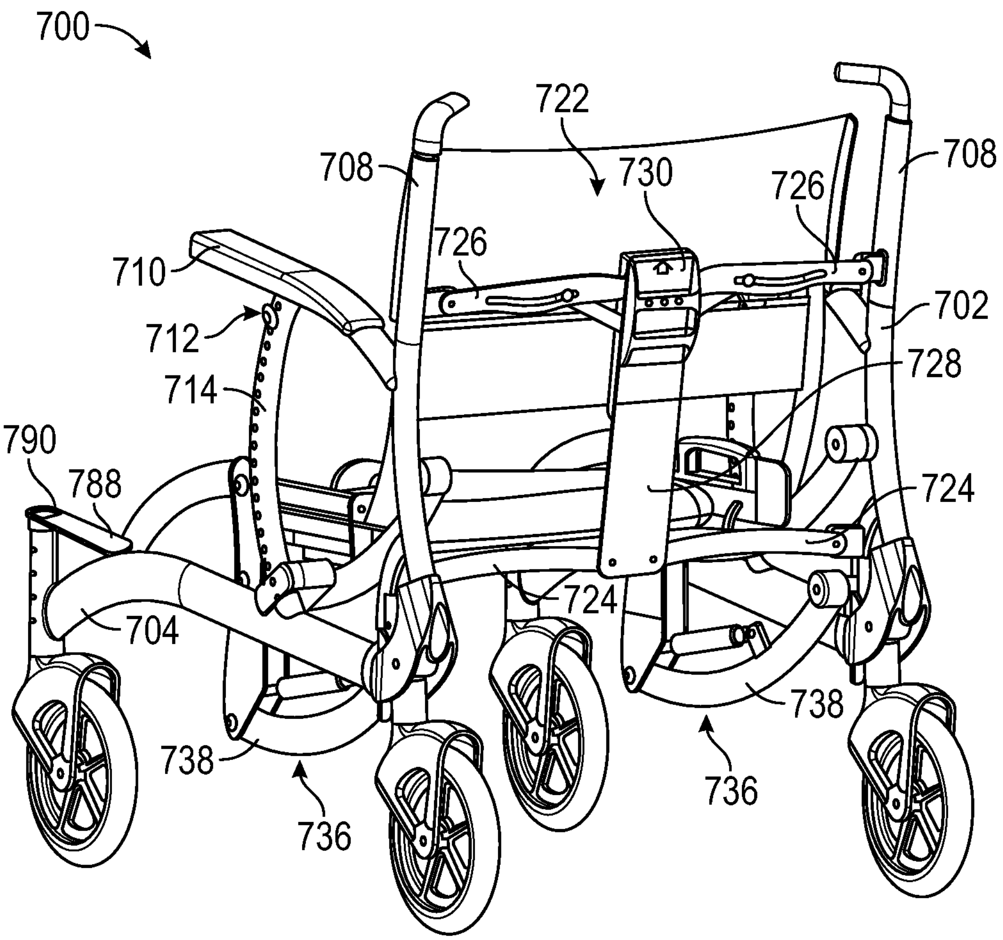
FIG. 44 is a rear isometric view of an elevating walker chair having an adjustable lifting mechanism.

FIG. 44 is a rear isometric view of elevating walker chair 700. Incorporated into the illustrative embodiment of FIG. 43 is a folding mechanism 722, described in more detail below with respect to FIGS. 60-63.

Figure 45:
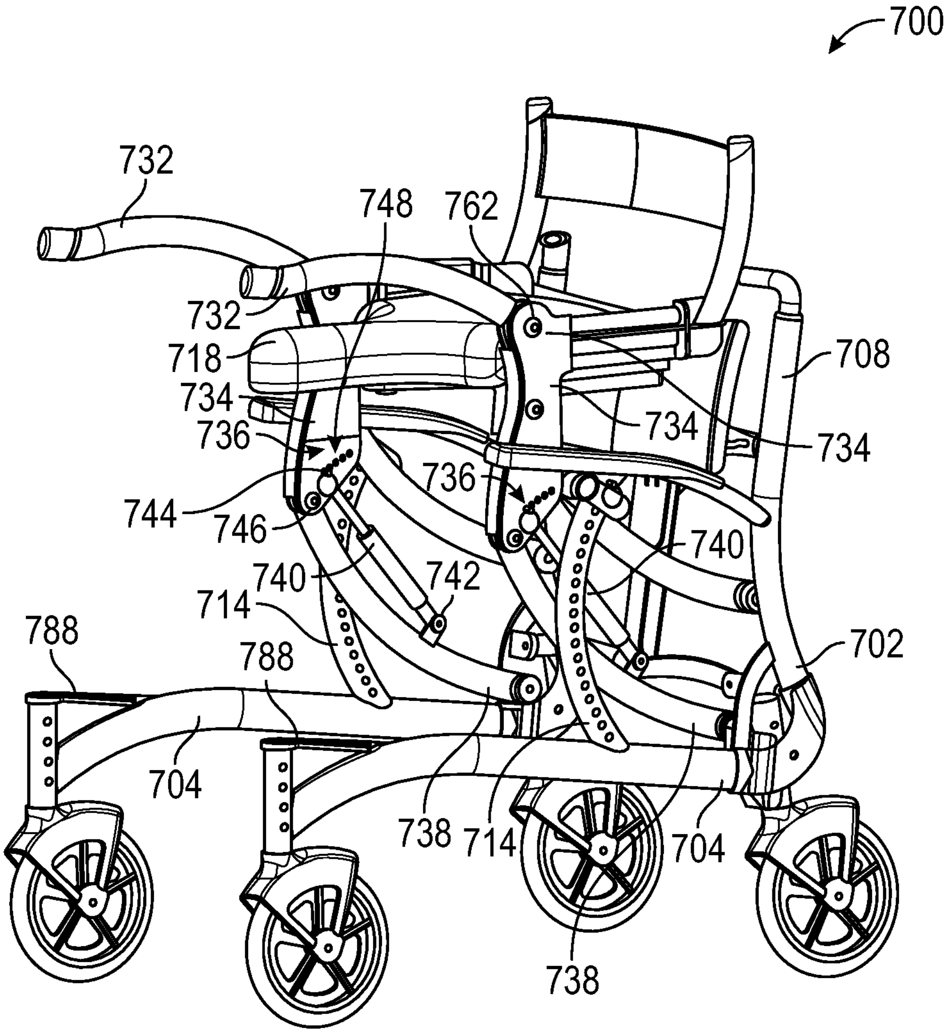
FIG. 45 depicts a front isometric view of an elevating walker chair in an elevated, or standing position.

FIG. 45 depicts an isometric view of elevating walker chair 700 in an elevated, or standing position. In the elevated position a user may be supported by seat/saddle 718 while using leg strength and motion to ambulate. Standing arm supports 732 are provided that may accommodate a user in a comfortable and supportive manner when elevating lifting chair is in a raised position. Support arms 732 are attached to end blocks 734 of a lifting mechanism 736 so elevate when seat 718 is raised by lifting mechanism 736. Support arms 732 may be configured to extend upon elevating lifting chair 700 being raised, or may be incorporated into elevating lifting chair 700 to be manually deployed.

Figure 57A:
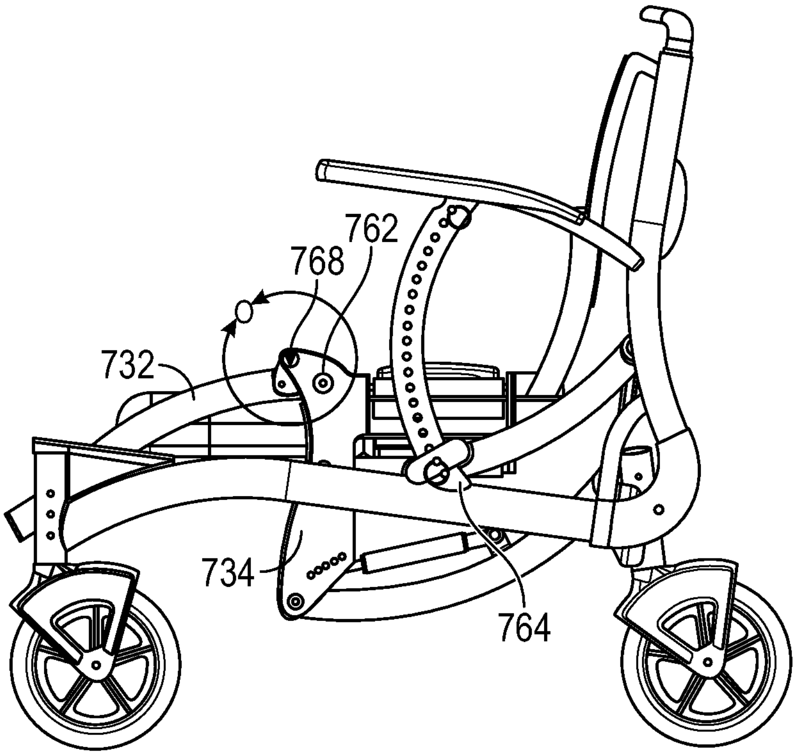
FIGS. 57A-C depict a support arm adjustment mechanism.
Figure 57B:
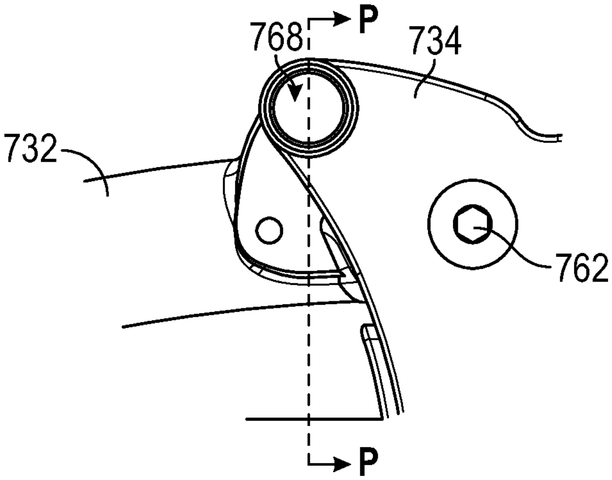
Figure 57C:
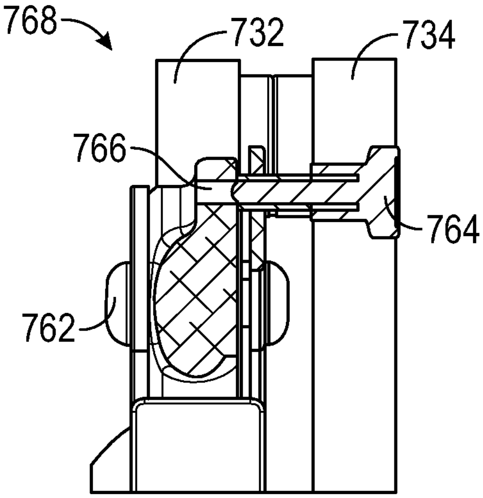

FIGS. 57A-C depict an illustrative arm support adjustment mechanism 768. FIG. 57A is a side view of illustrative elevating walker chair 700 having a support arm adjustment mechanism 768. FIG. 57B is a detail of section O of FIG. 57A. FIG. 57C is a cross-section of arm support adjustment mechanism 768 taken through line P-P of FIG. 57B. Standing arm support 732 is pivotally attached to end block 734 at arm support pivot 762. Arm support adjustment mechanism 768 locks standing arm support 732 into a selected position. Arm support adjustment mechanism 768 includes standing arm support adjustment pin 764, which can be positioned in and withdrawn from standing arm support adjustment pin recess 766. Arm support adjustment pin 764 may be spring loaded. When arm support pin 764 is withdrawn from are support pin recess 766, standing arm support 732 may be rotated about arm support pivot 762. When arm support pin 764 is inserted into arm support pin recess 766, standing arm support 732 is locked into rotational position. When arm support pin 764 is withdrawn from arm support pin recess 766, standing arm support 732 may be rotated about arm support pivot 762. Standing arm support adjustments mechanisms 768 may be included on both right and left standing arm supports 732. Other conventional means for adjusting, locking and unlocking the angular position of standing arm supports 732 may be used as standing arm support adjustment mechanisms.

Lifting mechanism 736 has a parallelogram structure 738 with a spring 740, such as shown in FIG. 49C. Spring 740, together with parts of parallelogram structure 738 form a lifting triangle. The lifting triangle consists of a first side defined by the length of spring 740 from a spring pivot 742 to a spring termination point 744, a second side is defined by a line from spring pivot 742 to main pivot 746, and a third side from main pivot 746 to spring termination point 744. The location of spring termination pivot 744 can be adjusted along a series of spring termination holes 748 to change the effective lifting force. Adjusting the location of spring termination pivot 744 shortens or lengthens the third side of the lifting triangle, i.e. the distance 750 from main pivot 746 to spring termination point 744, or as referred to on occasion herein, the "lever arm." The effective lifting force increases as the length of lever arm 750 increases. The lifting force can be adjusted according to the weight of the occupant.

Figure 46:
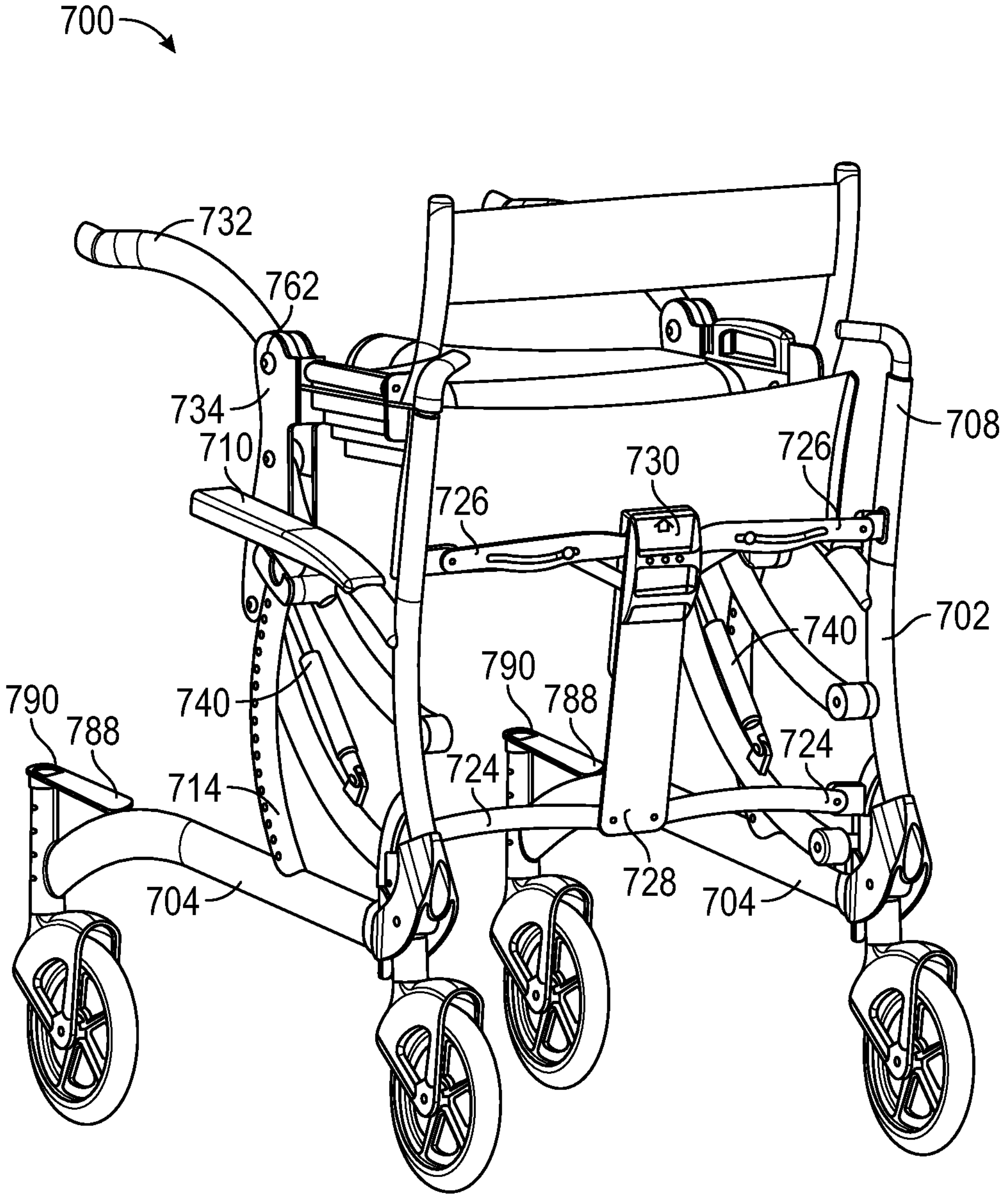
FIG. 46 depicts a rear isometric view of an elevating walker chair in a raised position.

FIG. 46 depicts an isometric rear view of elevating walker chair 700 in a raised position.

FIG. 65 depicts an isometric view of a portion of an elevating walker chair having a seat 718 attached to a single central lifting mechanism 736. Seat 718 and lifting mechanism 736 may be attached to a frame analogous to frame 702. Seat 718 with central lifting mechanism 736 as shown in FIG. 65 may also be used in other apparatuses. Although seat 718 is depicted as a saddle, which is advantageous for an elevating walker chair, seat 718 may have other configurations compatible with the type of seating apparatus in which it is incorporated.

Figure 47A:
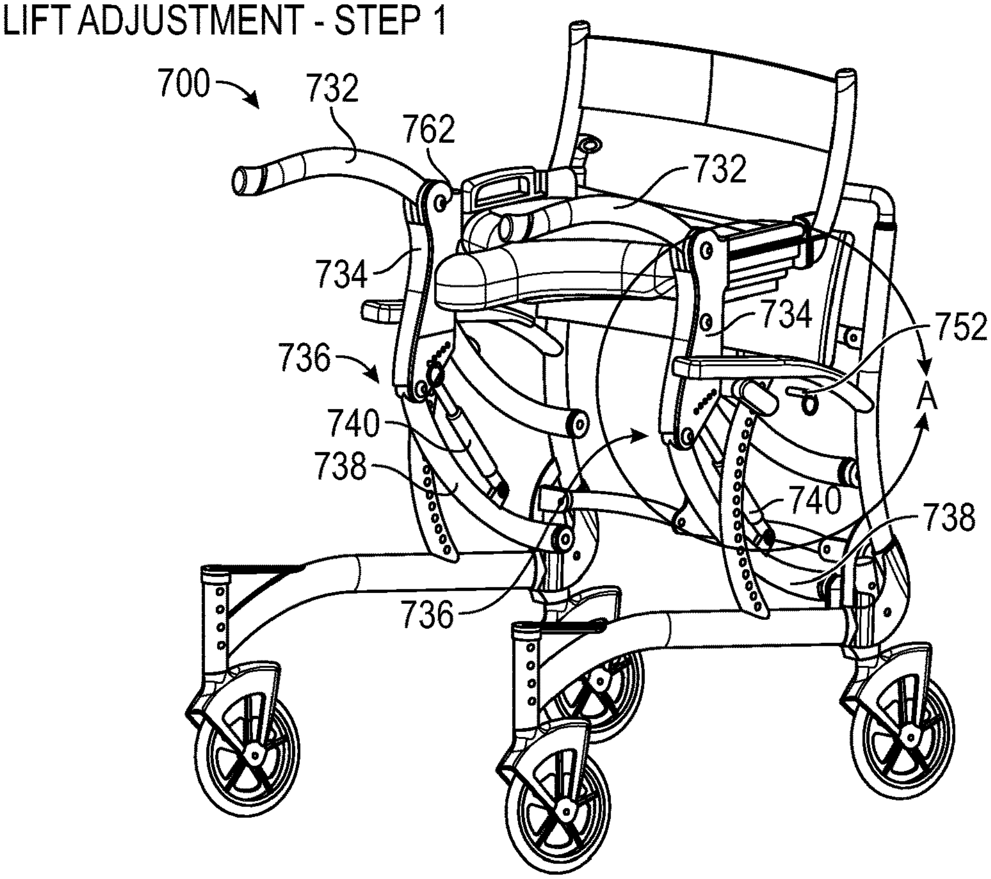
FIGS. 47A,B depict a front isometric view of a lifting mechanism adjustment for an elevating walker chair.
Figure 52A:
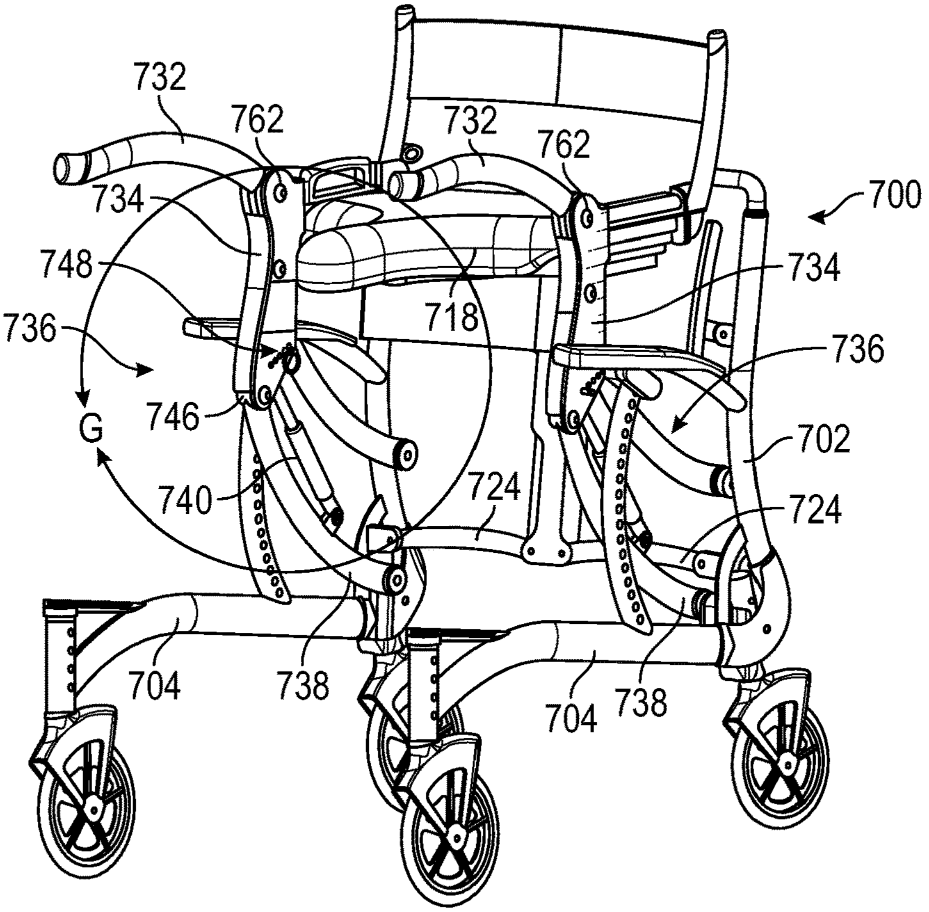
FIGS. 52A,B depict the next lifting adjustment step.
Figure 52B:
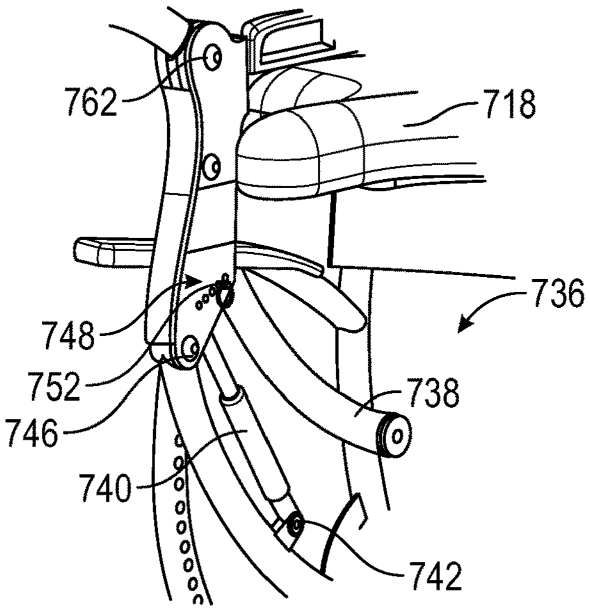
FIG. 52B is an enlargement of detail G of FIG. 52A.

FIGS. 47A,B through FIGS. 52A-52B show an illustrative lifting adjustment procedure. Steps are performed on one side of elevating lifting chair 700 and then on the opposing side of elevating lifting chair 700, if opposing lifting mechanisms and adjustment mechanisms are present.

Figure 47B:
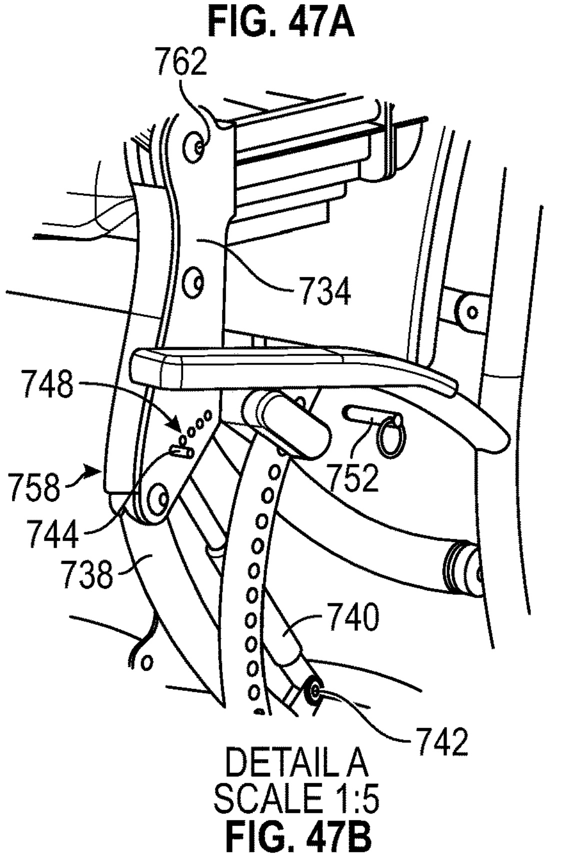
FIG. 47B shows detail A of FIG. 47A.

FIGS. 47A,B show a first step of the lifting force adjustment procedure. FIG. 47A is a front isometric view of elevating walker chair 700 in a raised position. FIG. 47B is an enlargement of detail A showing parts of a lifting adjustment mechanism 758, which is part of lifting mechanism 736. Lifting adjustment mechanism 758 includes a lifting adjustment pin 752 and a series of spring termination holes 748 disposed in end block 734. Lifting adjustment pin 752 is first removed from a hole in spring termination holes 748. This allows elevating lifting chair 700 to rise to its maximum height position as shown in FIG. 48, reducing or eliminating force exerted by spring 740 since it is at maximum extension. It also positions spring termination holes 748 in an arc with spring pivot 742 at its center so spring 740 can be pivoted into any one of spring termination holes 748. This is illustrated by comparing FIGS. 43 and 45. In FIG. 43, elevating walker chair 700 is in its lowest, sitting position and spring 740 is compressed. Spring pivot 742 is not at the center of the arc along which spring termination holes 748 are disposed. Therefore, in the sitting mode, spring 740 cannot be rotated any aligned with each of spring termination holes 748. FIG. 45 depicts elevating walker chair 700 at its highest, standing position. Spring 740 is fully extended, and spring pivot 742 is at the center of the arc along which spring termination holes 748 are disposed. In this configuration, spring 740 can be rotated about spring pivot 742 and will align with any of spring termination holes 748, and thus, lifting adjustments can be made.

Recall that the "maximum height position" is determined by the setting of maximum height adjustment mechanism 712. The lifting force adjustment mechanism 758 on the other hand sets the force with which the elevating walker chair seat 718 will rise and descend.

FIGS. 49A-C show the next step of the lifting force adjustment procedure. FIG. 49B depicts a side cross-sectional view of elevating lifting chair 700 taken through line B-B of FIG. 49A, which cuts through spring 740. FIG. C is an enlargement of detail C of FIG. 49B. FIG. 49C shows spring termination pivot 744 in a hole of spring termination holes 748 that creates the shortest lever arm 750 for this embodiment.

FIGS. 50A,B,C are analogous to FIGS. 49A-C but are taken through the cross-section D-D shown in FIG. 50*a*. Cross-section D-D provides a side view of spring 740 and lifting adjustment pin 752.

Figure 51A:
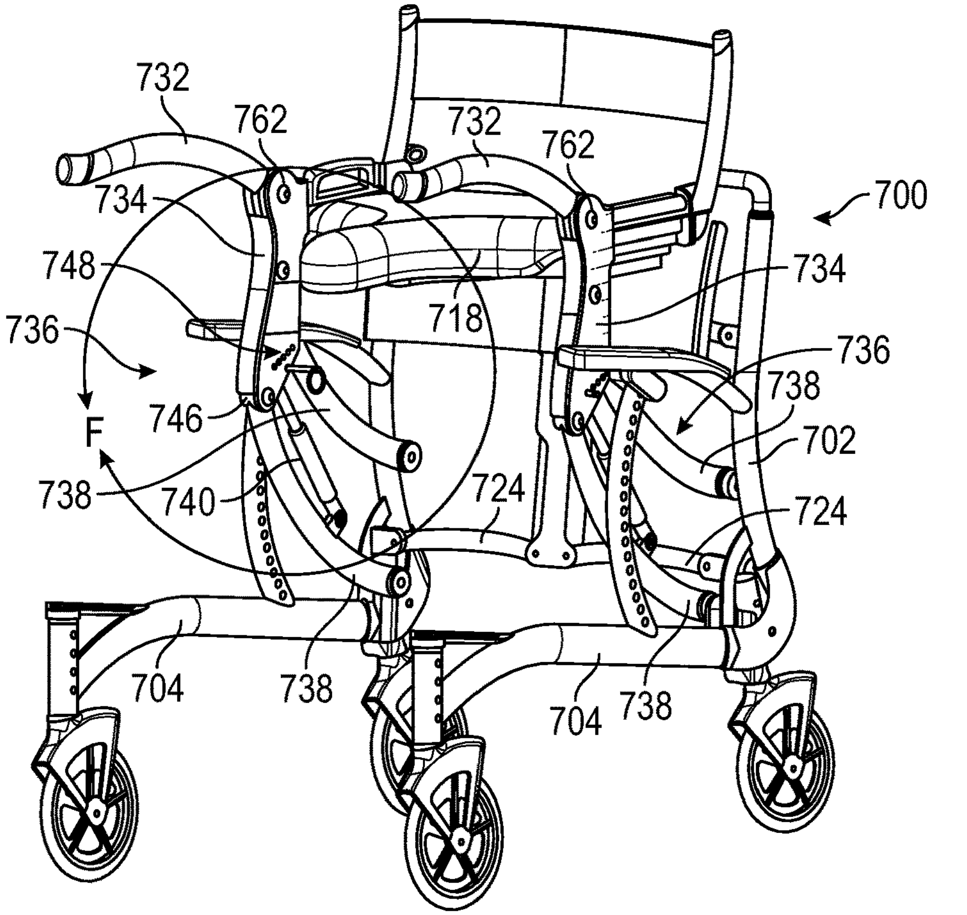
FIGS. 51A,B depicts the lifting adjustment step after that which is shown in FIGS. 50A-C.
Figure 51B:
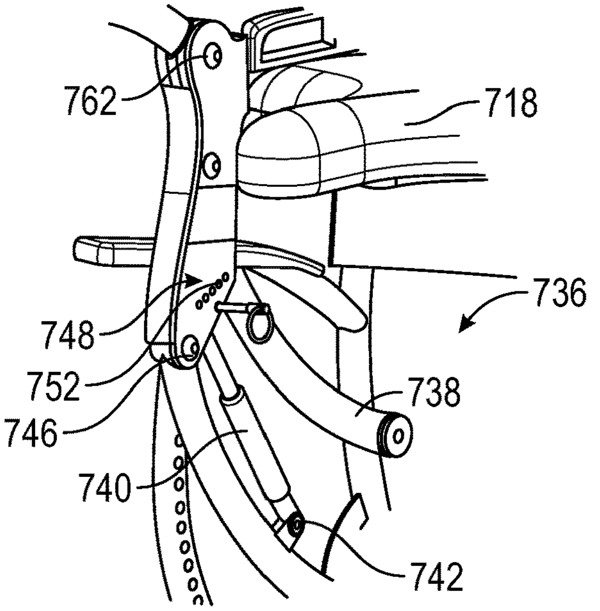
FIG. 51B is an enlargement of detail F of FIG. 51A.

FIGS. 51A,B depict the next lifting force adjustment step. FIG. 51B is an enlargement of detail F of FIG. 51A. Lifting adjustment pin 752 is removed from a hole in the series of spring termination holes 748. This allows spring 740 to freely rotate about spring pivot 742 into any of the other spring termination holes 748 to adjust the lifting force.

FIGS. 52A,B depicts the next step of the lifting force adjustment procedure. FIG. 52B is an enlargement of detail G of FIG. 52A. Spring 740 has been rotated about spring pivot 742 so the end of spring 740 can be situated to form spring termination pivot 744 at a different hole in the series of spring termination holes 748. Lifting adjustment pin 752 is inserted in a hole to create spring termination pivot 744. This adjustment enlarges lever arm 750 as compared to the length of lever arm 750 shown in FIG. 49C, for example. In other words, the distance between spring termination pivot 744 and main pivot 756 is increased, and thus, the effective lifting force is also increased.

Figure 53A:
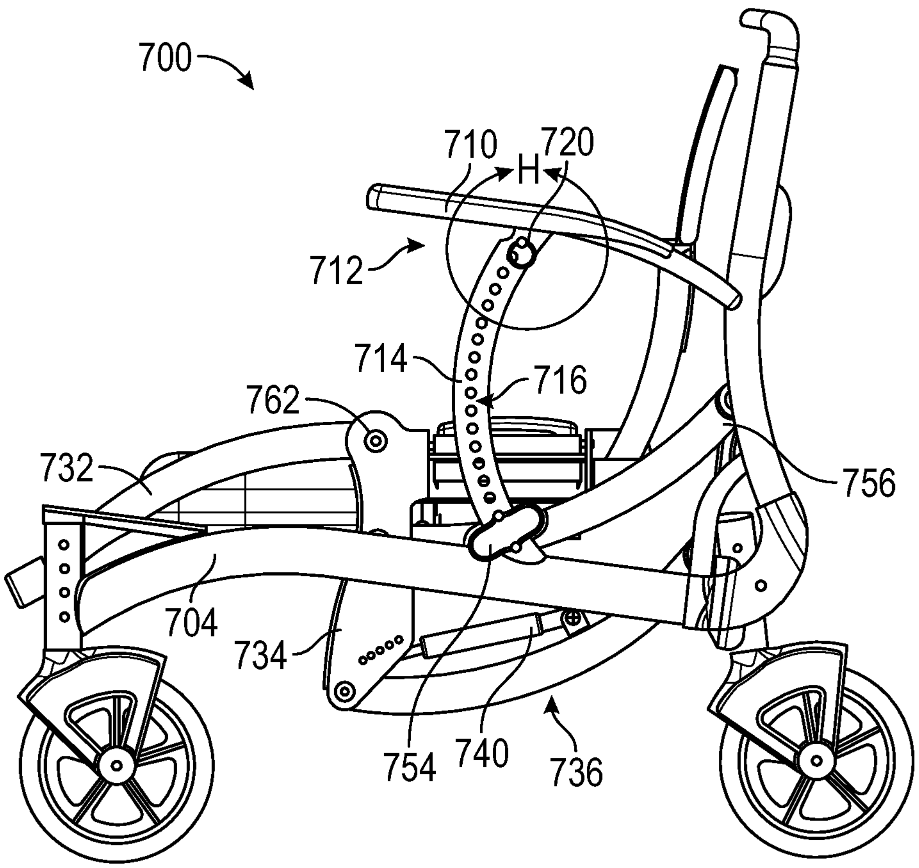
FIGS. 53A,B depict an initial elevating walker chair configuration before initiation of a maximum height adjustment procedure.
Figure 53B:
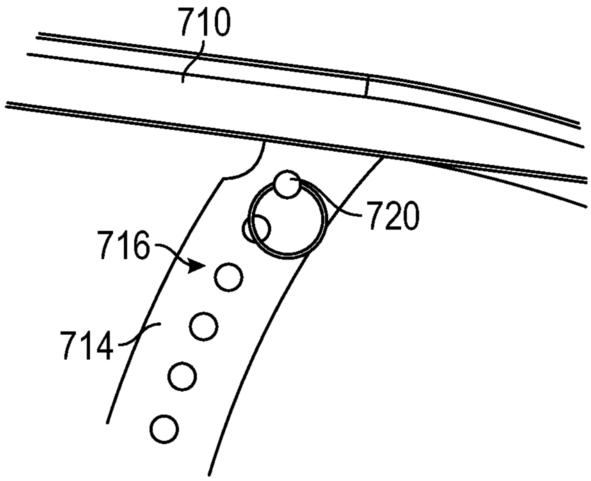
FIG. 53B is an enlargement of detail H of FIG. 53A.

FIGS. 53A,B through FIG. 56 depict a height adjustment procedure. FIG. 53B is an enlargement of detail H of FIG. 53A. FIGS. 53A,B depict an initial configuration of elevating lifting chair 700 in which elevating lifting chair 700 is positioned at its lowest height and height adjustment pin 720 is in the highest hole of height adjustment holes 716 on height adjustment bar 714.

Figure 54A:
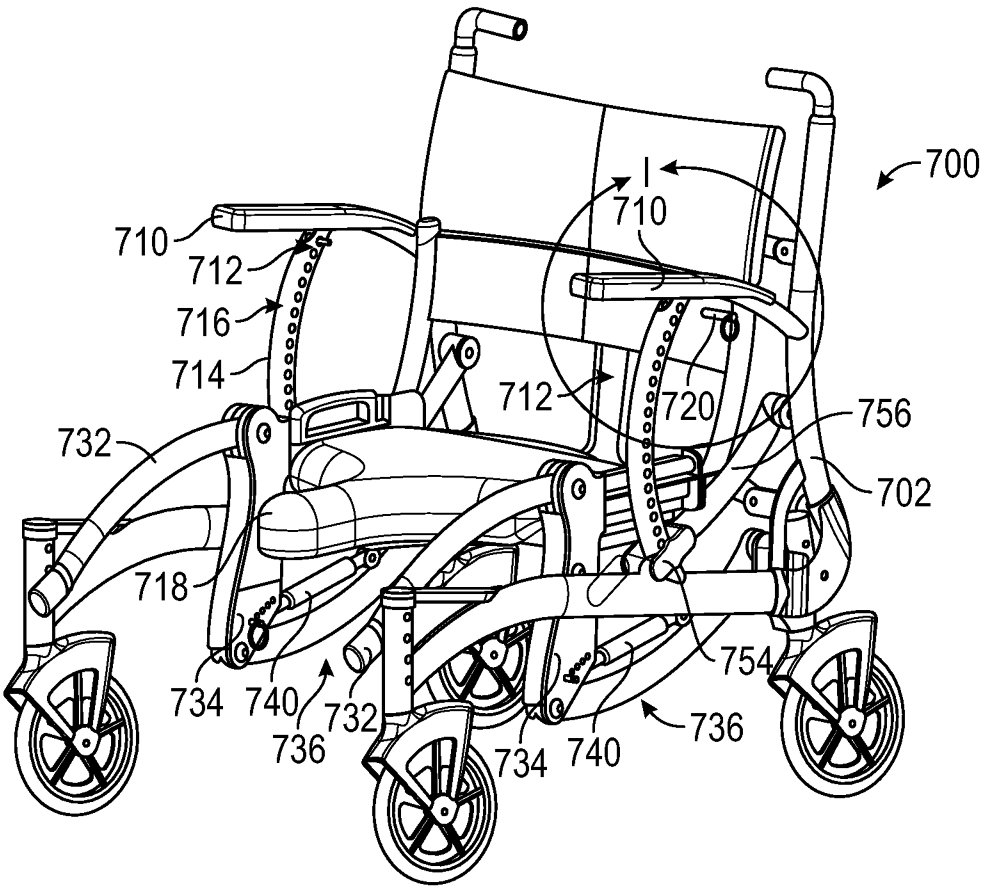
FIGS. 54A,B depict a first maximum height adjustment step to change the maximum height that an elevating lifting chair can achieve.
Figure 54B:
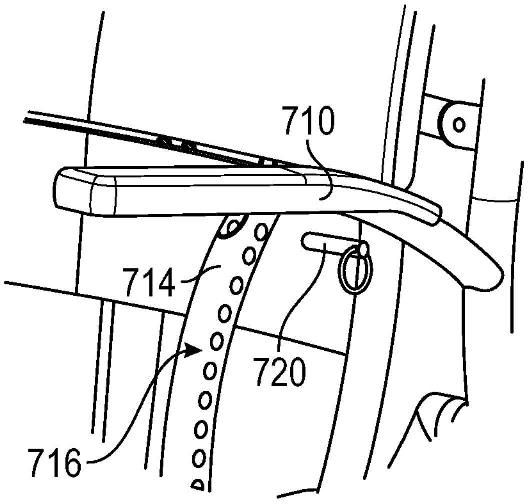
FIG. 54B is an enlargement of detail H of FIG. 54A.

FIGS. 53A,B depict elevating lifting chair 700 in its lowest position with height adjustment pin 720 in the highest position. FIGS. 54A,B depict the first height adjustment step to change the maximum height that elevating lifting chair 700 can achieve for this illustrative embodiment. FIG. 54B is an enlargement of detail H of FIG. 54A. Height adjustment pin 720 is shown as removed from a hole of height adjustment holes 716 in which it had been inserted.

Figure 55A:
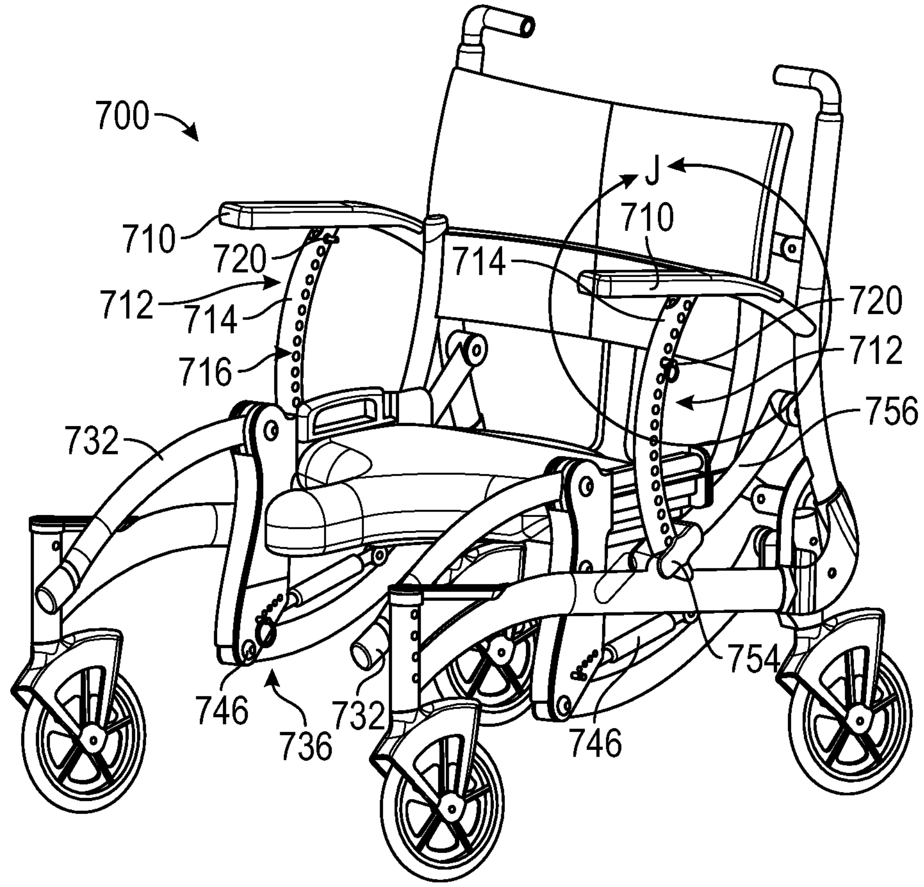
FIGS. 55A,B depict the next maximum height adjustment step for this illustrative embodiment.
Figure 55B:
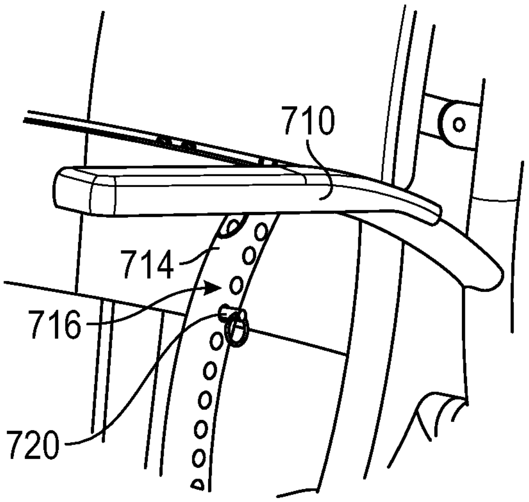
FIG. 55B is an enlargement of detail H of FIG. 55A.

FIGS. 55A,B depict the next height adjustment step for this illustrative embodiment. FIG. 55B is an enlargement of detail J of FIG. 55A. Height adjustment pin 720 is reinserted into a lower hole of height adjustment holes 716. This sets the maximum height of elevating lifting chair 700 at a lower level because the excursion of height adjustment sleeve 754 along parallelogram link 756 is limited by height adjustment pin 720.

FIG. 56 is a side view of elevating walker chair 700 showing height adjustment pin 720 blocking height adjustment sleeve 754 from rising completely along height adjustment bar 714. This acts against the lifting force of spring 740 to limit elevating walker chair 700 from attaining it full height.

It is noted that with lifting adjustment mechanisms 758 and height adjustment mechanisms 712, 760 on both sides of elevating walker chair 700, the adjustments described herein may need to be implemented on both sides. In further embodiments, an adjustment mechanism may only be present on one side, provided that the elevating walker chair and adjustment mechanism components are durable enough to allow for single-sided mechanisms.

Figure 60:
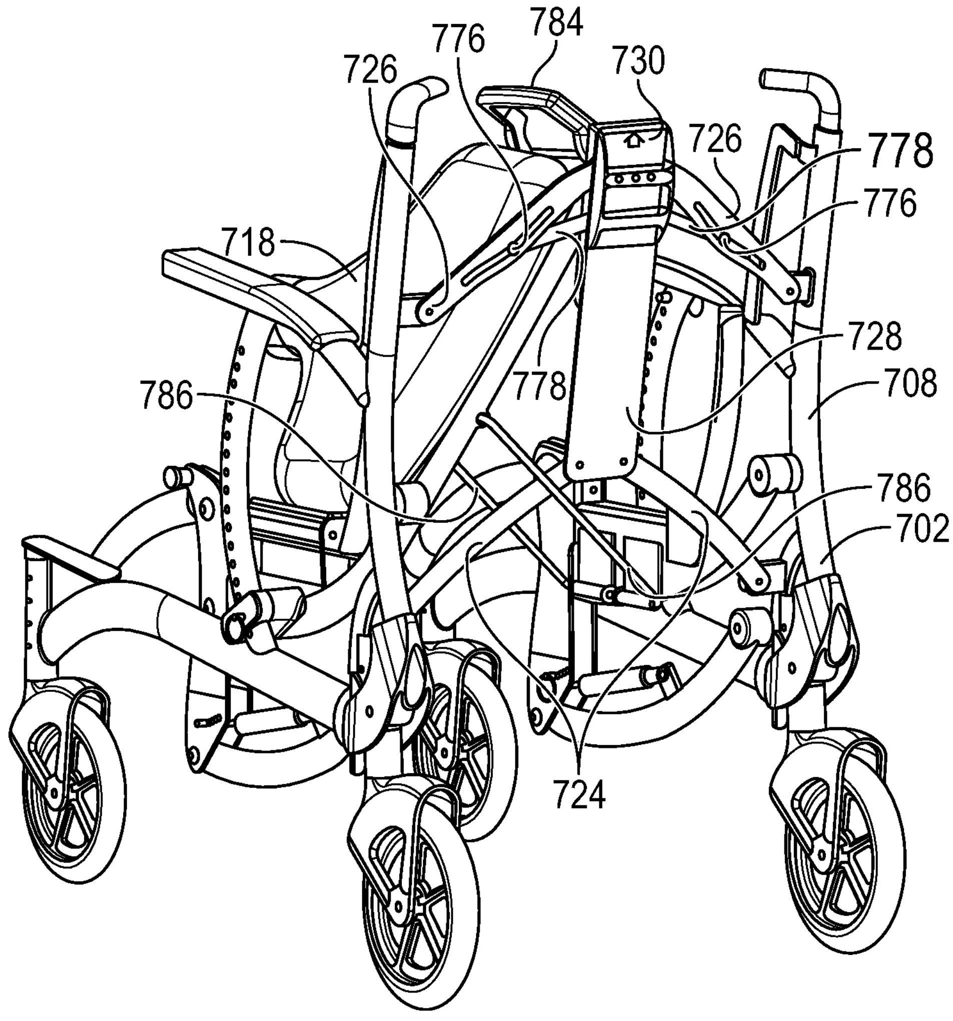
FIG. 60 is an isometric rear view of a folding elevating walker chair in a partially folded position.
Figure 61:
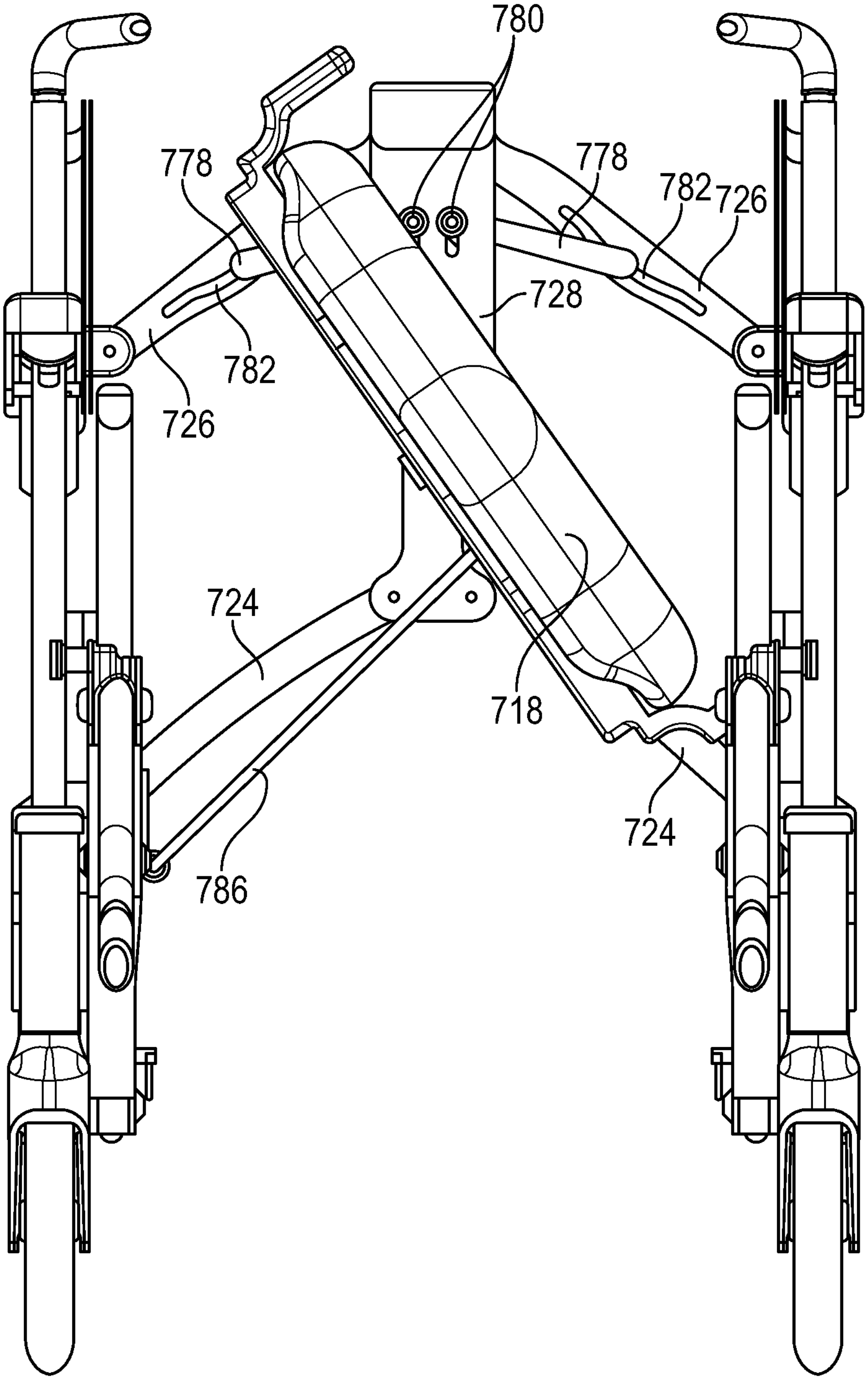
FIG. 61 depicts a front view of an elevating walker chair partially folded.
Figure 62:
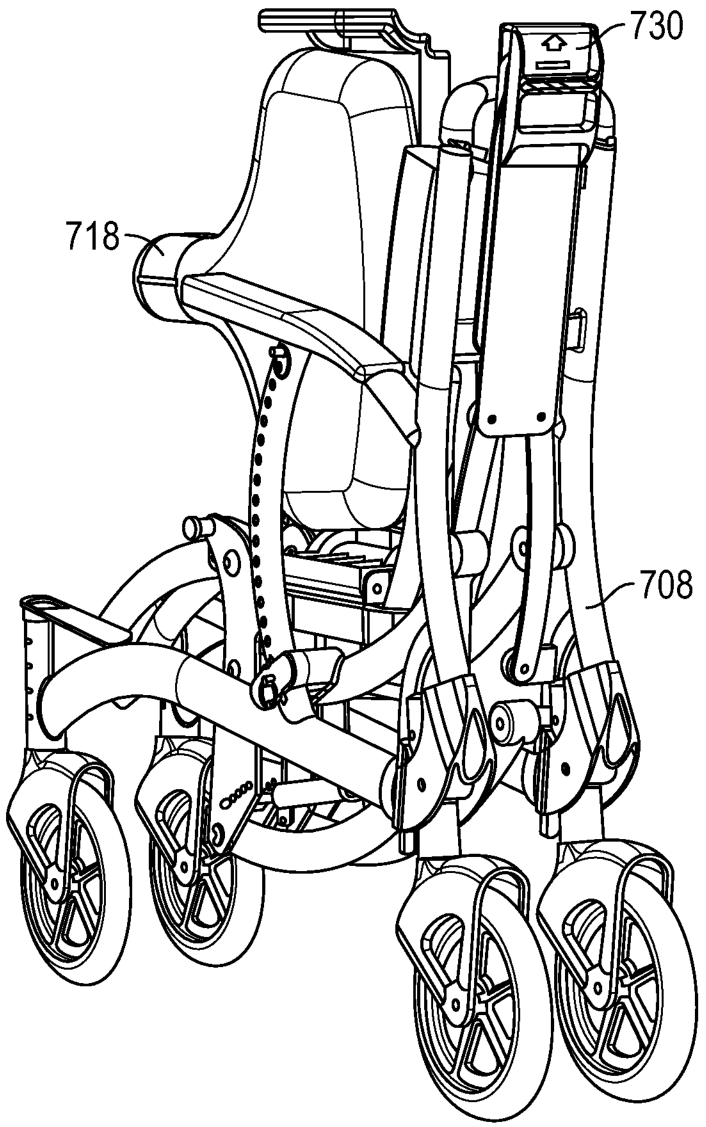
FIG. 62 is a rear isometric view of an elevating walker chair in a fully folded position.
Figure 63:
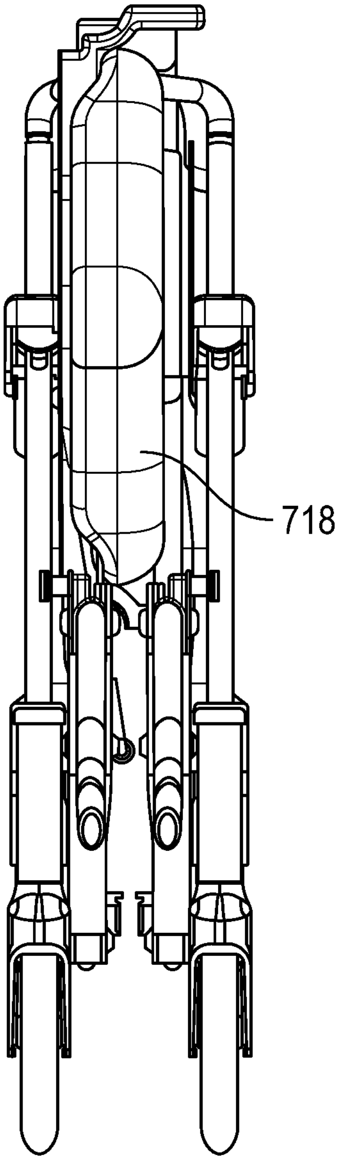
FIG. 63 is a front view of an elevating walker chair in a fully folded mode.

Turning to FIGS. 60-63, folding mechanism 722 is shown, which is optionally included in elevating walker chair 700. FIG. 60 is an isometric rear view of folding elevating walker chair 700. FIG. 61 depicts a front view of elevating walker chair 700 partially folded. FIG. 62 is a rear isometric view of elevating walker chair 700 in a folded position. FIG. 63 is a front view of elevating walker chair 700 in a folded mode.

Folding mechanism 722 includes a pair of lower cross bars 724 and a pair of upper cross bars 726, each connected to, and foldable with respect to, central upright component 728. A locking mechanism 730 is provided to lock the elevating lifting chair 700 structure in an open position for use and unlock it for folding. Locking mechanism 730 may also lock elevating walker chair in a folded position. Seat 718 may also be foldable upward, either manually or automatically upon folding of lower cross bars 724 and upper cross bars 726 toward central upright 728.

In the illustrative folding mechanism 722, elevating walker chair 700 is in a sitting mode when folded, such as the mode shown in FIG. 44. In additional embodiments, elevating walker chair 700 can be in a standing mode when folded. Locking can be initiated by pulling upward on locking mechanism 730. Seat 718 can be folded by lifting a side of the seat upward or, if present, a handle 784 on seat 718. Tie rod linkages 786 are connected to seat 718 at one end and to frame 702, or a component attached to 702 to maintain connection of seat 718 to the apparatus, while allowing it to be folded to accommodate the left and right sides of elevating walker chair 700 coming toward one another for folding. Tie rods 786 may be slidably attached to seat 718 and/or frame 702.

Slots 774 in upper cross bars 726 slidably accommodate extension pins 776 of bars 778. Guide bars 778 are pivotally fixed to central upright component 728 at central upright pivots 780, which are shown in FIG. 61. Central pivots 780 may be slidably fixed to central upright component 728 in slots 782. As extension pins 776 move along slots 782, upper cross bars 726, lower cross bars 724 and guide bars 778 pivot and move toward central upright component 728, and cause back components 708 of frame 702 to move toward one another. Seat 718 is folded upward or downward by approximately 90 degrees to accommodate lower frame components 704, armrests 710 and other components of elevating walker chair to collapse toward central upright components 728 in a folding manner.

Other conventional folding mechanisms 722 and locking mechanisms 730 may be incorporated into elevating walker chair 700.

FIGS. 64A-C depicts a further embodiment of an elevating walker chair 800. FIG. 64A depicts an isometric view of elevating walker chair 800 in a sitting mode. FIG. 64B depicts elevating walker chair in a standing mode. FIG. 64C depicts elevating walker chair 800 in an optional folded mode. Elevating walker chair 800 has a single central lifting mechanism 802, with a similar parallelogram and spring configuration as lifting mechanisms 350. Elevating walker chair 800 may include various mechanism described with respect to elevating walker chair 700, for example, intermediary height adjustment mechanism, maximum height adjustment mechanism, locking mechanism, lifting force adjustment mechanisms other than the arcuate hole configuration and standing arm support adjustment mechanism.

Various embodiments of the invention have been described, each having a different combination of elements. The invention is not limited to the specific embodiments or combinations disclosed. The invention may include different combinations of the elements disclosed, omission of some elements or the replacement of elements by the equivalents of such structures. For example, various aspects of lifting mechanisms 104, 350 and 602 may be interchanged.

While illustrative embodiments have been described, additional advantages and modifications will occur to those skilled in the art. Therefore, the invention in its broader aspects is not limited to specific details shown and described herein. Accordingly, it is intended that the invention not be limited to the specific illustrative embodiments, but be interpreted within the full spirit and scope of the appended claims and their equivalents.

The invention claimed is:

1. An adjustable lifting mechanism comprising:

a fixed base;

a parallelogram structure having four pivotally connected links having four pivots, the parallelogram connected at two of the four pivots to the base;

a spring pivotably extending from a first link of the parallelogram, with one end connected pivotably to a point on the first link and an opposite end pivotably connected to an adjustable termination point on a second of the four pivotally connected links of the parallelogram to form a lifting triangle, wherein the spring termination point is displaced from a main pivot of the parallelogram;

an extension in fixed relation to the second link of the four pivotally connected links forms a seat, wherein angles of the parallelogram are varied upon raising or lowering the lifting mechanism between a sitting mode and a standing mode;

a height adjustment sleeve associated with the second link, the height adjustment sleeve configured to slideably move up and down between the sitting mode and the standing mode, along a bar fixedly attached to the base, and a lifting power adjustment mechanism configured to adjust the position of the spring termination point with respect to the main pivot.

2. The lifting mechanism of claim 1 wherein the lifting power adjustment mechanism comprises:

an arc of holes into which a first spring end can be selectively aligned with and fixed to.

3. The adjustable lifting mechanism of claim 1, wherein an end block forming the second link has two opposing sides wherein the lifting power adjustment mechanism has a lead screw disposed between the two end block sides; and a traveling nut moveable along the lead screw configured to adjust the location of spring termination pivot.

4. The adjustable lifting mechanism of claim 1, wherein the extension forms a rear seat section.

5. The adjustable lifting mechanism of claim 1, wherein the extension is configured to maintain its angle with respect to horizontal when the angles of the parallelogram are varied upon raising or lowering the lifting mechanism between the sitting mode and the standing mode.

6. An adjustable lifting mechanism for use as or with a seating apparatus comprising:

a fixed base;

a parallelogram structure having four pivotally connected links having four pivots, the parallelogram connected at two of the four pivots to the base;

an extension having a fixed end in fixed relation to a first link of the four parallelogram links and disposed at an angle to the first link wherein angles of the parallelogram are varied upon raising or lowering the lifting mechanism between a sitting mode and a standing mode;

wherein the extension forms a rear seat section having a rear edge and a front edge;

a spring pivotally attached to an end of the extension opposite to the extension's fixed end and extending to an adjustable termination point on a second link of the parallelogram to form a lifting triangle, wherein the spring termination point is displaced from a first pivot of the parallelogram;

a front seat section having a rear edge and a front edge;

the front seat section pivotally attached to the rear seat section at the front seat rear edge and the rear seat front edge configured to permit the front seat section to drop downward in the standing mode and return to the sitting mode; and a lifting power adjustment mechanism configured to adjust the position of the spring termination point with respect to the first pivot, wherein the two of the four pivots connected to the fixed base are directly connected to a side support or to an end block in the fixed base.

7. The adjustable lifting mechanism of claim 6, wherein the end block has two opposing sides, wherein the lifting power adjustment mechanism has a lead screw disposed between the two end block sides; and a traveling nut moveable along the lead screw configured to adjust the location of spring termination pivot.

8. The adjustable lifting mechanism of claim 6, wherein the extension is configured to maintain its angle with respect to horizontal when the angles of the parallelogram are varied upon raising or lowering the lifting mechanism between the sitting mode and the standing mode.

* * * * *